(12) United States Patent
Jain

(10) Patent No.: US 11,436,083 B2
(45) Date of Patent: Sep. 6, 2022

(54) DATA ADDRESS MANAGEMENT IN NON-VOLATILE MEMORY

(71) Applicant: Western Digital Technologies, Inc., San Jose, CA (US)

(72) Inventor: Vimal Kumar Jain, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/215,942

(22) Filed: Mar. 29, 2021

(65) Prior Publication Data

US 2022/0075687 A1   Mar. 10, 2022

Related U.S. Application Data

(60) Provisional application No. 63/074,824, filed on Sep. 4, 2020.

(51) Int. Cl.

| | |
|---|---|
| *G06F 11/00* | (2006.01) |
| *G06F 11/10* | (2006.01) |
| *G06F 12/128* | (2016.01) |
| *G06F 12/0811* | (2016.01) |
| *G06F 12/0882* | (2016.01) |

(52) U.S. Cl.
CPC ...... *G06F 11/1068* (2013.01); *G06F 11/1072* (2013.01); *G06F 12/0811* (2013.01); *G06F 12/0882* (2013.01); *G06F 12/128* (2013.01)

(58) Field of Classification Search
CPC ............ G06F 11/1068; G06F 11/1072; G06F 12/0811; G06F 12/0882; G06F 12/128
See application file for complete search history.

(56) References Cited

U.S. PATENT DOCUMENTS

| | | |
|---|---|---|
| 5,371,714 A | 12/1994 | Matsuda et al. |
| 5,488,694 A | 1/1996 | McKee et al. |
| 5,828,623 A | 10/1998 | Dilbeck |
| 6,222,762 B1 | 4/2001 | Guterman et al. |

(Continued)

OTHER PUBLICATIONS

Die (integrated circuit)—Wikipedia, Modified Oct. 9, 2019, [online] Available at: <<https://en.wikipedia.org/w/index.php?title=Die_(integrated_circuit)&oldid=920444315>>, 3 pages.

(Continued)

*Primary Examiner* — Esaw T Abraham
(74) *Attorney, Agent, or Firm* — Patterson + Sheridan, LLP; Steven H. VerSteeg

(57) ABSTRACT

A method, an apparatus, and a system for data address management in non-volatile memory. Write data is allocated to each of a plurality of multi-level pages configured for storage on a page of a non-volatile memory array. A digest is associated with the write data of one multi-level page based on an attribute for that multi-level page. This attribute differs from the attributes of at least one of the other multi-level pages. An amount of redundancy data to be stored with write data on the multi-level page is reduced to account for the associated digest. A digest may be distributed among a plurality of ECC codewords of a multi-level page. The reduced redundancy data, the digest, and the write data for the multi-level page are stored on the page along with the write data for each of the other multi-level pages of the plurality of multi-level pages.

19 Claims, 23 Drawing Sheets

(56) References Cited

U.S. PATENT DOCUMENTS

| | | | |
|---|---|---|---|
| 6,725,322 B1 | 4/2004 | Shiraishi et al. | |
| 7,237,074 B2 | 6/2007 | Guterman et al. | |
| 8,195,912 B2 | 6/2012 | Flynn et al. | |
| 8,239,619 B2 | 8/2012 | Hung et al. | |
| 8,261,010 B2 | 9/2012 | Eom et al. | |
| 8,407,449 B1 | 3/2013 | Colon et al. | |
| 8,473,690 B1 | 6/2013 | Condict | |
| 8,489,854 B1 | 7/2013 | Colon et al. | |
| 8,880,977 B2* | 11/2014 | Sharon | G11C 29/78 714/763 |
| 8,914,696 B2* | 12/2014 | Chen | G06F 11/106 714/746 |
| 8,935,302 B2 | 1/2015 | Flynn et al. | |
| 9,015,425 B2 | 4/2015 | Flynn et al. | |
| 9,021,343 B1* | 4/2015 | Hu | G11C 11/5671 365/185.11 |
| 9,208,018 B1* | 12/2015 | Northcott | G06F 11/1008 |
| 9,223,662 B2 | 12/2015 | Flynn et al. | |
| 9,424,930 B2 | 8/2016 | Wood et al. | |
| 9,503,125 B2* | 11/2016 | Zhang | H03M 13/1125 |
| 9,594,520 B2 | 3/2017 | Tomlin et al. | |
| 9,645,758 B2 | 5/2017 | Peterson et al. | |
| 9,766,976 B2* | 9/2017 | d'Abreu | H03M 13/2942 |
| 10,133,663 B2 | 11/2018 | Atkisson et al. | |
| 10,877,900 B1 | 12/2020 | Muthiah | |
| 10,896,123 B2 | 1/2021 | Yang et al. | |
| 2005/0270856 A1* | 12/2005 | Earhart | G11B 27/329 |
| 2005/0273551 A1 | 12/2005 | Keays | |
| 2009/0150641 A1 | 6/2009 | Flynn et al. | |
| 2010/0228912 A1 | 9/2010 | Huang et al. | |
| 2010/0332729 A1 | 12/2010 | Alrod et al. | |
| 2012/0239860 A1 | 9/2012 | Atkisson et al. | |
| 2012/0281479 A1 | 11/2012 | Kochar et al. | |
| 2013/0031429 A1 | 1/2013 | Sharon et al. | |
| 2013/0229868 A1 | 9/2013 | Koh et al. | |
| 2015/0074487 A1 | 3/2015 | Patapoutian et al. | |
| 2016/0110252 A1 | 4/2016 | Hyun et al. | |
| 2018/0307558 A1 | 10/2018 | Chen et al. | |
| 2019/0155746 A1 | 5/2019 | Bhatia et al. | |
| 2022/0068423 A1 | 3/2022 | Yang et al. | |

OTHER PUBLICATIONS

Parity bit—Wikipedia, Modified May 9, 2020, [online] Available at: <<https://en.wikipedia.org/w/index.php?title=Parity_bit&oldid=955754073>>, 7 pages.

Code rate—Wikipedia, Modified Feb. 18, 2019, [online] Available at: <<https://en.wikipedia.org/w/index.php?title=Code_rate&oldid=883894995>>, 2 pages.

* cited by examiner

US 11,436,083 B2

DATA ADDRESS MANAGEMENT IN NON-VOLATILE MEMORY

CROSS-REFERENCE TO RELATED APPLICATIONS

This application claims benefit of U.S. Provisional Patent Application Ser. No. 63/074,824, filed Sep. 4, 2020, which is herein incorporated by reference. This application relates to U.S. patent application Ser. No. 16/453,146, filed on Jun. 26, 2019 entitled "ENABLING FASTER AND REGULATED DEVICE INITIALIZATION TIMES," the contents of which are incorporated herein by reference in their entirety, for all purposes. This application relates to U.S. Provisional Patent Application Ser. No. 63/070,681, filed on Aug. 26, 2020 entitled "LEVEL DEPENDENT ERROR CORRECTION CODE PROTECTION IN MULTI-LEVEL NON-VOLATILE MEMORY," the contents of which are incorporated herein by reference in their entirety, for all purposes.

BACKGROUND

As NAND memory cell storage technologies progress from a single bit per memory cell (single level cell or "SLC") to operation with multi-level storage cells (MLCs), tri-level cells (TLCs), and quad-level cells (QLCs), storing two, three, and four bits of data, respectively per memory cell, the number of memory states defined within a voltage range (also referred to as a Vt window) increases exponentially. As a non-volatile memory device is used, memory states may shift over time to higher threshold voltages or lower threshold voltages. Furthermore, the memory states may spread out widening and overlapping with adjacent memory states. These changes can lead to increased errors when reading the data from the multi-level memory cells.

In addition, using QLC memory cells may involve complicated encoding schemes for the four levels of data stored per memory cell. For example, 1-2-6-6, 1-2-4-8, 2-3-5-5, and other encoding schemes may be used, where each number refers to the number of state changes that occur within a memory level, i.e., how many points along that level may see a change from either a "0" to "1" or "1" to "0" memory state. Memory levels where fewer points along the level may be read to ascertain a cell's memory state, may incur a lower bit error rate (BER) than levels on which more points along the level are read to properly sense and read the data for a particular level. Conversely, memory levels where more points along the level (i.e., more memory states) may be read to ascertain a cell's memory state may incur a higher BER than levels on which fewer points along the level are read to properly sense and read the data for a particular level.

One approach to improving error detection and recovery may involve scanning headers from flash management units (FMUs) or Error Correction Code (ECC) codewords. Reading headers to recover from an ungraceful shutdown event, however, can take significant time, particularly when the cells are QLC memory cells. "Ungraceful shutdown event" refers to a situation in which power to a non-volatile storage device is abruptly terminated without warning. This can happen in a power failure, battery power loss, or with certain solid state drive communication protocols such as Secure Digital (SD). Using QLC memory cells can significantly increase the overhead in reading headers, decoding the ECC codewords that include them, and transferring the data between memory die and a storage controller. Initialization operation of open logical erase blocks involving a header scan may take an unacceptably long time. Headers scans may also be performed when data is relocated on non-volatile storage media. When data is relocated, each header of a block may be read to update the address mapping table.

The encoding schemes used for QLC memory cells may increase latency for reading data from certain multi-level pages. This can lead to an unbalanced performance in addition to an imbalance in BER between levels (multi-level pages), even if other tuning has been applied. There is a need for a solution that provides faster header scans for certain QLC memory encoding schemes.

BRIEF SUMMARY

This disclosure relates to a method for data address management in non-volatile memory. Write data may be allocated to each of a plurality of multi-level pages configured for storage on a page of a non-volatile memory array. A digest may be associated with the write data of one multi-level page based on an attribute for that multi-level page. This attribute differs from the attributes of at least one of the other multi-level pages. An amount of redundancy data configured to be stored with write data on the multi-level page is then reduced for the associated digest. Next, the reduced redundancy data, the digest, and the write data for the multi-level page are stored on the page along with the write data for each of the other multi-level pages of the plurality of multi-level pages.

This disclosure further relates to an apparatus for data address management in non-volatile memory. The apparatus comprises a non-volatile memory array, a multi-level page allocator, an address allocator, a header generator, an ECC encoder, and a read/write circuit. The non-volatile memory array comprises Quad-level Cell (QLC) NAND flash memory cells that store a lower multi-level page, a middle multi-level page, an upper multi-level page, and a top multi-level page. The lower multi-level page has higher data integrity than the middle multi-level page, the upper multi-level page, and the top multi-level page. This is due to, at least in part, the multi-level storage cell encoding used to define the multi-level pages. In one embodiment, the lower multi-level page may have higher data integrity because it has fewer memory state transitions or read levels, so there are effectively fewer memory states to sense/read. The multi-level page allocator assigns data blocks to the lower multi-level page, the middle multi-level page, the upper multi-level page, and the top multi-level page. The data blocks comprise write data for a set of write commands. The address allocator determines address information for the assigned data blocks.

The header generator generates headers for flash management units (FMUs). The FMUs include the assigned data blocks. The headers comprise the determined address information. The header generator also generates a digest comprising address information for FMUs assigned to the middle multi-level page, the upper multi-level page, and the top multi-level page. The header generator combines the digest with at least one FMU assigned to the lower multi-level page.

The ECC encoder generates ECC codewords for each FMU assigned to the middle multi-level page, the upper multi-level page, and the top multi-level page. The ECC encoder generates a lower page ECC codeword for each FMU assigned to the lower multi-level page. At least one lower page ECC codeword comprises redundancy data reduced in size proportional to a size of the digest of an associated FMU. The read/write circuit stores the ECC codewords within the middle multi-level page, the upper multi-level page, and the top multi-level page.

The read/write circuit stores the lower page ECC codeword to the lowermulti-level page of the page of the non-volatile memory array.

Finally, this disclosure relates to a system for data address management in non-volatile memory (NVM). The system comprises a NVM array and a storage controller. The NVM array comprises QLC NAND flash memory cells. The storage controller comprises a flash translation layer, a packetizer, an ECC codeword generator, and a read/write circuit. The flash translation layer associates write data from write commands with multi-level pages of QLC memory cells. Each multi-level page is either a lower multi-level page, a middle multi-level page, an upper multi-level page, or a top multi-level page. The flash translation layer also determines address information for the write data of the multi-level pages. The packetizer comprises a header generator that generates a set of headers for FMUs that comprise the write data of the multi-level pages. The header generator also generates an extended header for FMUs configured to be stored on the lower multi-level page. The extended header comprises a digest that includes address information for write data configured to be stored on the middle multi-level page, the upper multi-level page, and the top multi-level page.

The ECC codeword generator generates ECC codewords for the flash management units that comprise the write data of the middle multi-level page, the upper multi-level page, and the top multi-level page. The ECC codeword generator also generates lower page ECC codewords for the FMUs that comprise the write data of the lower multi-level page. The lower page ECC codewords may have a lower ECC strength than the ECC codewords for the FMUs that comprise the write data of the middle multi-level page, the upper multi-level page, and the top multi-level page. Rather than use ECC codewords having a default ECC strength for the lower multi-level page, lower page ECC codewords may be used with the lower multi-level page because the lower multi-level page has the fewest number of memory state transitions, thus a fewest number of read levels. The lower multi-level page may have a fewest number of memory states that impact the reading and sensing of data of the lower multi-level page. In one embodiment, the lower multi-level page receives the lower page ECC codewords. In another embodiment, the lower page ECC codewords may be stored on another multi-level page having the fewest number of memory state transitions, a fewest number of read levels, which depending on the multi-level storage cell encoding could be the top multi-level page, upper multi-level page, middle multi-level page, or lower multi-level page.

The read/write circuit stores the ECC codewords on the middle multi-level page, the upper multi-level page, and the top multi-level page and stores the lower page ECC codewords on the lower multi-level page of a page of the non-volatile memory array.

BRIEF DESCRIPTION OF THE SEVERAL VIEWS OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To easily identify the discussion of any particular element or act, the most significant digit or digits in a reference number refer to the figure number in which that element is first introduced.

DETAILED DESCRIPTION

The solution described herein directs data to multi-level pages in a way that leverages the imbalance in bit error rate (BER) across the page levels to store address information for all multi-level pages on a multi-level page that has the lowest BER and is fastest to read. The address information for all multi-level pages in the page may be stored in a digest. The leveraging may involve adjusting the coding rate on the multi-level page that has the digest. This involves implementing an error correction code (ECC) encoder that manages ECC codewords having parity sections with variable parity size.

"Bit error rate" refers to a measure of a number of bits in error of a total overall number of bits processed. Depending on the use case, a bit error rate may be calculated either before, or after, an ECC decoder has made one or more attempts to correct one or more bits in error.

"ECC codeword" or "codeword" refers to data and corresponding error detection and/or correction information, (e.g., parity information or redundancy information). In certain embodiments the data of an ECC codeword may be referred to as a payload and the error detection and/or correction information may be referred to as parity. ECC codewords may comprise any suitable error-correcting encoding, including, but not limited to, block ECC encoding, convolutional ECC encoding, Low-Density Parity-Check (LDPC) encoding, Gallager encoding, Reed-Solomon encoding, Hamming codes, Multidimensional parity encoding, cyclic error-correcting codes, BCH codes, and/or the like.

Figure 1:
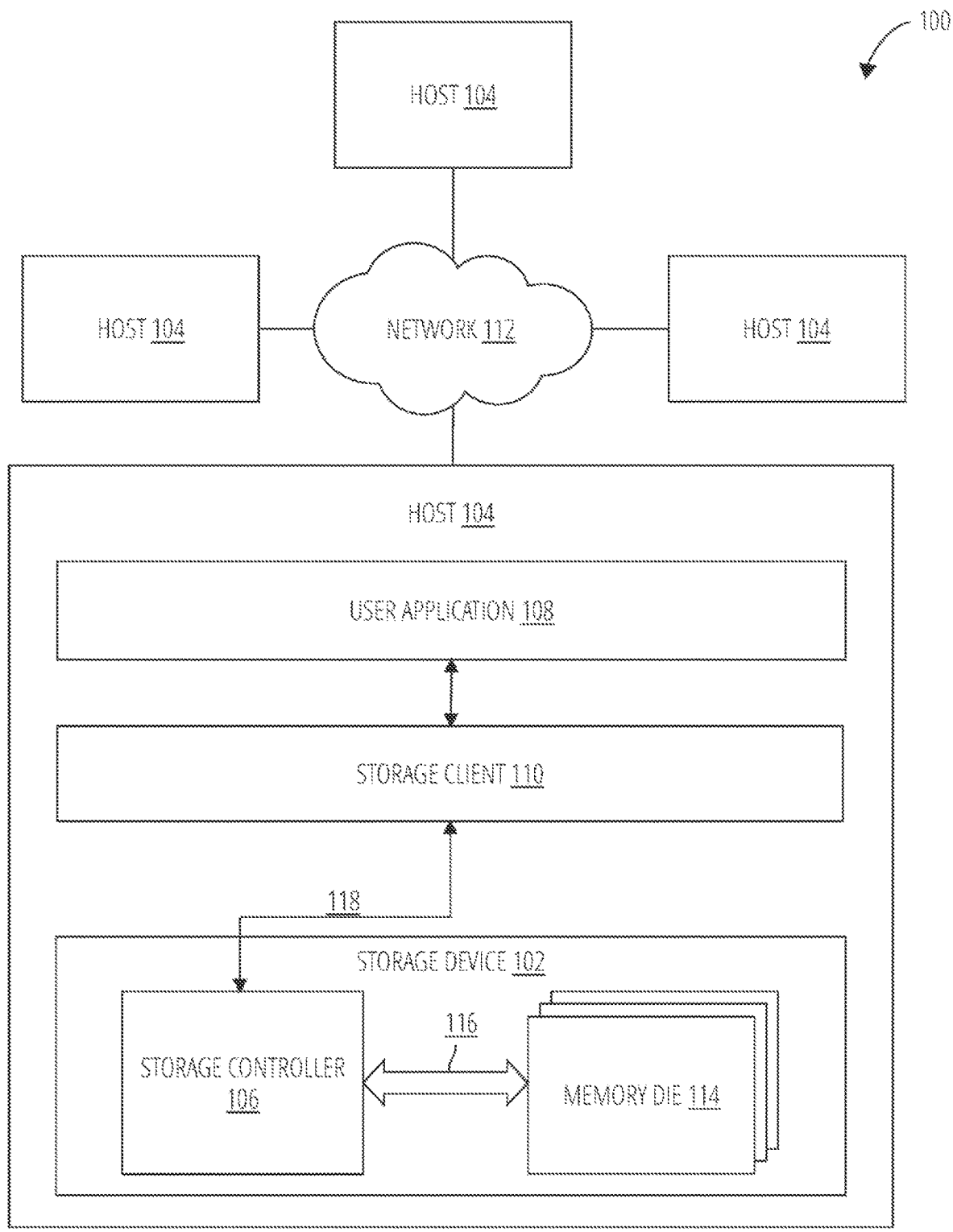
FIG. 1 illustrates a storage system 100 in accordance with one embodiment.

FIG. 1 is a schematic block diagram illustrating one embodiment of a storage system 100 that includes a storage device in accordance with the disclosed solution. The storage system 100 comprises a storage device 102, a storage controller 106, a memory die 114, at least one host 104, a user application 108, a storage client 110, a data bus 118, a bus 116, and a network 112. "Host" refers to any computing device or computer device or computer system configured to send and receive storage commands. Examples of a host include, but are not limited to, a computer, a laptop, a mobile device, an appliance, a virtual machine, an enterprise server, a desktop, a tablet, a main frame, and the like. "Storage command" refers to any command relating with a storage operation. Examples of storage commands include, but are not limited to, read commands, write commands, maintenance commands, configuration command, administration command, diagnostic commands, test mode commands, countermeasure command, and any other command a storage controller may receive from a host or issue to another component, device, or system.

"Read command" refers to a type of storage command that reads data from memory cells. "Write command" refers to a storage command or memory command configured to direct the recipient to write, or store, one or more data blocks on a persistent storage media, such as a hard disk drive, non-volatile memory media, or the like. A write command may include any storage command that may result in data being written to physical storage media of a storage device. The write command may include enough data to fill one or more data blocks, or the write command may include enough data to fill a portion of one or more data blocks. In one embodiment, a write command includes a starting LBA and a count indicating the number of LBAs of data to write to on the storage media.

"Logical block address" refers to a value used in a block storage device to associate n logical blocks available for user data storage across the storage media with an address. In certain block storage devices, the logical block addresses (LBAs) may range from 0 to n per volume or partition. In conventional block storage devices, LBA maps directly to a particular block, and each block maps to a particular set of physical sectors on the storage media. "Physical block address" refers to address information that uniquely identifies a physical location of a data block relative to all other data blocks of a non-volatile memory array.

"User data" refers to data that a host directs a non-volatile storage device to store or record.

The storage system 100 includes at least one storage device 102, comprising a storage controller 106 and one or more memory dies 114, connected by a bus 116. "Storage controller" refers to any hardware, device, component, element, or circuit configured to manage data operations on non-volatile memory media, and may comprise one or more processors, programmable processors (e.g., FPGAs), ASICs, micro-controllers, or the like. In some embodiments, the storage controller is configured to store data on and/or read data from non-volatile memory media, to transfer data to/from the non-volatile memory device(s), and so on.

"Non-volatile memory array" refers to a set of non-volatile storage cells (also referred to as memory cells or non-volatile memory cells) organized into an array structure having rows and columns. A non-volatile memory array is addressable using a row identifier and a column identifier.

In certain embodiments, the non-volatile memory array may comprise a three-dimensional memory array. A three-dimensional (3-D) memory array extends up from the wafer surface/substrate and generally includes stacks, or columns, of memory cells extending upwards, in a z-direction. In a 3-D memory array word lines comprise layers stacked one on the other as the memory array extends upwards. Various 3-D arrangements are possible. In one arrangement a NAND string is formed vertically with one end (e.g., source) at the wafer surface and the other end (e.g., drain) on top.

"Memory cell" refers to a type of storage media configured to represent one or more binary values by way of a determinable physical characteristic of the storage media when the storage media is sensed, read, or detected to determine what binary value(s) was last stored in the memory cell. Memory cell and storage cell are used interchangeably herein.

A memory array is addressable using a row identifier and a column identifier. "Storage cell" refers to a type of storage media configured to represent one or more binary values by way of a determinable characteristic of the storage media when the storage media is sensed, read, or detected to determine a binary value(s) stored, or represented by, the determinable characteristic of the memory cell. Storage cell and memory cell are used interchangeably herein.

The type of determinable characteristic used to store data in a memory cell may vary depending on the type of memory or storage technology used. For example, in flash memory cells in which each memory cell comprises a transistor having a source lead, a drain lead and a gate, the determinable characteristic is a voltage level that when applied to the gate causes the memory cell to conduct a current between the drain and the source leads. The voltage level, in this example, is referred to herein as a threshold voltage. A threshold voltage may also be referred to as a control gate reference voltage (CGRV), read voltage, or reference voltage.

Examples of the determinable physical characteristic include, but are not limited to, a threshold voltage for a transistor, an electrical resistance level of a memory cell, a current level through a memory cell, a magnetic pole orientation, a spin-transfer torque, and the like.

"Non-volatile memory media" refers to any hardware, device, component, element, or circuit configured to maintain an alterable physical characteristic used to represent a binary value of zero or one after a primary power source is removed. Examples of the alterable physical characteristic include, but are not limited to, a threshold voltage for a transistor, an electrical resistance level of a memory cell, a current level through a memory cell, a magnetic pole orientation, a spin-transfer torque, and the like.

The alterable physical characteristic is such that, once set, the physical characteristic stays sufficiently fixed such that when a primary power source for the non-volatile memory media is unavailable the alterable physical characteristic can be measured, detected, or sensed, when the binary value is read, retrieved, or sensed. Said another way, non-volatile memory media is a storage media configured such that data stored on the non-volatile memory media is retrievable after a power source for the non-volatile memory media is removed and then restored. Non-volatile memory media may comprise one or more non-volatile memory elements, which may include, but are not limited to: chips, packages, planes, memory die, and the like.

Examples of non-volatile memory media include but are not limited to: ReRAM, Memristor memory, programmable metallization cell memory, phase-change memory (PCM, PCME, PRAM, PCRAM, ovonic unified memory, chalcogenide RAM, or C-RAM), NAND FLASH memory (e.g., 2D NAND FLASH memory, 3D NAND FLASH memory), NOR FLASH memory, nano random access memory (nano RAM or NRAM), nanocrystal wire-based memory, silicon-oxide based sub-10 nanometer process memory, grapheme memory, Silicon-Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like.

While the non-volatile memory media is referred to herein as "memory media," in various embodiments, the non-volatile memory media may more generally be referred to as non-volatile memory. Because non-volatile memory media is capable of storing data when a power supply is removed, the non-volatile memory media may also be referred to as a recording media, non-volatile recording media, non-volatile storage media, storage, non-volatile memory, non-volatile memory medium, non-volatile storage medium, non-volatile storage, or the like. "Non-volatile storage media" refers to any hardware, device, component, element, or circuit configured to maintain an alterable physical characteristic used to represent a binary value of zero or one after a primary power source is removed. Non-volatile storage media may be used interchangeably herein with the term non-volatile memory media.

In certain embodiments, data stored in non-volatile memory media is addressable at a block level which means that the data in the non-volatile memory media is organized into data blocks that each have a unique logical address (e.g., LBA). In other embodiments, data stored in non-volatile memory media is addressable at a byte level which means that the data in the non-volatile memory media is organized into bytes (8 bits) of data that each have a unique address, such as a logical address. One example of byte addressable non-volatile memory media is storage class memory (SCM).

In some embodiments, each storage device 102 may include two or more memory dies 114, such as flash memory, nano random-access memory ("nano RAM or NRAM"), magneto-resistive RAM)("MRAM"), dynamic RAM ("DRAM"), phase change RAM ("PRAM"), etc. In further embodiments, the data storage device 102 may include other types of non-volatile and/or volatile data storage, such as dynamic RAM ("DRAM"), static RAM ("SRAM"), magnetic data storage, optical data storage, and/or other data storage technologies.

The storage device 102 may be a component within a host 104 as depicted in here, and may be connected using a data bus 118, such as a peripheral component interconnect express ("PCI-e") bus, a Serial Advanced Technology Attachment ("serial ATA") bus, or the like. In another embodiment, the storage device 102 is external to the host 104 and is connected, a universal serial bus ("USB") connection, an Institute of Electrical and Electronics Engineers ("IEEE") 1394 bus ("FireWire"), or the like. In other embodiments, the storage device 102 is connected to the host 104 using a peripheral component interconnect ("PCI") express bus using external electrical or optical bus extension or bus networking solution such as InfiniBand or PCI Express Advanced Switching ("PCIe-AS"), or the like.

In various embodiments, the storage device 102 may be in the form of a dual-inline memory module ("DIMM"), a daughter card, or a micro-module. In another embodiment, the storage device 102 is a component within a rack-mounted blade. In another embodiment, the storage device 102 is contained within a package that is integrated directly onto a higher-level assembly (e.g., mother board, laptop, graphics processor). In another embodiment, individual components comprising the storage device 102 are integrated directly onto a higher-level assembly without intermediate packaging. The storage device 102 is described in further detail with regard to FIG. 2.

"Processor" refers to any circuitry, component, chip, die, package, or module configured to receive, interpret, decode, and execute machine instructions. Examples of a processor may include, but are not limited to, a central processing unit, a general-purpose processor, an application-specific processor, a graphics processing unit (GPU), a field programmable gate array (FPGA), Application Specific Integrated Circuit (ASIC), System on a Chip (SoC), virtual processor, processor core, and the Ike. "Circuitry" refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

In a further embodiment, instead of being connected directly to the host 104 as DAS, the data storage device 102 may be connected to the host 104 over a data network. For example, the data storage device 102 may include a storage area network ("SAN") storage device, a network attached storage ("NAS") device, a network share, or the like. In one embodiment, the storage system 100 may include a data network, such as the Internet, a wide area network ("WAN"), a metropolitan area network ("MAN"), a local area network ("LAN"), a token ring, a wireless network, a fiber channel network, a SAN, a NAS, ESCON, or the like, or any combination of networks. A data network may also include a network from the IEEE 802 family of network technologies, such Ethernet, token ring, Wi-Fi, Wi-Max, and the like. A data network may include servers, switches, routers, cabling, radios, and other equipment used to facilitate networking between the host 104 and the data storage device 102.

The storage system 100 includes at least one host 104 connected to the storage device 102. Multiple hosts 104 may be used and may comprise a server, a storage controller of a storage area network ("SAN"), a workstation, a personal computer, a laptop computer, a handheld computer, a supercomputer, a computer duster, a network switch, router, or appliance, a database or storage appliance, a data acquisition or data capture system, a diagnostic system, a test system, a robot, a portable electronic device, a wireless device, or the like. In another embodiment, a host 104 may be a client, and the storage device 102 may operate autonomously to service data requests sent from the host 104. In this embodiment, the host 104 and storage device 102 may be connected using a computer network, system bus, Direct Attached Storage (DAS), or other communication means suitable for connection between a computer and an autonomous storage device 102.

The depicted embodiment shows a user application 108 in communication with a storage client 110 as part of the host 104. In one embodiment, the user application 108 is a software application operating on or in conjunction with the storage client 110. "Storage client" refers to any hardware, software, firmware, or logic component or module configured to communicate with a storage device in order to use storage services. Examples of a storage client include, but are not limited to, operating systems, file systems, database applications, a database management system ("DBMS"), server applications, a server, a volume manager, kernel-level processes, user-level processes, applications, mobile applications, threads, processes, and the like.

"Software" refers to logic implemented as processor-executable instructions in a machine memory (e.g., read/write volatile memory media or non-volatile memory media).

"Hardware" refers to functional elements embodied as analog and/or digital circuitry.

"Firmware" refers to logic embodied as processor-executable instructions stored on volatile memory media and/or non-volatile memory media.

"Logic" refers to machine memory circuits, non-transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

The storage client 110 manages files and data and utilizes the functions and features of the storage controller 106 and associated memory dies 114. Representative examples of storage clients include, but are not limited to, a server, a file system, an operating system, a database management system ("DBMS"), a volume manager, and the like. The storage client 110 is in communication with the storage controller 106 within the storage device 102. In some embodiments, the storage client 110 may include remote storage clients operating on hosts 104 or otherwise accessible via the network 112. Storage clients may include, but are not limited to operating systems, file systems, database applications, server applications, kernel-level processes, user-level processes, applications, and the like.

In one embodiment, the storage system 100 includes one or more clients connected to one or more hosts 104 through one or more computer networks 112. A host 104 may be a server, a storage controller of a SAN, a workstation, a personal computer, a laptop computer, a handheld computer, a supercomputer, a computer cluster, a network switch, router, or appliance, a database or storage appliance, a data acquisition or data capture system, a diagnostic system, a test system, a robot, a portable electronic device, a wireless device, or the like. The network 112 may include the Internet, a wide area network ("WAN"), a metropolitan area network ("MAN"), a local area network ("LAN"), a token ring, a wireless network, a fiber channel network, a SAN, network attached storage ("NAS"), ESCON, or the like, or any combination of networks. The network 112 may also include a network from the IEEE 802 family of network technologies, such Ethernet, token ring, WiFi, WiMax, and the like.

The network 112 may include servers, switches, routers, cabling, radios, and other equipment used to facilitate networking the host 104 or hosts 104 and clients. In one embodiment, the storage system 100 includes multiple hosts 104 that communicate as peers over a network 112. In another embodiment, the storage system 100 includes multiple storage devices 102 that communicate as peers over a network 112. One of skill in the art will recognize other computer networks comprising one or more computer networks and related equipment with single or redundant connection between one or more clients or other computer with one or more storage devices 102 connected to one or more hosts. In one embodiment, the storage system 100 includes two or more storage devices 102 connected through the network 112 to a remote host 104, without being directly connected to or integrated within a local host 104.

In one embodiment, the storage client 110 communicates with the storage controller 106 through a host interface comprising an Input/Output (I/O) interface. For example, the storage device 102 may support the ATA interface standard, the ATA Packet Interface ("ATAPI") standard, the small computer system interface ("SCSI") standard, and/or the Fibre Channel standard which are maintained by the InterNational Committee for Information Technology Standards ("INCITS").

In certain embodiments, the storage media of a memory device is divided into volumes or partitions. Each volume or partition may include a plurality of sectors. Traditionally, a sector is 512 bytes of data. One or more sectors are organized into a block (referred to herein as both block and data block, interchangeably). "Data block" refers to a smallest physical amount of storage space on physical storage media that is accessible, and/or addressable, using a storage command. The physical storage media may be volatile memory media, non-volatile memory media, persistent storage, non-volatile storage, flash storage media, hard disk drive, or the like.

Certain conventional storage devices divide the physical storage media into volumes or logical partitions (also referred to as partitions). Typically, a single data block maps to a set of sectors. Each volume or logical partition may include a plurality of sectors. In certain embodiments, a single data sector may be organized into a block (also referred to as a data block).

In certain storage systems, such as those interfacing with the Windows® operating systems, the data blocks are referred to as clusters. In other storage systems, such as those interfacing with UNIX, Linux, or similar operating systems, the data blocks are referred to simply as blocks. A data block or cluster represents a smallest physical amount of storage space on the storage media that is managed by a storage controller.

A block storage device may associate n data blocks available for user data storage across the physical storage media with a logical block address (LBA), numbered from 0 to n. In certain block storage devices, the logical block addresses may range from 0 to n per volume or logical partition. In conventional block storage devices, a logical block address maps directly to one data block.

In some embodiments, the storage controller 106 may be configured to store data on one or more asymmetric, write-once storage media, such as solid-state storage memory cells within the memory die 114. "Write once storage media" refers to a storage media such as a storage cell that is reinitialized (e.g., erased) before new data or a change to the data is written or programmed thereon. In other words, data of a write once storage media cannot be overwritten; the write once storage media is erased before subsequently writing data to the write once storage media. "Asymmetric storage media" refers to a storage media having different latencies for different storage operations. Many types of solid-state storage media (e.g., memory dies) are asymmetric; for example, a read operation may be much faster than a write/program operation, and a write/program operation may be much faster than an erase operation (e.g., reading the storage media may be hundreds of times faster than erasing, and tens of times faster than programming the storage media). "Read operation" refers to an operation performed on a memory cell in order to obtain, sense, detect, or determine a value for data represented by a state characteristic of the memory cell.

"Program" refers to a storage operation in which a characteristic of a memory cell is changed from a first state (often, an erased state) to a second state. A program storage operation may also be referred to as a write operation herein.

In certain embodiments, a program storage operation may include a series of iterations that incrementally change the characteristic until at least a target level of change is achieved. In other embodiments, a program storage operation may cause the attribute to change to a target level with a single iteration.

The memory die 114 may be partitioned into memory divisions that can be erased as a group (e.g., erase blocks) in order to, inter alia, account for the asymmetric properties of the memory die 114 or the like. As such, modifying a single data segment in-place may involve erasing the entire erase block comprising the data, and rewriting the modified data to the erase block, along with the original, unchanged data. This may result in inefficient write amplification, which may excessively wear the memory die 114.

"Erase block" refers to a logical erase block or a physical erase block. In one embodiment, a physical erase block represents the smallest storage unit within a given memory die that can be erased at a given time (e.g., due to the wiring of storage cells on the memory die). In one embodiment, logical erase blocks represent the smallest storage unit, or storage block, erasable by a storage controller in response to receiving an erase command. In such an embodiment, when the storage controller receives an erase command specifying a particular logical erase block, the storage controller may erase each physical erase block within the logical erase block simultaneously. It is noted that physical erase blocks within a given logical erase block may be considered as contiguous within a physical address space even though they reside in separate dies. Thus, the term "contiguous" may be applicable not only to data stored within the same physical medium, but also to data stored within separate media.

Therefore, in some embodiments, the storage controller 106 may be configured to write data out-of-place. As used herein, writing data "out-of-place" refers to writing data to different media storage location(s) rather than overwriting the data "in-place" (e.g., overwriting the original physical location of the data). Modifying data out-of-place may avoid write amplification, since existing, valid data on the erase block with the data to be modified need not be erased and recopied. Moreover, writing data out-of-place may remove erasure from the latency path of many storage operations (e.g., the erasure latency is no longer part of the critical path of a write operation). "Storage operation" refers to an operation performed on a memory cell in order to change, or obtain, the value of data represented by a state characteristic of the memory cell. Examples of storage operations include but are not limited to reading data from (or sensing a state of) a memory cell, writing (or programming) data to a memory cell, and/or erasing data stored in a memory cell.

Management of a data block by a storage manager includes specifically addressing a particular data block for a read operation, write operation, or maintenance operation. "Maintenance operation" refers to an operation performed on a non-volatile storage device that is configured, designed, calibrated, or arranged to improve or extend the life of the non-volatile storage device and/or data stored thereon.

A block storage device may associate n blocks available for user data storage across the storage media with a logical address, numbered from 0 to n. In certain block storage devices, the logical addresses may range from 0 to n per volume or partition. "Logical address" refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like. A logical address does not indicate the physical location of data on the storage media but is an abstract reference to the data.

In conventional block storage devices, a logical address maps directly to a particular data block on physical storage media. In conventional block storage devices, each data block maps to a particular set of physical sectors on the physical storage media. However, certain storage devices do not directly or necessarily associate logical addresses with particular physical data blocks. These storage devices may emulate a conventional block storage interface to maintain compatibility with a block storage client 110.

In one embodiment, the storage controller 106 provides a block I/O emulation layer, which serves as a block device interface, or API. In this embodiment, the storage client 110 communicates with the storage device through this block device interface. In one embodiment, the block I/O emulation layer receives commands and logical addresses from the storage client 110 in accordance with this block device interface. As a result, the block I/O emulation layer provides the storage device compatibility with a block storage client 110.

In one embodiment, a storage client 110 communicates with the storage controller 106 through a host interface comprising a direct interface. In this embodiment, the storage device directly exchanges information specific to non-volatile storage devices. "Non-volatile storage device" refers to any hardware, device, component, element, or circuit configured to maintain an alterable physical characteristic used to represent a binary value of zero or one after a primary power source is removed. Examples of a non-volatile storage device include, but are not limited to, a hard disk drive (HDD), Solid-State Drive (SSD), non-volatile memory media, and the like.

A storage device using direct interface may store data in the memory die 114 using a variety of organizational constructs including, but not limited to, blocks, sectors, pages, logical blocks, logical pages, erase blocks, logical erase blocks, ECC codewords, logical ECC codewords, or in any other format or structure advantageous to the technical characteristics of the memory die 114, "Characteristic" refers to any property, trait, quality, or attribute of an object or thing. Examples of characteristics include, but are not limited to, condition, readiness for use, unreadiness for use, size, weight, composition, feature set, and the like.

The storage controller 106 receives a logical address and a command from the storage client 110 and performs the corresponding operation in relation to the memory die 114. The storage controller 106 may support block I/O emulation, a direct interface, or both.

Figure 2:
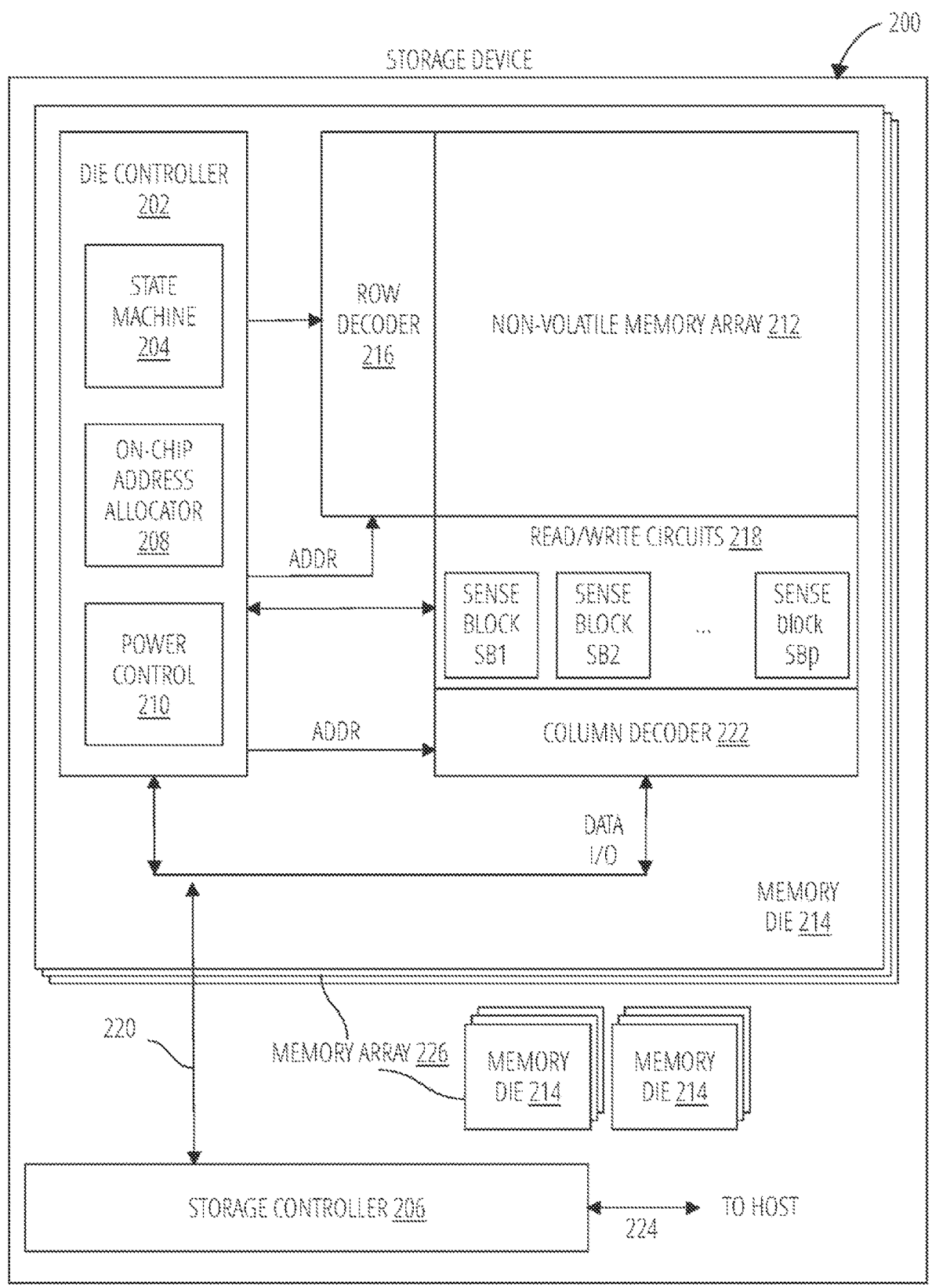
FIG. 2 illustrates a storage device 200 in accordance with one embodiment.

FIG. 2 is a block diagram of an exemplary storage device 200. "Storage device" refers to any hardware, system, subsystem, circuit, component, module, non-volatile memory media, hard disk drive, storage array, device, or apparatus configured, programmed, designed, or engineered to store data for a period of time and retain the data in the storage device while the storage device is not using power from a power supply. Examples of storage devices include, but are not limited to, a hard disk drive, FLASH memory, MRAM memory, a Solid-State storage device, Just a Bunch Of Disks (JBOD), Just a Bunch Of Flash (JBOF), an external hard disk, an internal hard disk, and the like.

The storage device 200 may include a storage controller 206 and a memory array 226. Each memory die 214 in the memory array 226 may include a die controller 202, at least one non-volatile memory array 212 in the form of a three-dimensional array and read/write circuits 218.

"Die controller" refers to a set of circuits, circuitry, logic, or components configured to manage the operation of a die. In one embodiment, the die controller is an integrated circuit. In another embodiment, the die controller is a combination of discrete components. In another embodiment, the die controller is a combination of one or more integrated circuits and one or more discrete components.

"Three-dimensional memory array" refers to a physical arrangement of components of a memory array which contrasts with a two-dimensional (2-D) memory array. 2-D memory arrays are formed along a planar surface of a semiconductor wafer or other substrate. A three-dimensional (3-D) memory array extends up from the wafer surface/substrate and generally includes stacks, or columns, of memory cells extending upwards, in a z-direction. In a 3-D memory array word lines comprise layers stacked one on the other as the memory array extends upwards. Various 3-D arrangements are possible. In one arrangement a NAND string is formed vertically with one end (e.g., source) at the wafer surface and the other end (e.g., drain) on top. "Threshold voltage" refers to a voltage level that when applied to a gate electrode of a transistor causes the transistor to conduct a current between the drain electrode and source electrode.

Consequently, a non-volatile memory array is a memory array having memory cells configured such that a characteristic (e.g., threshold voltage level, resistance level, conductivity, etc.) of the memory cell used to represent stored data remains a property of the memory cell without a requirement for using a power source to maintain the characteristic.

A memory array is addressable using a row identifier and a column identifier. Those of skill in the art recognize that a memory array may comprise the set of memory cells within a plane, the set of memory cells within a memory die, the set of memory cells within a set of planes, the set of memory cells within a set of memory die, the set of memory cells within a memory package, the set of memory cells within a set of memory packages, or with other known memory cell set architectures and configurations.

A memory array may include a set of memory cells at a number of levels of organization within a storage or memory system. In one embodiment, memory cells within a plane may be organized into a memory array. In one embodiment, memory cells within a plurality of planes of a memory die may be organized into a memory array. In one embodiment, memory cells within a plurality of memory dies of a memory device may be organized into a memory array. In one embodiment, memory cells within a plurality of memory devices of a storage system may be organized into a memory array.

The non-volatile memory array 212 is addressable by word line via a row decoder 216 and by bit line via a column decoder 222. "Bit line" refers to a circuit structure configured to deliver a voltage and/or conduct current to a column of a memory array. "Word line" refers to a structure within a memory array comprising a set of memory cells. The memory array is configured such that the operational memory cells of the word line are read or sensed during a read operation. Similarly, the memory array is configured such that the operational memory cells of the word line are read, or sensed, during a read operation. A word line may also be referred to as a physical page or page for short.

In one embodiment, the column comprises a NAND string or memory string and may also be referred to as channel. In one embodiment, the column is referred to as a NAND string and the NAND string comprises a channel. In one embodiment, a bit line connects to a NAND string at a drain end or drain side of the NAND string. A memory array may have one bit line for each memory cell along the word lines of the memory array.

"Channel" refers to a structure within a memory array that extends from a source side to a drain side. In one embodiment, a channel is a vertical column within a memory array that forms a conductive path between a source line coupled to one end of a NAND string and a bit line coupled to another end of the NAND string. A channel may be formed from a variety of materials including, for example, polysilicon.

In one embodiment, a channel within a NAND string creates a conductive path by activating one or more memory cells (e.g., one or more selected memory cells and unselected memory cells) along the NAND string, and one or more control structures (e.g., select gates (source and/or drain) between a source line connected to one end (e.g., the source side) of the NAND string and a sense amplifier or bit line connected to the other end (e.g., the drain side) of the NAND string.

"Select gate" refers to a transistor structurally and/or electrically configured to function as a switch to electrically connect a first electrical structure connected to a source terminal of the transistor to a second electrical structure connected to the drain terminal. When functioning as a switch, the transistor is referred to herein as a 'select gate' and serves to gate (selectively) or control when, and in what quantity, a current flows or a voltage passes between the first electrical structure and the second electrical structure. Depending on the context, references to select gate herein may refer to the whole transistor or to the gate terminal of the transistor.

The read/write circuits 218 include multiple sense blocks SB1, SB2, . . . , SBp (sensing circuitry) and allow a page of memory cells to be read or programmed in parallel. In certain embodiments, each memory cell across a row of the memory array together form a physical page, "Read/write circuit" refers to a device, component, element, module, system, sub-system, circuitry, logic, hardware, or circuit configured and/or operational to read data from and write data to a storage media, such as storage cells of a storage array.

A physical page may include memory cells along a row of the memory array for a single plane or for a single memory die. In one embodiment, the memory die includes a memory array made up of two equal sized planes. In one embodiment, a physical page of one plane of a memory die includes four data blocks (e.g., 16 KB). In one embodiment, a physical page (also called a "die page") of a memory die includes two planes each having four data blocks (e.g., 32 KB).

Commands and data are transferred between the host 104 and storage controller 206 via a data bus 224, and between the storage controller 206 and the one or more memory dies 214 via bus 220. The storage controller 206 may comprise the logical modules described in more detail with respect to FIG. 1.

The non-volatile memory array 212 can be two-dimensional (2D—laid out in a single fabrication plane) or three-dimensional (3D—laid out in multiple fabrication planes), The non-volatile memory array 212 may comprise one or more arrays of memory cells including a 3D array. In one embodiment, the non-volatile memory array 212 may comprise a monolithic three-dimensional memory structure (3D array) in which multiple memory levels are formed above (and not in) a single substrate, such as a wafer, with no intervening substrates. The non-volatile memory array 212 may comprise any type of non-volatile memory that is monolithically formed in one or more physical levels of arrays of memory cells having an active area disposed above a silicon substrate. The non-volatile memory array 212 may be in a non-volatile solid-state drive having circuitry associated with the operation of the memory cells, whether the associated circuitry is above or within the substrate.

Word lines may comprise sections of the layers containing memory cells, disposed in layers above the substrate. Multiple word lines may be formed on single layer by means of trenches or other non-conductive isolating features.

The die controller 202 cooperates with the read/write circuits 218 to perform memory operations on memory cells of the non-volatile memory array 212, and includes a state machine 204, an address allocator 208, and a power control 210. The state machine 204 provides chip level control of memory operations.

The address allocator 208 provides an address interface between that used by the host or a storage controller 206 to the hardware address used by the row decoder 216 and column decoder 222. The power control 210 controls the power and voltages supplied to the various control lines during memory operations. "Control line" refers to a structure, circuit, circuitry, and/or associated logic configured to convey an electrical current and/or voltage from a source to a destination. In certain embodiments, analog voltages, currents, biases, and/or digital signals supplied or discharged over a control line are used to control switches, select gates, and/or other electrical components. Certain control lines may have a specific name based on what parts of a circuit the control line controls or where the control line couples, or connects, to other circuits. Examples of named control lines include word lines, bit lines, source control lines, drain control lines, and the like.

"Source control line" refers to a control line configured to operate a select gate (e.g., turn the select gate on, activate, and off, deactivate) for coupling a source side of a NAND string to a source line and/or another circuit.

"Source side" refers to the end of a NAND string or side of a three-dimensional memory array connected to the source layer or line on a memory die. The term comes from the source terminal of a field effect transistor or similar component. In a daisy-chained string of transistors, the source terminal of the first transistor may be connected to a source line, a ground or some other lower voltage line, and the drain terminal may be connected to the source terminal of the next transistor, that transistor's drain terminal may be connected to the next source terminal and so on, with the drain terminal of the final transistor connected to a higher voltage signal or power line. The gate terminal of each transistor may then control whether or not current flows through the transistor from source to drain, and through the string from source line to bit line.

"Source line" refers to a structure, circuit, circuitry, and/or associated logic configured to convey an electrical current and/or voltage from a supply to one or more channels of associated NAND strings. In certain embodiments, a source line is configured to convey a voltage to, and/or discharge a voltage from multiple NAND strings concurrently. In other embodiments, a source line is configured to convey a voltage to, and/or discharge a voltage from multiple NAND strings in series.

In certain embodiments, a source control line couples to one or more source-side select gates that are between the source line and one or more NAND strings and the source control line manages whether voltage or current passes between the source line and the NAND string. In such an embodiment, the source line may also be referred to as a common source line.

"Source-side select gate" refers to a select gate functioning as a switch to electrically connect a source line to a NAND string and/or a channel of a NAND string. Examples of source lines include source-side select gates, dummy word line select gates, and the like. In certain embodiments, a source-side select gate may comprise just source-side select gates (e.g., SGS0, SGS1, etc.). In other embodiments, a source-side select gate may comprise just dummy word line select gates (e.g., DWLS0, DWLS1, etc.). In still other embodiments, a source-side select gate may comprise both source-side select gates (e.g., SGS0, SGS1, etc.) and dummy word line select gates (e.g., DWLS0, DWLS1, etc.). A select gate positioned between the source line and the NAND string on the source side of the NAND string is referred to as a source-side select gate.

"Drain control line" refers to a control line configured to operate a select gate (e.g., turn the select gate on, activate, and off, deactivate) for coupling a drain side of a NAND string to a bit line and/or a sense circuit. "Drain side" refers to the end of a NAND string or side of a three-dimensional memory array connected to the bit line(s). The term comes from the drain terminal of a field effect transistor or similar component. In a daisy-chained string of transistors, the source terminal of the first transistor may be connected to a source line, a ground or some other lower voltage line, and the drain terminal may be connected to the source terminal of the next transistor, that transistors drain terminal may be connected to the next source terminal and so on, with the drain terminal of the final transistor connected to a higher voltage signal or power line. The gate terminal of each transistor may then control whether or not current flows through the transistor from source to drain, and through the string from source line to bit line.

"Drain-side select gate" refers to a select gate functioning as a switch to electrically connect a bit line to a NAND string and/or a channel of a NAND string. A select gate positioned between the bit line and the NAND string on the drain side of the NAND string is referred to as a drain-side select gate.

The power control 210 and/or read/write circuits 218 can include drivers for word lines, source gate select (SGS) transistors, drain gate select (DGS) transistors, bit lines, substrates (in 2D memory structures), charge pumps, and source lines. In certain embodiments, the power control 210 may detect a sudden loss of power and take precautionary actions. The power control 210 may include various first voltage generators (e.g., the drivers) to generate the voltages described herein. The sense blocks can include bit line drivers and sense amplifiers in one approach.

In some implementations, some of the components can be combined. In various designs, one or more of the components (alone or in combination), other than non-volatile memory array 212, can be thought of as at least one control circuit or storage controller which is configured to perform the techniques described herein. For example, a control circuit may include any one of, or a combination of, die controller 202, state machine 204, address allocator 208, column decoder 222, power control 210, sense blocks SB1, SB2, . . . , SBp, read/write circuits 218, storage controller 206, and so forth.

In one embodiment, the host 104 is a computing device (e.g., laptop, desktop, smartphone, tablet, digital camera) that includes one or more processors, one or more processor readable storage devices (RAM, ROM, FLASH memory, hard disk drive, solid state memory) that store processor readable code (e.g., software) for programming the storage controller 206 to perform the methods described herein. The host may also include additional system memory, one or more input/output interfaces and/or one or more input/output devices in communication with the one or more processors, as well as other components well known in the art.

Associated circuitry is typically involved in operation of the memory cells and for communication with the memory cells. As non-limiting examples, memory devices may have circuitry used for controlling and driving memory cells to accomplish functions such as programming and reading. This associated circuitry may be on the same substrate as the memory cells and/or on a separate substrate. For example, a storage controller for memory read-write operations may be located on a separate storage controller chip and/or on the same substrate as the memory cells.

One of skill in the art will recognize that the disclosed techniques and devices are not limited to the two-dimensional and three-dimensional exemplary structures described but covers all relevant memory structures within the spirit and scope of the technology as described herein and as understood by one of skill in the art.

Figure 3:
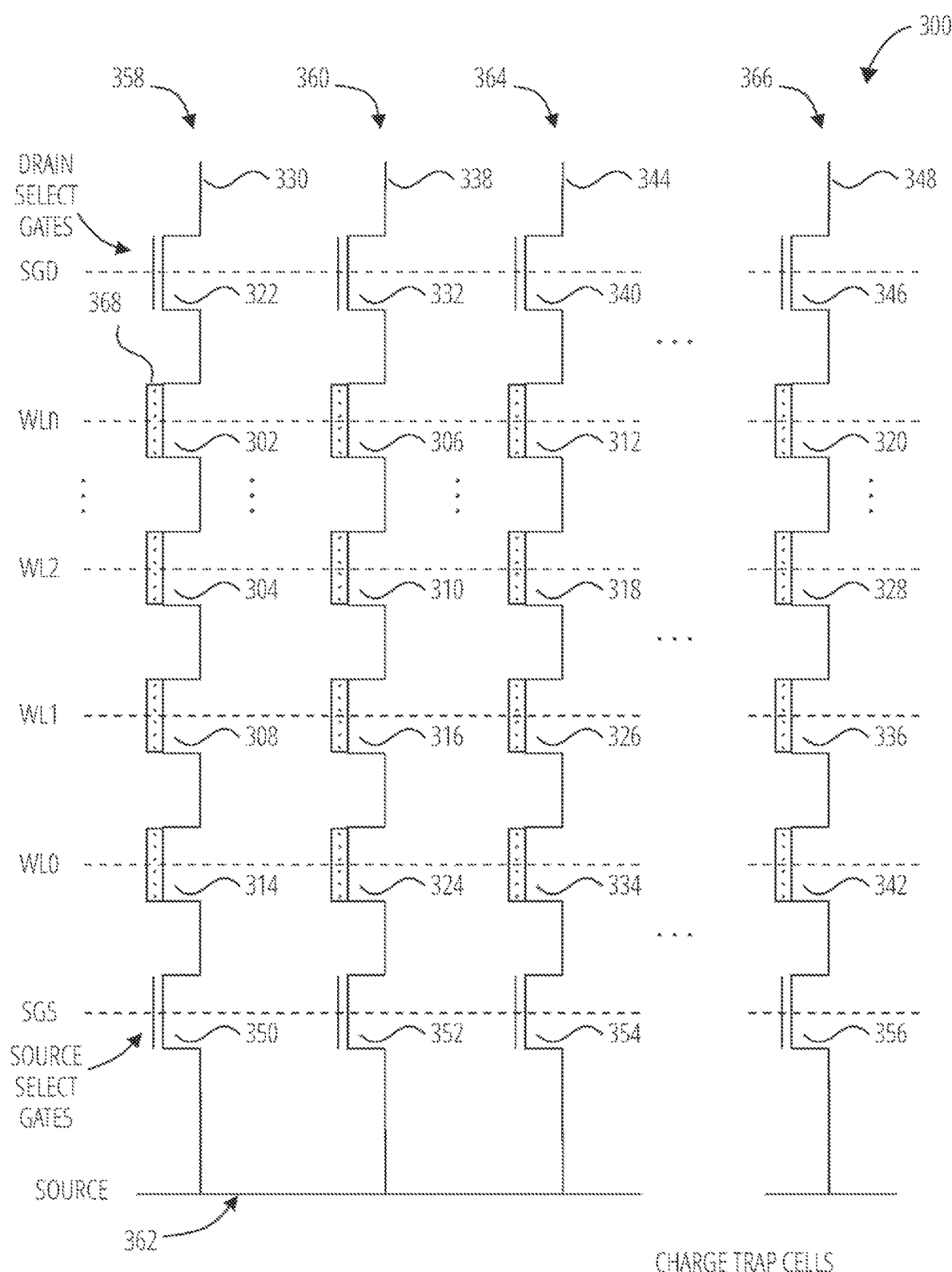
FIG. 3 is a schematic circuit diagram illustrating one embodiment of an array of storage cells 300.

FIG. 3 is a circuit diagram depicting an array of storage cells 300 comprising a plurality of NAND strings. An architecture for a flash memory system using a NAND structure may include several NAND strings. For example, FIG. 3 illustrates an array of storage cells 300 that includes multiple NAND strings (NAND string 358, NAND string 360, NAND string 364, and NAND string 366). In the depicted embodiment, each NAND string includes drain select transistors (select transistor 322, select transistor 332, select transistor 340, and select transistor 346), source select transistors (select transistor 350, select transistor 352, select transistor 354, select transistor 356), and storage elements (storage element 302, storage element 304, storage element 308, storage element 314, storage element 306, storage element 310, storage element 316, storage element 324, storage element 312, storage element 318, storage element 326, storage element 334, storage element 320, storage element 328, storage element 336, and storage element 342). The storage elements may be transistors that incorporate a charge trap layer 368. While four storage elements per NAND string are illustrated for simplicity, some NAND strings can include any number of storage elements, e.g., thirty-two, sixty-four, or the like storage elements.

NAND string 358, NAND string 360, NAND string 364, and NAND string 366, in one embodiment, are connected to a source line 362 by source select transistor 350, select transistor 352, select transistor 354, and select transistor 356, respectively. A selection line SGS may be used to control the source side select transistors. The various NAND strings, in one embodiment, are connected to bit line 330, bit line 338, bit line 344, and bit line 348 by drain select transistor 322, select transistor 332, select transistor 340, and select transistor 346, respectively, as shown. The drain select transistors may be controlled by a drain select line SGD. In some embodiments, the select lines do not necessarily need to be in common among the NAND strings; that different select lines can be provided for different NAND strings.

As described above, each word line WL0-WLn comprises one or more storage elements. In the depicted embodiment, each of bit line 330, bit line 338, bit line 344, and bit line 348, and the respective NAND string 358, NAND string 360, NAND string 364, and NAND string 366, comprise the columns of the array of storage cells 300, storage block, erase block, or the like. The word lines WL0-WLn, in some embodiments, comprise the rows of the array of storage cells 300, storage block, erase block, or the like. Each word line WL0-WLn, in some embodiments, connects the control gates of each storage element in a row. Alternatively, the control gates may be provided by the word lines WL0-WLn themselves. In some embodiments, a word line WL0-WLn may include tens, hundreds, thousands, millions, or the like of storage elements.

In one embodiment, each storage element is configured to store data. For example, when storing one bit of digital data, the range of possible threshold voltages ("VTH") of each storage element may be divided into two ranges which are assigned logical data "1" and "0," In one example of a NAND type flash memory, the VTH may be negative after the storage elements are erased and defined as logic "1". In one embodiment, the VTH after a program operation is positive and defined as logic "0."

When the VTH is negative and a read is attempted, in some embodiments, storage elements will turn on to indicate logic "1" is being stored. When the VTH is positive and a read operation is attempted, in a further embodiment, a storage element will not turn on, which indicates that logic "0" is stored. Each storage element may also store multiple levels of information, for example, multiple bits of digital data. In such an embodiment, the range of VTH value is divided into the number of levels of data. For example, if four levels of information can be stored in each storage element, there will be four VTH ranges assigned to the data values "11", "10", "01", and "00."

In one example of a NAND type memory, the VTH after an erase operation may be negative and defined as "11." Positive VTH values may be used for the states of "10", "01", and "00." In one embodiment, the specific relationship between the data programmed into the storage elements and the threshold voltage ranges of the storage elements depends upon the data encoding scheme adopted for the storage elements.

In some embodiments, when a read operation is performed, a read error may occur on one or more storage elements, which may be a result of an insufficient cell current provided by the one or more storage elements (e.g., an "ON" cell current flowing through the floating gate transistor over the bit line during a read operation, or the like). For example, an ON current for different storage elements storing the same data may vary, causing read errors. A read level determination component may adjust a read level, such as a bias voltage of a bit line, applied to the one or more storage elements to reduce a number of read errors by compensating for the low cell current from one or more of the storage elements.

Figure 4:
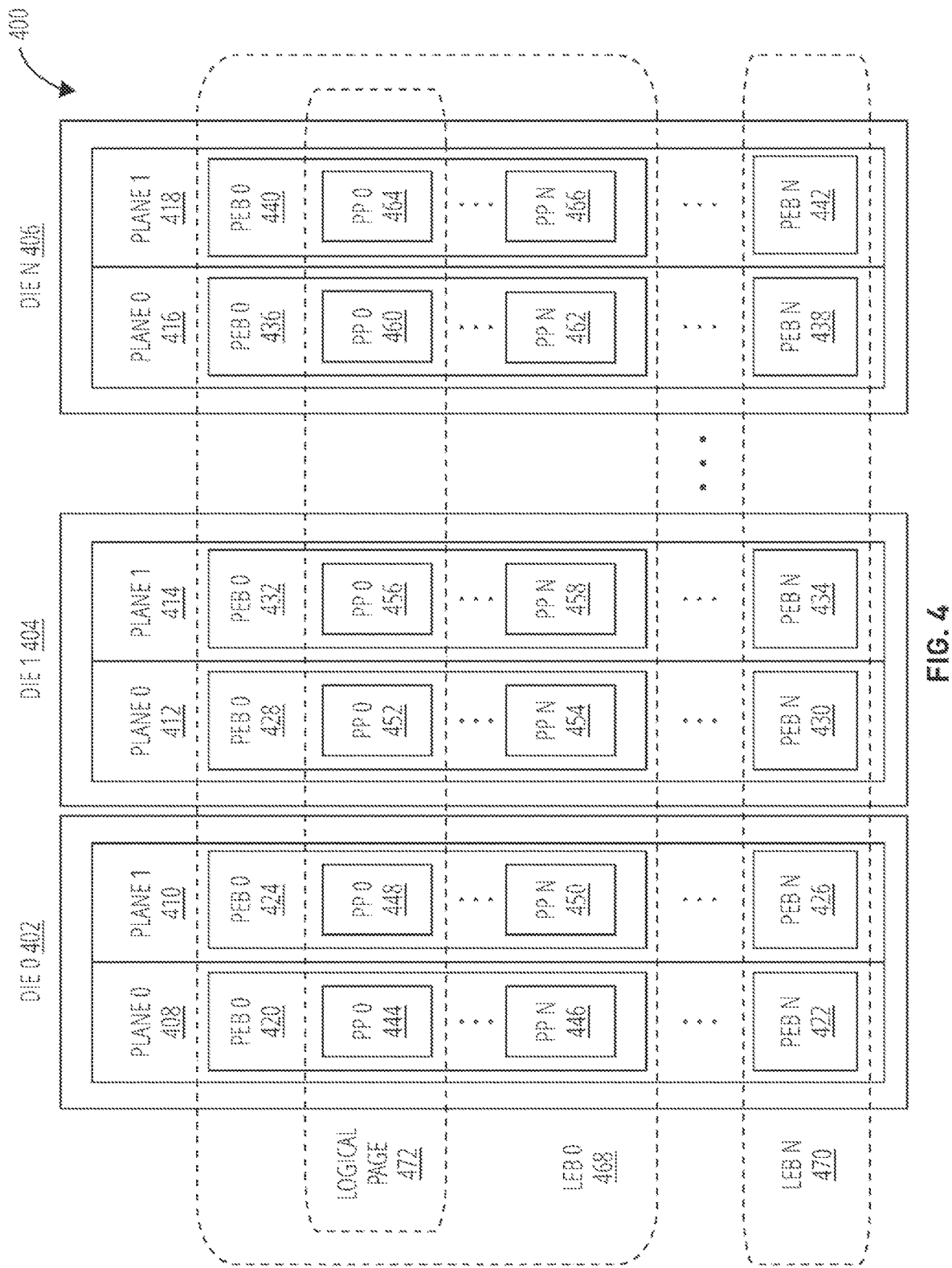
FIG. 4 illustrates a memory array 400 in accordance with one embodiment.

FIG. 4 illustrates a memory array 400 in accordance with one embodiment. The memory array 400 comprises a plurality of memory die, such as die 0 402, die 1 404, etc., through die n 406. "Memory die" refers to a small block of semiconducting material on which a given functional circuit is fabricated. Typically, integrated circuits are produced in large batches on a single wafer of electronic-grade silicon (EGS) or other semiconductor (such as GaAs) through processes such as photolithography. The wafer is cut (diced) into many pieces, each containing one copy of the circuit. Each of these pieces is called a die. (Search 'die (integrated circuit)' on Wikipedia.com Oct. 9, 2019. Accessed Nov. 18, 2019.) A memory die is a die, in one embodiment, that includes a functional circuit for operating as a non-volatile memory media and/or a non-volatile memory array.

In certain embodiments, a die is divided into physical planes, such as plane 0 408 and plane 1 410 of die 0 402, plane 0 412 and plane 1 414 of die 1 404, etc., through plane 0 416 and plane 1 418 of die n 406. "Plane" refers to a division of a die that permits certain storage operations to be performed on both planes using certain physical row addresses and certain physical column addresses. More than two planes may be configured within each memory die in some embodiments. The illustration of two planes per die is not intended to limit the scope of the solution disclosed.

Each plane may be divided into physical erase blocks, as illustrated by physical erase block 0 420 through to physical erase block n 422 of plane 0 408, physical erase block 0 424 through to physical erase block n 426 of plane 1 410, physical erase block 0 428 through to physical erase block n 430 of plane 0 412, physical erase block 0 432 through to physical erase block n 434 of plane 1 414, physical erase block 0 436 through to physical erase block n 438 of plane 0 416, and physical erase block 0 440 through to physical erase block n 442 of plane 1 418. "Physical erase block" refers to smallest storage unit within a given memory die that can be erased at a given time (e.g., due to the wiring of storage cells on the memory die). The physical erase blocks may be located in separate storage dies, shown as die 0 402, die 1 404, and die n 406.

Each physical erase block can be divided into physical pages. For example, physical erase block 0 420 may include physical page 0 444 through physical page n 446, physical erase block 0 424 may include physical page 0 448 through physical page n 450, physical erase block 0 428 may include physical page 0 452 through physical page n 454, physical erase block 0 432 may include physical page 0 456 through physical page n 458, physical erase block 0 436 may include physical page 0 460 through physical page n 462, physical erase block 0 440 may include physical page 0 464 through physical page n 466.

In the illustrated embodiment, memory array 400 is further organized into logical erase blocks (LEBs, also may be referred to herein as a "metablock" or "superblock"), as shown by logical erase block0 468 and logical erase block N 470 (also referred to herein as a "metablock" or "storage block"). These LEBs include multiple physical erase blocks (PEBs) illustrated by physical erase block 0 420, physical erase block n 422, etc. The physical erase blocks may be located in separate storage dies, shown as die 0 402, die I 404, and die n 406.

Those of skill in the art appreciate the relationship and differences between physical erase blocks and a logical erase blocks and may refer to one, or the other, or both by using the shorthand names such as erase block, block, or storage block. Those of skill in the art understand from the context of the references to an erase block whether a physical erase block or a logical erase block (or metablock or superblock) is being referred to. The concepts and techniques used in the art and those recited in the claims can be equally applied to either physical erase blocks or logical erase blocks.

"Storage block" refers to a set of storage cells organized such that storage operations can be performed on groups of the storage cells in parallel. The organization of the set of storage cells may be implemented at a physical level or a logical level. Thus, a storage block, in one embodiment, may comprise a physical page, such as a word line, a logical page comprising physical pages that span planes and/or memory die, a physical erase block comprising a set of physical pages, a logical erase block or logical erase block (LEB) comprising a set of logical pages or logical pages, or the like. A storage block may be referred to herein as a "block", a "memory block", a "metablock," or an LEB.

As used herein, a "physical" structure such as a physical page, physical word line, physical erase block, physical plane, physical memory die, or the like, refers to a single physical structure that a controller, manager, module, or other logic component of a system can control and/or communicate with at some level within one or more levels of physical abstraction in the organization of the device, system, or apparatus. Similarly, a "logical" structure such as a logical page, logical word line, logical erase block, logical plane, logical memory die, or the like, refers to a collection of two or more single physical structures of that same type that a controller, manager, module, or other logic component of the system can control and/or communicate with at some level within one or more levels of physical abstraction in the organization of the device, system, or apparatus. It should be noted that one or the other or both a "physical" structure and a "logical" structure may have distinct addresses that can be used to identify one "physical" structure or "logical" structure relative to other structures of a similar nature and type.

"Logical erase block" or "metablock" refers to another term for a storage block. In certain embodiments, a logical erase bock refers to a set of logical pages that span planes, memory die, and/or chips. This organization of storage cells is deemed "meta" or 'logical' because the physical pages may not be directly coupled to each other. However, the physical pages are operated in parallel as though they are a single page. In like manner, multiple physical erase blocks may be operated in parallel as though they are a single erase block and are thus referred to as logical erase blocks. The terms logical erase block, metablock, and super block are used interchangeably herein.

"Logical page" or "metapage" refers to a collection of physical pages that are treated as a single page for certain storage operations. "Physical page" refers to the smallest storage block within a given memory die that can be written to in a single operation. In certain non-volatile storage media, a physical page comprises a single word line on a plane of a non-volatile memory array.

A logical erase block such as logical erase block0 468 or logical erase block N 470 is further divided into multiple logical pages (logical page 472) that, in turn, may include multiple physical pages, such as physical page 0 444, physical page 0 448, physical page 0 452, physical page 0 456, physical page 0 460, and physical page 0 464, as illustrated. Physical pages may include multiple data packets, which may be grouped into error correction code codewords (ECC codewords). "Data packet" refers to a structure for organizing data. Generally, a data packet has a fixed size. In certain embodiments, a data packet may comprise one or more parts such as a header, a footer, and/or a payload. A data packet may store metadata in a header and/or footer and may store user, host, or system data in the payload. Often data organized in an original data structure is divided up or combined to form data packets, which may be sized and configured to transmission or storage of the data.

In one embodiment, a physical page represents the smallest storage unit within a given die that can be written to at a given time. In one embodiment, a physical page may comprise a single word line.

In another embodiment, a logical page is the smallest writable storage block supported by the storage controller. (In one embodiment, the storage controller may include a buffer configured to store up to a logical page worth of data; upon filling the buffer, the storage controller may write the contents of the buffer to a single logical page simultaneously.) In certain embodiments, a logical page may be referred to simply as a word line, with the understanding that the logical page includes one word line on each plane and/or memory die of the memory array 400.

In certain embodiments, the logical page spans planes within a memory die or spans planes within multiple memory die. In some instances, dividing a logical page across multiple dies may result in faster access times for a set of data when multiple dies are accessed in parallel. The logical page configurations may be mapped to any physical page on a die, or across a plurality of memory die, just as with logical erase blocks.

In some embodiments, a storage controller 106 may associate metadata, also referred to as media characteristics, with one or more of the storage blocks (logical erase blocks, physical erase blocks, logical pages, and/or physical pages). The storage controller 106 may manage metadata that identifies logical addresses for which a logical erase block stores data, as well as the respective numbers of stored data packets for each logical erase block, data block, or sector within a logical address space. A storage controller 106 may store metadata or media characteristic data in a variety of locations, including on non-volatile storage media, in volatile memory, in a structure stored with each logical erase block, or the like.

"Media characteristic" refers to an attribute or statistic for a set of particular storage cells, such as a program/erase cycle count for the set of storage cells, a read count for the set of storage cells, a retention time since a previous write for the set of storage cells (aka a data retention time), a dwell time for the set of storage cells such as a logical or physical erase block (e.g., a time between a program of an erase block and an erase of the erase block), an average of multiple previous dwell times for the set of storage cells, an error statistic for the set of storage cells, or the like.

A media characteristic for a set of storage cells may be static or may be dynamic and change over time. A media characteristic, in one embodiment, is a statistic, heuristic, mathematical model, transform, or other descriptor associated with an attribute of the non-volatile memory media.

A media characteristic, in one embodiment, includes or relates to a make, a model, a manufacturer, a product version, or the like for the storage device and/or for the non-volatile memory media. A media characteristic, in a further embodiment, may include or relate to an environmental condition or a use of the storage device and/or of the non-volatile memory media, such as a temperature, a use case (e.g., a cache use case, an archival use case, a server use case, an enterprise use case, a consumer use case, etc.), or the like.

A logical erase block may include metadata specifying, without limitation, usage statistics (e.g., the number of program erase cycles performed on that logical erase block, health statistics (e.g., a value indicative of how often corrupted data has been read from that logical erase block), security or access control parameters, sequence information (e.g., a sequence indicator), a persistent metadata flag (e.g., indicating inclusion in an atomic storage operation), a transaction identifier, or the like. In some embodiments, a logical erase block includes metadata identifying the logical addresses for which the logical erase block stores data, as well as the respective numbers of stored data blocks/packets for each logical block or sector.

In certain embodiments, the metadata comprises a cross temperature for logical erase block, an average cross temperature for open logical erase blocks of the non-volatile storage device, a temperature change rate, an average program erase count for a logical erase block, an uncorrectable bit error rate (UBER) for a logical erase block, a bit error rate, a fail bit count for a logical erase block, a charge leak rate, media characteristic, and/or the like.

Figure 5:
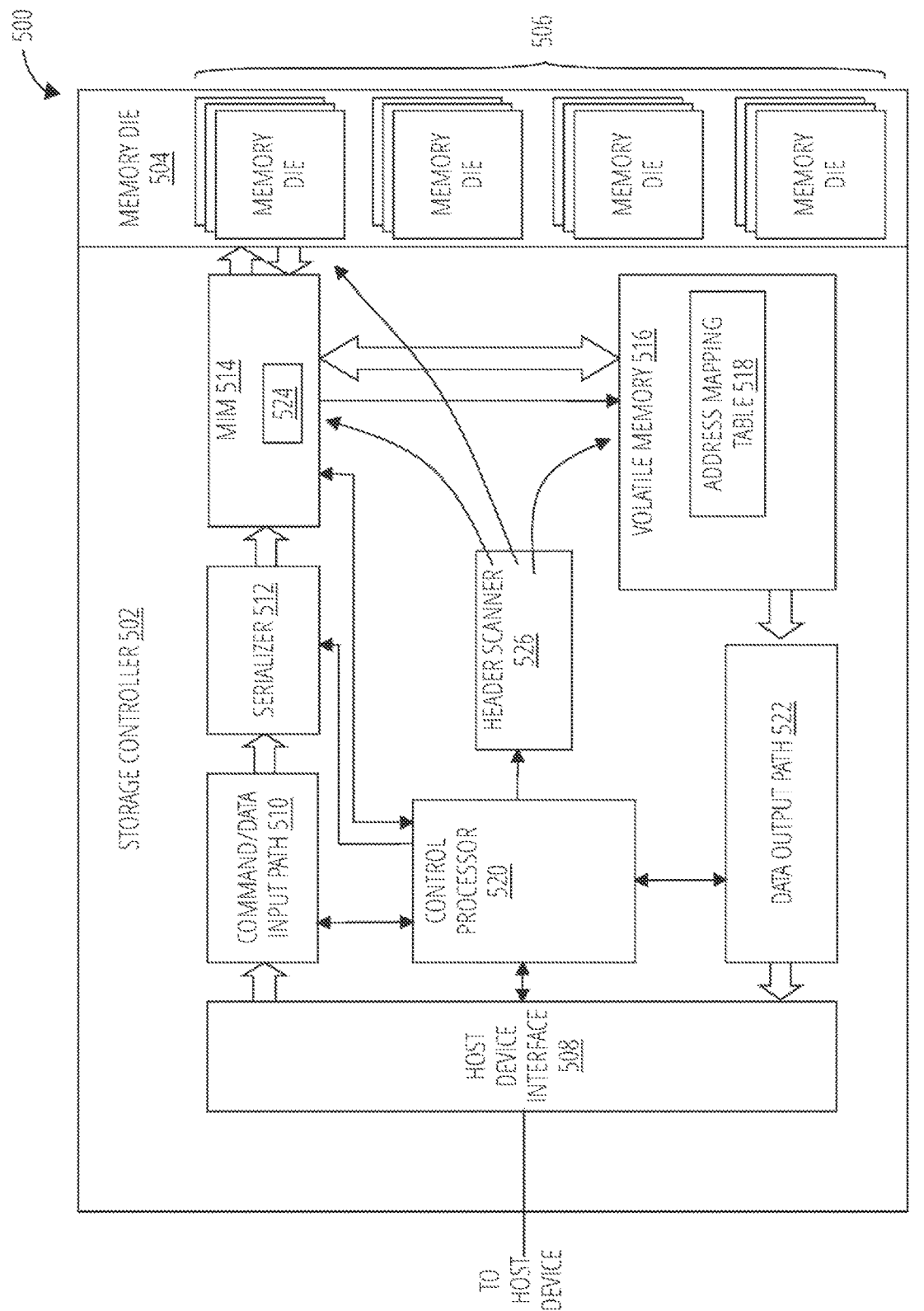
FIG. 5 illustrates a memory device 500 in accordance with one embodiment.

Referring to FIG. 5, a memory device 500 comprises a storage controller 502 and memory die 504. The memory die 504 includes a memory array 506. The storage controller 502 manages the memory die 504, and may comprise various hardware and software controllers, drivers, and software, including a host device interface 508, a command/data input path 510, a serializer 512, a memory interface manager 514, volatile memory 516 comprising an address mapping table 518, a control processor 520, and a data output path 522.

Figure 6:
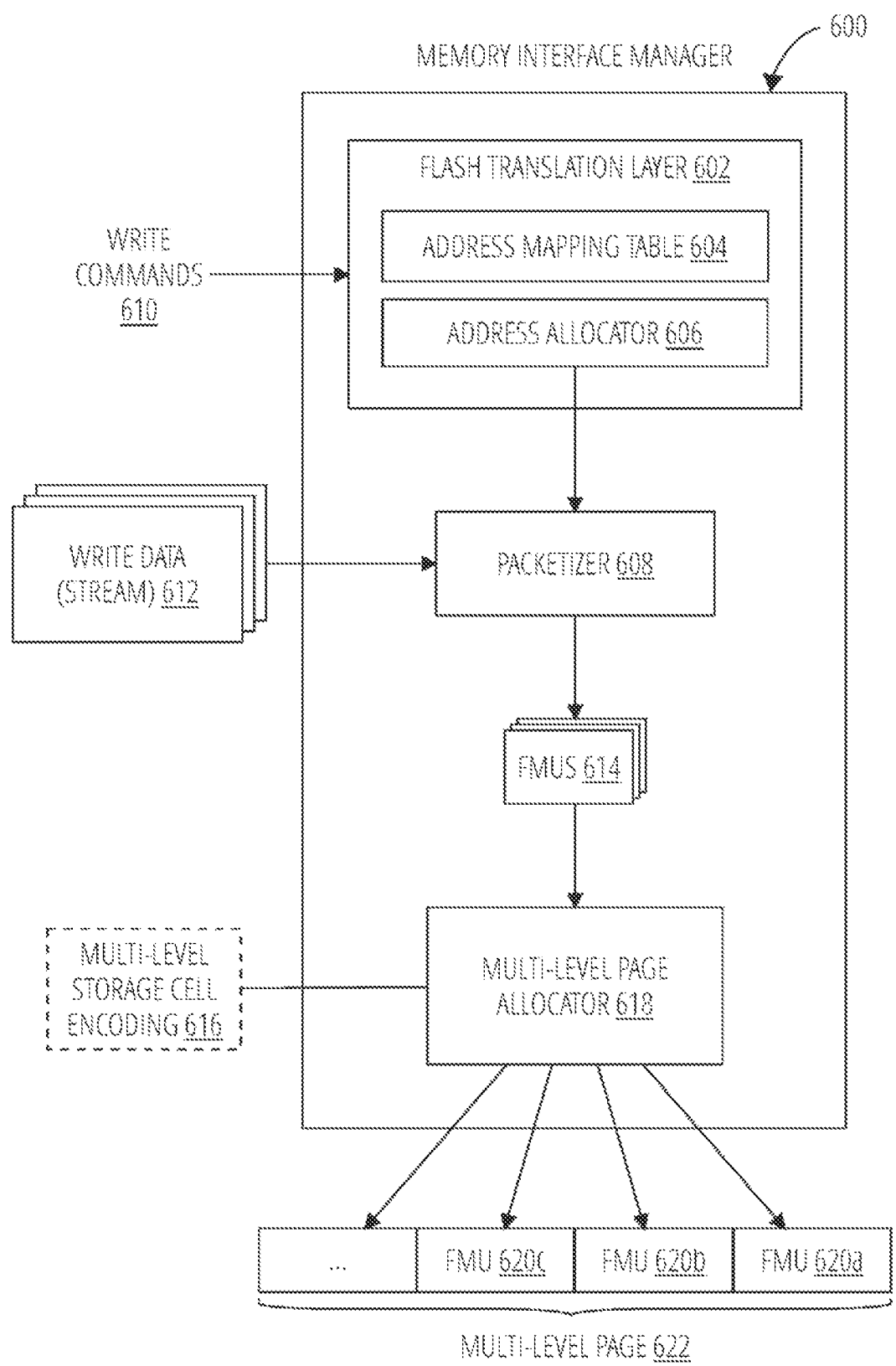
FIG. 6 illustrates a memory interface manager 600 configured to store flash management units.

The memory device 500 may also include a header scanner 526, which implements one method disclosed herein and is described in more detail with respect to FIG. 6.

As described above, certain storage devices, while appearing to a storage client 110 (or host device) to be a block storage device, do not directly associate particular logical addresses with particular physical data blocks, also referred to in the art as sectors. Such storage devices may use an address mapping table 518. "Address mapping table" refers to a data structure that associates logical block addresses with physical addresses of data stored on a non-volatile memory array. The table may be implemented as a digest, a map, ab-tree, a content addressable memory ("CAM"), a binary tree, and/or a hash table, and the like.

The address mapping table 518 provides a level of abstraction between the logical addresses used by the storage client 110, and the physical addresses at which the storage controller 502 stores the data. The address mapping table 518 maps logical addresses to physical addresses of data blocks stored on memory die 504. This mapping allows data to be referenced in a logical address space using a logical identifier, such as a logical block address. A logical identifier does not indicate the physical location of data on the memory die 504 but is an abstract reference to the data.

The storage controller 502 manages the physical addresses in the physical address space. In one example, contiguous logical addresses may in fact be stored in non-contiguous physical addresses as the address mapping table 518 tracks and identifies the proper physical location within the memory die 504 to perform data operations.

Furthermore, in certain embodiments, the logical address space may be much larger than the physical address space. This "thinly provisioned" or "sparse address space" embodiment, allows the number of logical identifiers for data references to greatly exceed the number of possible physical addresses.

In one embodiment, the address mapping table 518 includes a map or digest that maps logical addresses to physical addresses. The map may be in the form of a B-tree, a content addressable memory ("CAM"), a binary tree, and/or a hash table, and the like. In certain embodiments, the address mapping table 518 is a tree with nodes that represent logical addresses and comprise corresponding physical addresses.

The storage controller 502 preserves the relationship between the logical address and a physical address of the data on the storage device corresponding to the physical data block. As the number of allocated data blocks, stored/written data blocks increases, the performance of the storage controller 502 may suffer depending on the configuration of the storage controller 502. Specifically, in certain embodiments, the storage controller 502 is configured to store data sequentially and use a storage space recovery process that re-uses memory cells storing deallocated/unused data blocks. Specifically, the storage controller 502 may sequentially write data on the memory die 504 within one or more physical structures of the memory cells, the data is sequentially stored on the memory die 504.

As a result of storing data sequentially, the storage controller 502 achieves a high write throughput and a high number of I/O operations per second ("IOPS"). The storage controller 502 includes a storage space recovery, or garbage collection process that re-uses data memory cells to provide sufficient storage capacity. The storage space recovery process reuses memory cells for data blocks marked as deallocated, invalid, unused, or otherwise designated as available for storage space recovery in the address mapping table 518.

The host device interface 508 may be configured by the command/data input path 510 regarding delays in sending and reporting sent and received data and commands. The host device interface 508 further sends incoming storage commands and data for processing to the command/data input path 510. The command/data input path 510 receives data for processing from the host device interface 508. The data is then sent to a serializer 512. The command/data input path 510 further sends control signals regarding workload to the control processor 520. The workload attributes may include a percentage of read storage commands received, a percentage of write storage commands received, a queue depth, a percentage of storage commands directed at non-contiguous or random addresses, an average transfer length for data associated with a storage command, an initiator count, a port count, measure of input/outputs per second (IOPS), and the like.

The serializer 512 receives the data from the command/data input path 510. The serializer 512 performs the process of translating data structures, such as data packers, or object state, into a format that can be stored (for example, in a file or memory buffer). The serializer 512 may be managed by a control signal. Such a control signal may influence a FLASH translation layer queue depth. The processed data is then sent to the memory interface manager 514. In some embodiments, the processed data alters the FLASH translation layer queue depth of the memory interface manager 514, altering the number of commands the memory interface manager 514 is concurrently processing.

"Memory interface manager" refers to any hardware, firmware, software, circuitry, component, module, logic, device, or apparatus configured, programmed, designed, arranged, or engineered to support, interface with, and conduct communications between a storage or memory controller and one or more memory die or memory chips.

The memory interface manager 514 receives the processed data as well as one or more control signals to determine the FLASH translation layer queue depth. The memory interface manager 514 may interact via control signals with the address mapping table 518 to determine an appropriate physical address to send data and commands to the memory die 504 and the volatile memory 516. The memory interface manager 514 may include an error correction code encoder 524 configured to cooperate in implementing the disclosed solutions, as is described in further detail below.

In one embodiment, the memory interface manager 514 also receives the data outputs from the memory die 504. The memory die 504 performs the storage operation (read, write, erase) and returns data output, if the storage command has output data.

The address mapping table 518 stores address locations for data blocks on the memory device 500 to be utilized by the memory interface manager 514. Specifically, the FLASH translation layer searches the address mapping table 518 to determine if a logical block address included in the storage command, has an entry in the address mapping table 518. If so, the physical address associated with the logical block address is used to direct the storage operation on the memory die 504.

In the illustrated embodiment, the memory cells of the memory die are asymmetric, write-once storage media. Consequently, each write operation to the memory cells leads to a new physical address to be assigned to the logical block address for the data. Generally, the logical block address remains the same and the physical address changes so that the storage controller 502 can quickly service a write storage command.

In one embodiment, the address mapping table 518, or a portion thereof, is stored in the volatile memory 516. The memory interface manager 514 references the address mapping table 518 frequently to service read commands and updates the address mapping table 518 to track new physical addresses for each write command (both a new write with a new logical block address and an write that updates the data for a previously assigned logical block address). As a result, the state and contents of the address mapping table 518 may change frequently and regularly.

The storage controller 502 writes data to the memory die 504 with certain metadata. The metadata may include the logical block address and/or address information for each data block or set of data blocks and an indicator as to how many data blocks are associated with the logical block address. Data blocks can be written sequentially on the memory die 504. Consequently, the storage controller 502 can read each data block on the memory die 504 and re-create the address mapping table 518 by using the address information. In certain embodiments, the address information and/or metadata may be stored in a header of an ECC codeword and/or flash management unit. "Address information" refers to a data value, setting, parameter, range, offset or the like that may be used to identify a location of an object, structure, or set of data in a physical structure or a logical structure. In one embodiment, address information may comprise a logical group identifier (such as a logical group number) and an offset within the logical group.

Recovery

Ideally, the storage controller 502 manages the address mapping table 518 such that reading each of the data blocks stored in the memory array 506 is not needed to restore the address mapping table 518. The series of steps and operations that the storage controller 502 performs to get to an operational state after a shutdown event (graceful or ungraceful) is referred to herein as an initialization operation.

"Initialization operation" refers to series or sequence of steps and operations that a storage controller performs to get to an operational state after a shutdown event (graceful or ungraceful). In one embodiment, the initialization operation may include reading a most recent version of an address mapping table from a memory array into volatile memory; reading one or more digests from the memory array by reading just the lower multi-level page. The one or more digests may be stored after the address mapping table was written to the memory array; and updating the address mapping table in the volatile memory to associate the address information of the one or more digests with the FMUs stored on the memory array after the address mapping table was written to the memory array.

Generally, to minimize the time for an initialization operation, the storage controller 502 periodically stores a complete copy of the address mapping table 518 to the memory die 504. In certain embodiments, the storage controller 502 stores a complete copy of the address mapping table 518 to the memory die 504 during a graceful shutdown event. When the storage controller 502 powers up again after the graceful shutdown event, the storage controller 502 loads the complete address mapping table 518 into volatile memory 516 as part of the initialization process. There may be no further steps needed for the storage controller 502 to get the address mapping table 518 to its state prior to the graceful shutdown.

If the storage controller 502 experiences an ungraceful shutdown event and the storage controller 502 has periodically stored a complete copy of the address mapping table 518, the storage controller 502 loads the last known complete copy of the address mapping table 518 from the memory array (e.g., memory die). Next, the storage controller 502 may direct the header scanner 526 to read each data block stored between when the last known complete copy of the address mapping table 518 was stored and the ungraceful shutdown event happened. From each data block read during this initialization operation process, the storage controller 502 updates the newly loaded address mapping table 518 with physical address changes that are recorded in the headers of the data blocks that are read. Once the data blocks are read, and the address mapping table 518 updated, the address mapping table 518 reflects its state prior to the ungraceful shutdown event. The initialization operation then completes and the storage controller 502 can begin servicing storage clients.

The header scanner 526 coordinates with the memory interface manager 514 and the address mapping table 518 to manage the time needed to recover the original state of the address mapping table 518 prior to an ungraceful shutdown event. In certain embodiments, the header scanner 526 is configured to enable the storage controller 502 and/or a user and/or a storage client 110 to tune and configure the storage controller 502 to set the recovery time for an initialization operation such that the initialization operation meets a timing metric.

The timing metric is a maximum time, a time range, or other designation of time that defines how long the initialization operation should take. The timing metric may be set forth in an industry standard performance specification. For certain memory devices, the timing metric may be measured in 10 s of microseconds, 100 s of milliseconds, 1-2 seconds, a minute, or the like.

Advantageously, the header scanner 526 may enable a manufacturer, storage client 110, or storage controller 502 to define the parameter for the timing metric and the header scanner 526 may work with the memory interface manager 514, the address mapping table 518, and the memory array 506 to meet the timing metric.

In one embodiment, the header scanner 526 uses at least two techniques for deterministically managing the initialization operation time. First, the header scanner 526 manages how often the storage controller 502 performs a master flush of the address mapping table 518. Hushing the address mapping table 518 is a maintenance operations that may impact the level of performance the storage controller 502 gives to the storage clients. This potential performance cost incentivizes the header scanner 526 to do a master flush as infrequently as possible. However, the more often the header scanner 526 does a master flush the smaller the amount of data blocks that may be written to the memory array 506 and would need to be read to rebuild/restore the address mapping table 518 to its state prior to an ungraceful shutdown event.

Second, the header scanner 526 manages how information that tracks a relationship between logical block addresses and physical addresses is stored on the memory array for data blocks written between completion of a master flush. The relationship between logical block addresses and physical addresses is a one to one relationship, each logical block address has one physical address in the memory array 506. This relationship is also referred to as a logical to physical mapping, abbreviated L2P. The information that tracks a relationship between logical block addresses and physical addresses is called an address information or a mapping.

In certain embodiments, the header scanner 526 uses a digest to efficiently manage relationships between logical block addresses and physical block addresses. "Digest" refers to a structure configured to store a compilation of information including address information for one or more FMUs configured to be stored on certain multi-level pages of a page of non-volatile storage media. In certain embodiments, a digest comprises a summary or synopsis or consolidated collection of information from various sources gathered into a single location. In certain embodiments, a digest has a fixed size. In other embodiments, a digest has a variable size. In certain embodiments, a digest may comprise a single data structure. In other embodiments, a digest may comprise a plurality of data structures. For example, in one embodiment, each FMU on a multi-level page may include a portion of address information, a portion of a digest, that together constitute a digest. As used herein, a digest contains information from which logical block addresses and corresponding physical addresses for a plurality of data blocks can be determined. As discussed in more detail below, a digest may also include address information for data blocks and/or flash management units of a plurality of multi-level pages stored on a single page.

Advantageously, reading one or more digests may enable the header scanner 526 to read fewer headers. As a result, when re-building an address mapping table 518, the storage controller 502 performs fewer reads to determine logical block addresses and corresponding physical addresses for a plurality of data blocks represented by a single digest. In one embodiment, a digest may comprise the logical identifiers (e.g., logical block addresses) of each of the data blocks or FMUs that the digest represents.

In addition to the identifier information describing logical identifiers (e.g., logical block addresses), a digest may, in some embodiments, also include location information describing physical storage locations (e.g., physical addresses) on memory die(s) where the data blocks represented by the digest are located. In one embodiment, the location information represents a physical storage location without explicitly comprising the physical storage location. In one example, the digest may include an offset for one or more of the data blocks or FMUs that the digest represents where the offset may be an offset from a physical location in which the digest is stored or an offset within a data structure.

In another example, the location information may be an offset within a logical group, logical erase block or an offset within a logical page. In another embodiment, the location information comprises a count and an offset and a physical storage location is derived by knowing the number of data blocks or FMUs represented by a digest and multiplying that by the size of the data blocks or FMUs where the data blocks or FMUs are of a known fixed size. This information together with the ordering of digest entries in a digest may permit derivation of the physical storage location.

A digest may be organized into any suitable data structure. Examples, of possible digest data structures include, but are not limited to, a key-value pair, a linked list, starting logical block address and a starting physical address and a count indicating how many sequentially addressed data blocks are associated with this starting logical block address and starting physical address, and the like.

The volatile memory 516 may send and receive data (processed data, data outputs, etc.) from the Memory interface manager 514 and the data output path 522. The volatile memory 516 is a region of a physical memory storage used to temporarily store data while it is being moved from one place to another. For example, the volatile memory 516 may store processed data that is not actively queued in the Memory interface manager 514 and send further processed data upon request by the Memory interface manager 514. The Memory interface manager 514 may perform a similar process for data outputs for the data output path 522.

The data output path 522 determines the scheduling of host device data transfers (e.g., of data outputs) and the scheduling of host device responses. The data output path 522 communicates with the host device interface 508 to send and receive this data and commands. The scheduling of the host device data transfers and the host device responses may be influenced by control signals. The data output path 522 may be altered by the control signals to delay the data transfers or the response frames. The data output path 522 further sends control signals regarding workload to the control processor 520. The workload attributes may include percentage read, a queue depth, a percentage random, a transfer length, an initiator count, a port count, and input/outputs per second (IOPS).

FIG. 6 illustrates a memory interface manager 600 in accordance with one embodiment. The memory interface manager 600 may be used as an apparatus implementing a solution disclosed herein. The memory interface manager 600 may comprise a flash translation layer 602 that includes an address mapping table 604 and an address allocator 606, and a packetizer 608.

"Flash translation layer" refers to logic in a non-volatile storage device, chip, or component, such as a storage class memory (SCM) memory device or FLASH memory device, that includes logical-to-physical address translation providing abstraction of the logical block addresses used by a storage client (e.g. a host) and the physical block addresses at which a storage controller stores data. The logical-to-physical translation layer maps logical block addresses (LBAs) to physical addresses of data stored on solid-state storage media. This mapping allows data to be referenced in a logical block address space using logical identifiers, such as a block address. A logical identifier does not indicate the physical location of data on the solid-state storage media but is an abstract reference to the data.

The flash translation layer 602 may receive write commands 610 and write data 612 from a direct memory access (DMA). "Write data" refers to data from a host and/or metadata for a storage device that is intended to be written to a non-volatile storage media. The write commands 610 may comprise a type of storage command to write data to the non-volatile storage media. In certain embodiments, the write commands 610 may be separate from the write data 612. The write data 612 may be transmitted from a host 104 to a storage controller 106 by a direct memory access (DMA) operation. "Receiver" refers to any hardware, software, firmware, circuit, component, module, logic, device, or apparatus configured, programmed, designed, arranged, or engineered to receive one or more write commands.

The flash translation layer 602 may coordinate with the address allocator 606 to determine where the write data 612 will be stored. The address allocator 606 may determine a multi-level page to store a set of data blocks associated with a set of write commands 610. "Address allocator" refers to any circuit, sub-circuit, electronic component, hardware, software, firmware, module, logic, device, or apparatus configured, programmed, designed, arranged, or engineered to determine, assign and/or allocate a physical block address for a particular logical block address.

The packetizer 608 may coordinate with the flash translation layer 602 and address allocator 606 to prepare the write data 612 for storage on the non-volatile storage media. "Packetizer" refers to any hardware, software, firmware, circuit, component, module, logic, device, or apparatus configured, programmed, designed, arranged, or engineered to organize a set of source data into one or more data packets. In one embodiment, the source data may comprise user data for one or more storage operations. The packetizer may be configured to include a header, footer and/or redundancy data in each data packet. The packetizer may be configured to include padding data or filler data to combine with a remainder of the source data that does not completely fill a data packet.

The packetizer 608 may combine the write data 612 for the set of data blocks into a payload for an ECC codeword. The packetizer 608 may coordinate with the address allocator 606 to determine which multi-level page a particular ECC codeword is assigned to be stored on. Based on a determined multi-level page for the particular ECC codeword, the packetizer 608 may change a payload size for the payload of the particular ECC codeword in response to a reliability attribute of the determined multi-level page satisfying a threshold.

In one embodiment, the packetizer 608 may increase the payload size in response to the reliability attribute identifying the multi-level page as having higher data integrity than another multi-level page configured to be stored on a physical page that is also configured to store the multi-level page.

The packetizer 608 may then signal a changed payload size to an error correction code encoder configured to generate a corresponding ECC codeword. The packetizer 608 may include or communicate with an error correction code encoder.

In one embodiment, the ECC codeword may comprise the payload and a parity section, and the error correction code encoder may proportionally change the parity section size in response to the packetizer 608 changing the payload size such that the ECC codeword remains the same size as ECC codewords for which the packetizer 608 does not change the payload size.

In one embodiment, the packetizer 608 may change the payload size by adding or removing data to a default payload size. The error correction code encoder may proportionally change a parity size by adding or removing redundancy data sized to have the same size as the added or removed data. Payload and parity sections may include padding before or after their data and redundancy data, respectively. "Redundancy data" or "parity data" refers to a particular type of data use to enable error correction code encoders to detect and/or correct user data in a message protected by the redundancy data. In certain embodiments, redundancy data includes a copy of some or all of the message or data that represents the original message after processing. Redundancy data may also be referred to as parity data.

Parity data refers to one or more bits associated with a string of binary code (set of ordered binary bits). Parity bits, and parity data, may be used as the simplest form of error detecting code. Parity bits, and parity data, may generally be applied to the smallest units of a communication protocol or data being exchanged, typically 8-bit octets (a byte), although parity data can also be applied separately to an entire message string of bits or set of data. (Search "parity bit" on Wikipedia corn May 9, 2020. Modified, Accessed May 20, 2020.)

The packetizer 608 may organize the write data into flash management units 614, "Flash management unit" refers to a smallest unit of data that a storage controller may read, write, and/or access within a memory array. In certain embodiments, a flash management unit is associated with a single address, address identifier. The address identifier may correlate to a logical block address used by a host device to reference a data sector on a storage media.

The address identifier may correspond to address information that uniquely identifies a particular flash management unit. In one embodiment, the address identifier may comprise a logical group identifier and a logical group offset.

In certain embodiments, the flash management units 614 are the same as ECC codewords. In other embodiments, an error correction code encoder may generate ECC codewords from flash management units 614. The packetizer 608 sends the flash management units 614 to the multi-level page allocator 618.

The multi-level page allocator 618 organizes the flash management units 614 for writing to a multi-level page. For example, the multi-level page allocator 618 may organize a series of flash management units 614 into flash management unit 620*a*, flash management unit 620*b*, flash management unit 620*c*, and so on, intended for storage on a multi-level page 622.

In certain embodiments, the error correction code encoder is configured to use different coding rates for encoding ECC codewords (e.g., encoding FMUs into ECC codewords) based on some parameter, attribute, or media characteristic, of the data blocks or another input signal, or value, provided to the error correction code encoder. For example, in one embodiment, the error correction code encoder is configured to use a different coding rate depending on the multi-level storage cell encoding 616 being used for one or more ECC codewords and/or which multi-level page, assigned multi-level page, the ECC codewords will be stored on. In another embodiment, the multi-level storage cell encoding 616 is predefined and the error correction code encoder is configured to encode and decode ECC codewords using a particular coding rate based on the predefined multi-level storage cell encoding 616. In such an embodiment, the error correction code encoder may encode and decode ECC codewords based on an assigned multi-level page for the ECC codeword.

"Multi-level storage cell encoding" refers to a type of encoding scheme based on a numbering system that assigns certain bit value(s) to ranges within a range (threshold voltage (Vt) window) of threshold voltages that a memory cell may have. The bit values may be assigned such that the bit pattern satisfies a gray code encoding. The multi-level storage cell encoding permits more than one binary value to be represented across a single Vt window.

In one example, the range of threshold voltages may be one of a plurality of threshold voltage ranges that may be used to encode multiple bits of data into a storage cell (e.g., multi-level storage cell). For example, suppose a storage cell is configured to store two bits of information, and the successive ranges of threshold voltages are between a negative lower bound threshold voltage and positive upper bound threshold, e.g., about 5 volts. If four ranges are defined, the lower most range may have a bit assignment of '00', the next highest a bit assignment of '01', the next highest a bit assignment of '10', and the last range a bit assignment of '10'.

In one embodiment, the error correction code encoder is configured to change a coding rate for one or more ECC codewords based on an identified or predefined multi-level storage cell encoding and/or an assigned multi-level page for the ECC codewords. The assigned multi-level page may comprise data that identifies which multi-level page one or more ECC codewords are to be stored on, or were read from. Based on the assigned multi-level page, the error correction code encoder may determine which coding rate to use for both encoding and decoding the data of the ECC codewords.

As described in more detail below, certain multi-level storage cell encodings may impact, relate, or be associated with, certain attributes of multi-level pages and the data of the multi-level pages that is stored on a page of a non-volatile memory array. One of these attributes may be a reliability attribute based on a multi-level storage cell encoding configured to define a plurality of multi-level pages. Two or more of the plurality of multi-level pages may have different reliability attributes, which may be managed by using ECC codewords having different ECC strengths (e.g., coding rates) depending on which multi-level page a particular ECC codeword is stored on.

Figure 7:
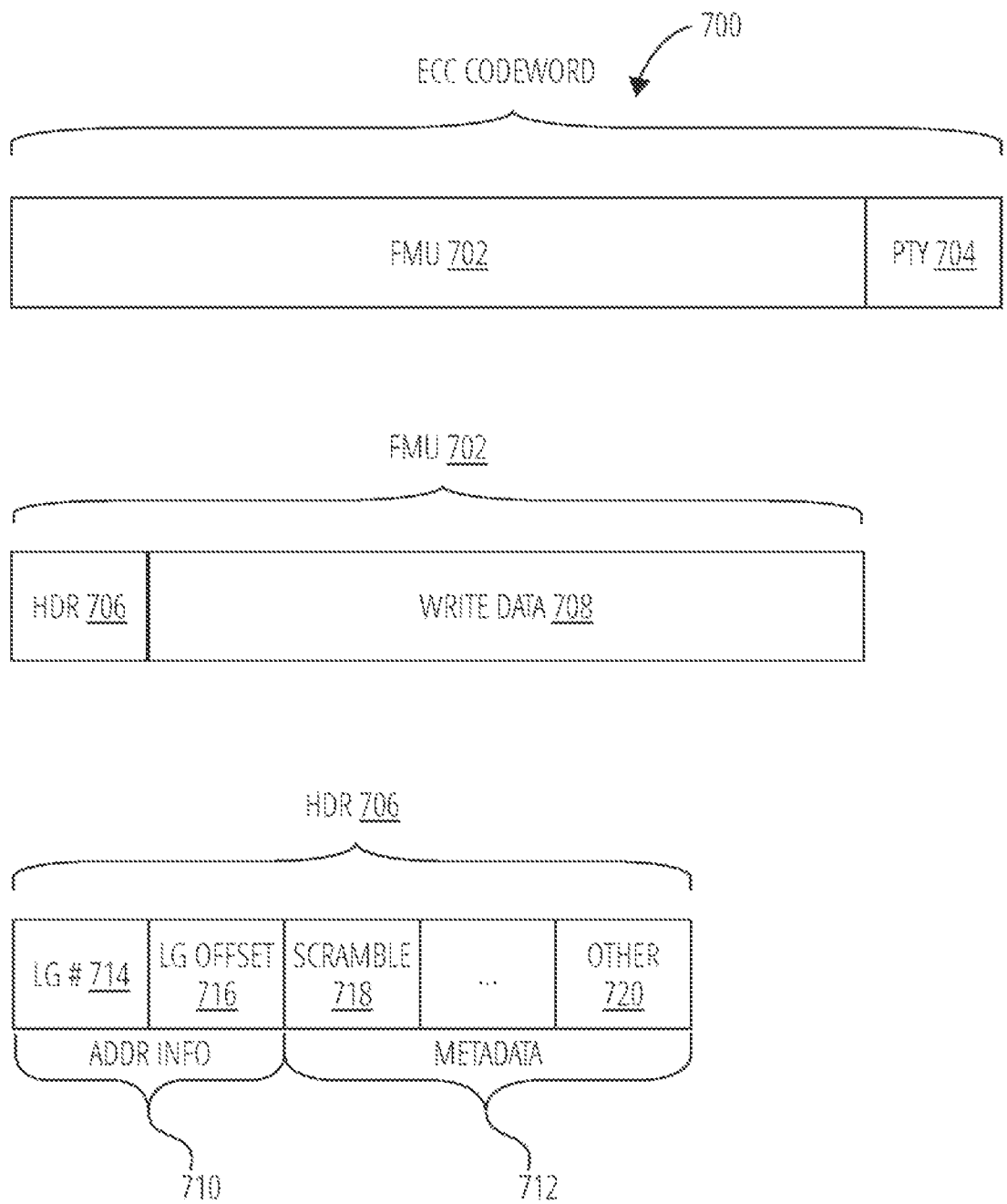
FIG. 7 illustrates structures in accordance with one embodiment.

FIG. 7 illustrates an ECC codeword 700 in greater detail, in accordance with one embodiment. The ECC codeword 700 comprises a flash management unit 702 (FMU) and a parity section 704. The flash management unit 702 may further comprise a header 706 and write data 708. This write data 708 may comprise write data 612.

The flash management unit 702 may comprise a payload in some embodiments. "Payload" refers to a part of an ECC codeword that holds a message or message data that is being protected by redundancy data associated with the ECC codeword. Generally, a payload or payload section is the largest part of an ECC codeword. In certain embodiments, a flash management unit 702 may be a payload. The flash management unit 702 may be combined with a parity section 704 to form an ECC codeword 700. "Parity section" refers to a part of an ECC codeword. The parity section is configured to store parity data, also referred to as redundancy data. In certain embodiments, a parity section may be at the end or the beginning of an ECC codeword.

The header 706 may comprise address information 710 and header metadata 712. "Header" refers to a data structure configured to hold metadata for a data packet or other form of structured set of data. Typically, a header is a field of a larger data structure configured for storage, maintenance, and management of data. For example, a data packet may include a header. A flash management unit may include a header. An ECC codeword may include a header. Often, a header is the first field in a set of fields that make up a data structure. In one embodiment, the header 706 may be 16 bytes. In one embodiment, the address information 710 may comprise 6 bytes.

"Metadata" refers to data that describes, represents or is associated with other data. Examples of metadata includes, but is not limited to, media characteristics, error correction code data, parity data, parity bits, redundancy data, parameter settings, and the like.

In one embodiment, metadata refers to system data usable to facilitate operation of a non-volatile storage device. Metadata stands in contrast to, for example, data produced by an application (i.e., application data) or forms of data that would be considered by an operating system as user data. For example, a zone or a logical erase block may include metadata specifying, without limitation, usage statistics (e.g., the number of program erase cycles performed on that zone or logical erase block, health statistics (e.g., a value indicative of how often corrupted data has been read from that zone or logical erase block), security or access control parameters, sequence information (e.g., a sequence indicator), a persistent metadata flag (e.g., indicating inclusion in an atomic storage operation), a transaction identifier, or the like.

The address information 710 may include a logical group identifier 714 (LG #) and logical group offset 716. "Logical group" refers to a structure for organizing a set or collection of write data. The write data may be organized into flash management units (FMUs) and/or ECC codewords. In one embodiment, a logical group includes a predefined number of FMUs. FMUs within a logical group may be organized and ordered within a logical group based on a predefined sequence such that each FMU in the logical group may be uniquely identified by logical group offset that identifies an FMU's position, or location, within a particular logical group.

Figure 8:
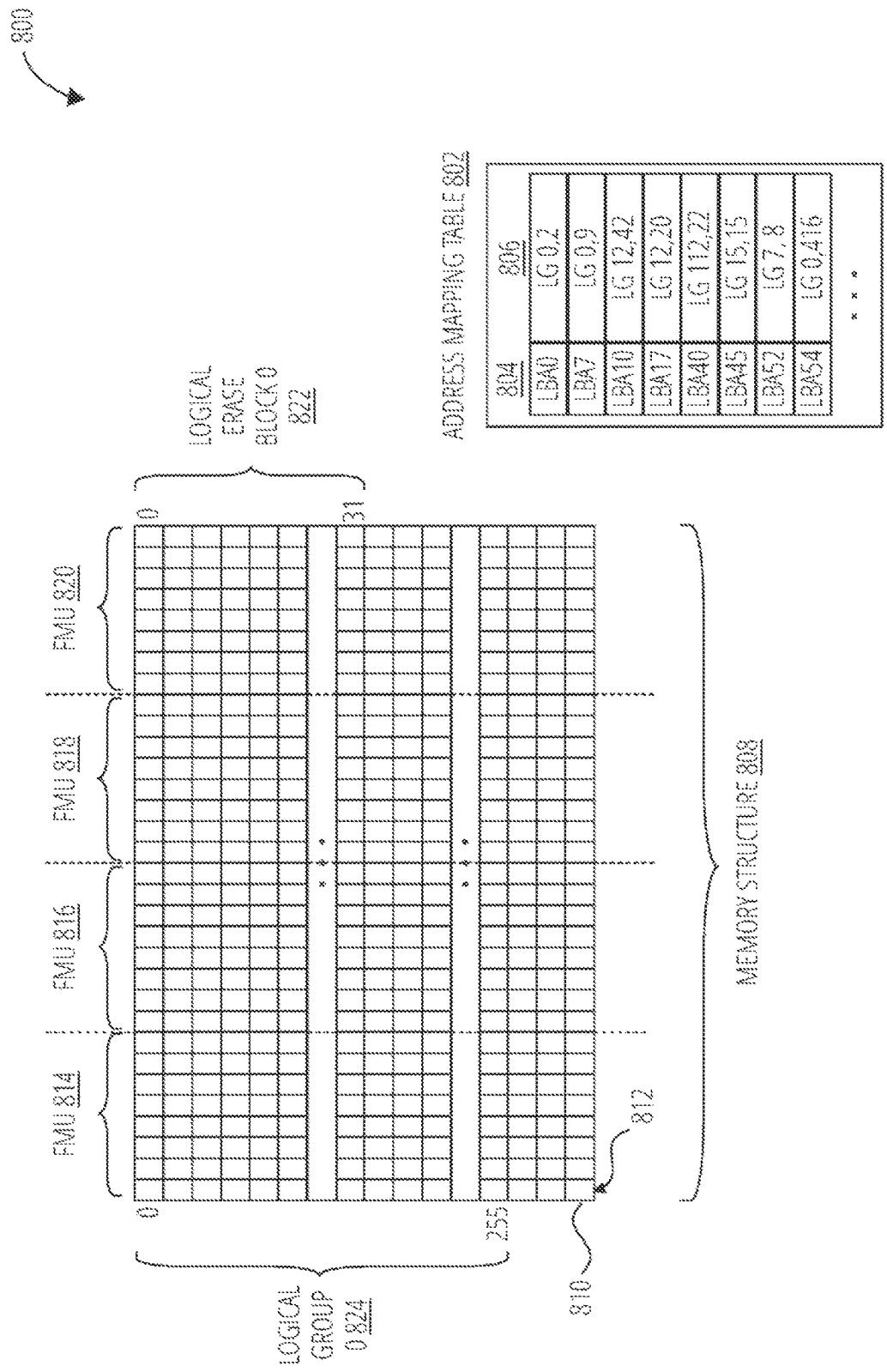
FIG. 8 illustrates a logical groups for organizing data blocks in relation to an address mapping table in accordance with one embodiment.

These concepts are explained in further detail with respect to FIG. 8. "Logical group identifier" refers to an identifier that uniquely identifies one logical group in relation to a plurality of logical groups within a set of logical groups. The logical group offset 716 indicates the logical group the ECC codeword 700 is intended for storage in. "Logical group offset" refers to a value, offset, or count that identifies a location of a logical group within a sequence of logical groups. In certain embodiments, a logical group offset comprises a value between 0 and N, where N is the number of flash management units or ECC codewords that a logical group may include. In other embodiments, a logical group offset comprises a value between 1 and N, where N is the number of flash management units or ECC codewords that a logical group may include.

The header 706 may include header metadata 712 comprising a scramble 718 and other 720 metadata. "Header metadata" refers to metadata that may be stored and retained in a header, such as a header for a flash management unit or other data structure. In certain embodiment, header metadata may include scramble keys for data of a flash management unit and/or ECC codeword, cross-temperature settings or values, and the like. Header metadata 712 may include a variety of data, including but more limited to a bit error rate, a temperature when data is written, a temperature when data is read, whether data in the FMU has been relocated, and the like.

In certain embodiments, an ECC codeword may include a flash management unit. In other embodiments, an ECC codeword may be a flash management unit. Depending on the context, the terms "ECC codeword" and "flash management unit" may be used interchangeably and may be used to refer to a data structure containing a header, write data, and a parity section or just a header 706 and write data 708. In other embodiments, "flash management unit" may refer to the payload portion of an ECC codeword, containing the header and write data, with parity data considered an add-on to the flash management unit to form an ECC codeword.

FIG. 8 illustrates an example for LBA addressing 800 in accordance with one embodiment. The example for LBA addressing 800 may implement an address mapping table 802 associating logical block addresses 804 with physical addresses 806. The address mapping table 802 may relate logical block addresses 804 and physical addresses 806 in a manner that may be better understood with reference to the memory structure 808 illustrated.

Each row of the memory structure 808 may represent a multi-level page 810. Each of the small blocks in each row may represent a data block 812. ECC codewords or flash management units may comprise eight data blocks 812 along a single multi-level page 810. Thus, flash management unit 814, flash management unit 816, flash management unit 818, and flash management unit 820 may comprise the flash management units along multi-level page 810 "0" as shown.

The memory structure 808 may also be organized into logical erase blocks such as logical erase block 0 822, as shown. Each row may represent a multi-level page 810 that may be stored on a logical word line, and each logical erase block 0 822 may represent thirty-two logical word lines. This is illustrated by the multi-level pages 810 (logical word lines) numbered 0 through 31.

Finally, 256 logical word lines or multi-level pages 810, may be grouped into a logical group, such as logical group 0 824. These logical groups may provide the address information 710 introduced in FIG. 7, and as indicated in address mapping table 802. The address information may comprise a logical group identifier and a logical group offset configured together to uniquely identify a subset of the write data, for example, a flash management unit. Addressing using logical groups and logical group offset may reduce the amount of address tracking overhead if each LBA for each data block was individually mapped/tracked. Instead, data blocks 812 are organized into FMUs and each FMU is uniquely identifiable within the memory structure 808 by reference to the logical group identifier and logical group offset (a count of FMUs in a particular order within a logical group).

An LBA may be mapped to a data block 812 within the memory structure 808. Thus, each FMU may map to eight LBAs. LBAs may be addressed according to which logical group they fall within, and where within that logical group they fall, expressed as an offset from the zero position within that logical group. For example, 'LBA0', listed first under logical block addresses 804, may map to the "2" position/offset within the illustrated logical group 0 824 (e.g., flash management unit 814). 'LBA7' may map to the "9" position within logical group 0 824 (e.g., flash management unit 816), and so on.

FIG. 8 is provided as an example for illustrative purposes. One of ordinary skill in the art will recognize that numerous configurations exist and may vary from embodiment to embodiment. The data structures shown are not intended to limit the scope of the solution(s) disclosed herein to the example illustrated in this figure.

Figure 9:
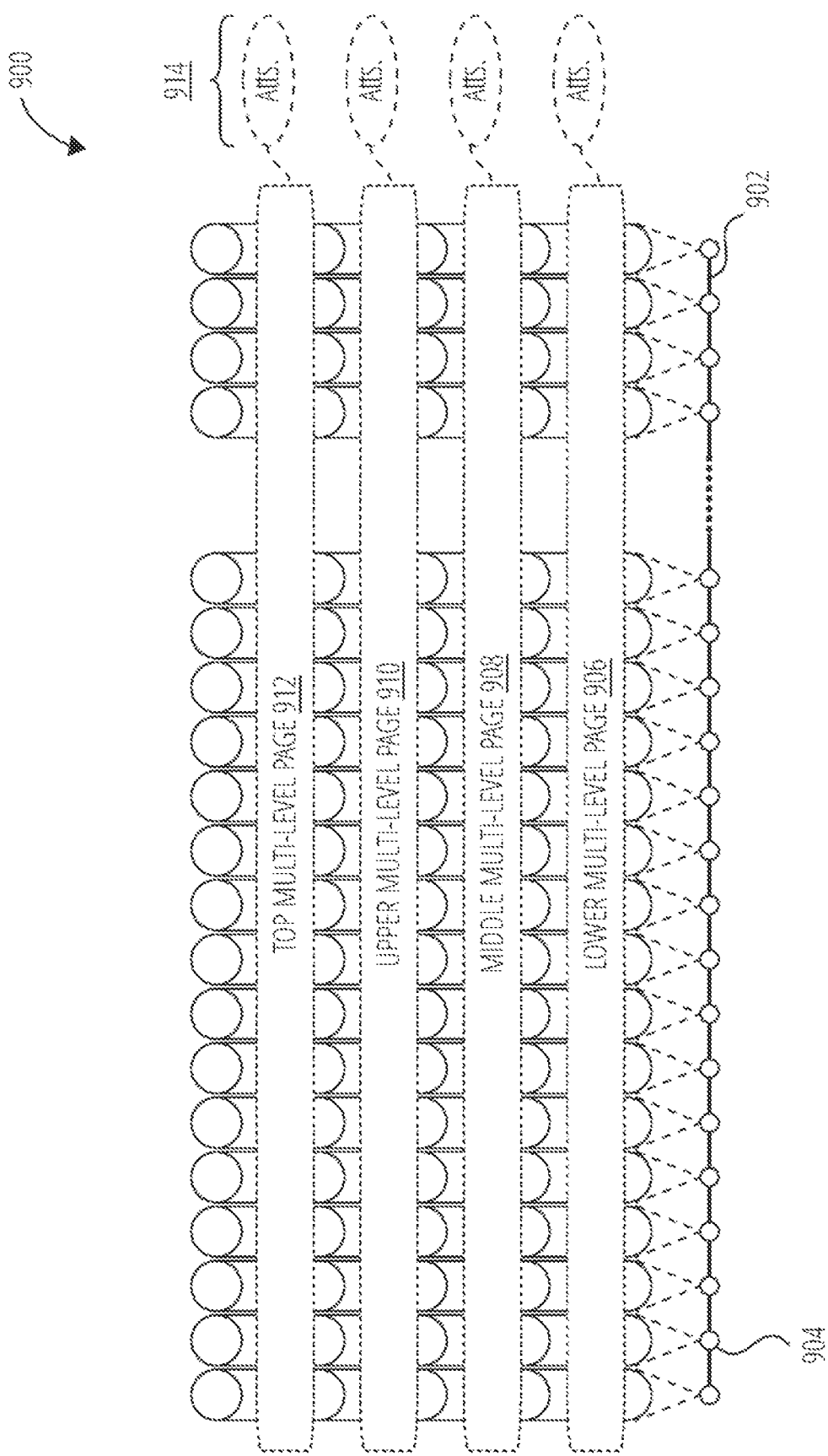
FIG. 9 illustrates a plurality of multi-level pages 900 in accordance with one embodiment.

FIG. 9 illustrates a model for a plurality of multi-level pages 900 in accordance with one embodiment. A non-volatile memory array may comprise many physical pages, such as physical page 902, each physical page containing numerous multi-level storage cells 904. "Page" refers to a physical page or logical page of a non-volatile storage media, such as a non-volatile memory array. In certain embodiments, the page is a set of multi-level storage cells of the non-volatile storage media. In one embodiment, a page comprises a word line of a non-volatile memory array. Whether the page refers to a physical page or a logical page depends a context for how the term is used.

"Multi-level storage cell" refers to a storage cell configured to store two or more binary bits that each represents a distinct data value. Multi-level storage cell may be abbreviated using the term "MLC." In certain embodiments, an MLC stores two binary bits. In another embodiment, MLC may refer to storage cells that store three, four, five, or more binary bits.

In still other embodiments, other terms may be used to distinguish one set of MLC storage cells from another. In such embodiments, MLC storage cells may refer specifically to storage cells storing two-binary bits per storage cell, per industry convention. In such embodiments, storage cells that store three binary bits per storage cell may be identified as three-level cell storage cells, or TLC, for three or Tertiary levels. Storage cells that store four binary bits per storage cell may be identified as four-level cell storage cells, or QLC, for four or Quad levels. Storage cells that store five binary bits per storage cell may be identified as five-level cell storage cells, or PLC, for five or Penta levels. A similar naming convention may be used for storage cells that store six or more binary bits per storage cell.

A set of multi-level storage cells may be organized into a physical page of a non-volatile memory array. In such a configuration of multi-level storage cells, a single physical page of multi-level storage cells may be understood and considered to include N physical pages, where N equals the number of bits being stored in each multi-level storage cell of the single physical page. "Multi-level page" refers to a set of storage cells along a single physical page or single logical page of a non-volatile memory array wherein each storage cell is configured as a multi-level storage cell and is configured to store the same number of bits per storage cell. A physical multi-level page is a set of storage cells along a single physical page. A logical multi-level page is a set of storage cells along a single logical page.

In certain embodiments, the multi-level storage cells of the single page (logical or physical) may be configured to store a plurality of multi-level pages based on how the multiple bits of data are encoded to be represented by the multi-level storage cells. In one embodiment, the encoding used to define multi-level pages may define a predefined number of read levels to be sensed or read in order to decode the data bits stored in a specific multi-level page.

The plurality of multi-level pages 900 may comprise a number of logical pages created through, and/or based on, the encoding and configuration used for the physical page 902. In one embodiment, a physical page 902 implementing multi-level storage cells 904 such as QLC memory cells may be configured to store four logical pages of data as illustrated. "QLC memory cell" refers to a multi-level storage cell configured to store four bits of data.

These logical pages are referred to herein as multi-level pages. Furthermore, based on the model illustrated in FIG. 9, multi-level pages may be named based on their position within the model. For example, a particular multi-level page may comprise a lower multi-level page 906, a middle multi-level page 908, an upper multi-level page 910, or a top multi-level page 912. Of course, in other embodiments, multi-level pages of a plurality of multi-level pages implemented for a page of a non-volatile memory array may use different names, be organized in a different order, and still implement concepts recited in the claims of this disclosure.

"Lower multi-level page" refers to a multi-level page configured within a multi-level page model of a plurality of multi-level pages such that lower multi-level page is the lowest multi-level page of the plurality of multi-level pages. "Middle multi-level page" refers to a multi-level page configured within a multi-level page model of a plurality of multi-level pages such that middle multi-level page is between a lowest multi-level page and a top multi-level page of the plurality of multi-level pages.

"Upper multi-level page" refers to a multi-level page configured within a multi-level page model of a plurality of multi-level pages such that upper multi-level page is between a top multi-level page and a middle multi-level page of the plurality of multi-level pages. "Top multi-level page" refers to a multi-level page configured within a multi-level page model of a plurality of multi-level pages such that top multi-level page is a highest multi-level page of the plurality of multi-level pages. "Multi-level page model" refers to a logical model for how a set of multi-level storage cells may be organized to store a plurality of multi-level pages. In the multi-level page model, each multi-level page may a predefined location or position in a stack or set of layers of multi-level pages.

The naming and location of multi-level pages depends on the number of levels being used to store data. For example, in a multi-level page model for three level cells (TLC) storage cells, the multi-level page model may have lower multi-level page on a first layer, a middle multi-level page on a next layer, and top multi-level page on the third and final layer. Similarly, a multi-level page model for four level cells (QLC) storage cells, the multi-level page model may have lower multi-level page on a first layer, a middle multi-level page on a next layer, an upper multi-level page on a next layer, and top multi-level page on the fourth and final layer.

The model of FIG. 9 also illustrates a set of attributes 914 that may be associated with each multi-level page. The attributes may be defined explicitly or may be an inherent result of how a plurality of multi-level pages are encoded/defined, "Attribute" refers to any property, trait, aspect, quality, data value, setting, or feature of an object or thing. Certain attributes may be specific to a particular multi-level page or type of multi-level page. Other attributes may apply to each multi-level page but at different degrees or levels. Still other attributes may relate to a set of multi-level pages. The value and settings for certain attributes 914 may depend on the multi-level storage cell encoding used for the plurality of multi-level pages. In certain embodiments, the set of attributes 914 is different for each multi-level page. In other embodiments, the one or more attributes of a set of attributes 914 may be common for two or more multi-level pages.

Figure 10:
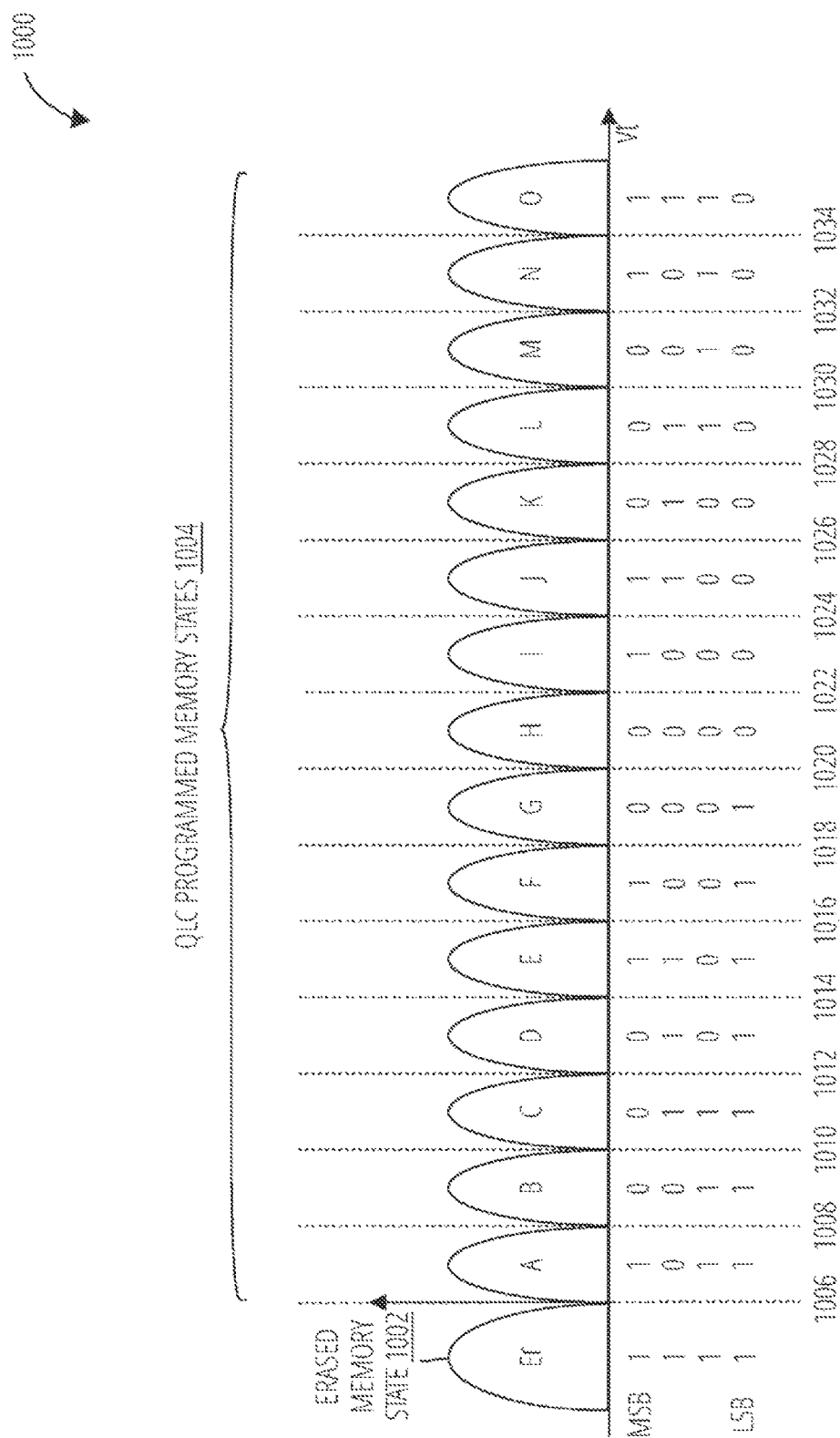
FIG. 10 illustrates memory state encoding 1000 in relation to one embodiment.

FIG. 10 shows a graph of a cell threshold voltage distribution for memory cells of a non-volatile storage media and memory state encoding 1000 such as multi-level NAND flash storage cells, or the like. The memory states, in the depicted embodiment, may be encoded using a gray code encoding model, with binary values for adjacent memory states differing by a single bit in the encoding.

"Memory state" refers to a condition, attribute, and/or characteristic, of a memory cell, or storage cell, designed and/or configured to represent an encoding for one or more data bit values. In certain embodiments, the memory state may be changed by way of a storage operation. In a non-volatile memory cell, the memory cell maintains its memory state without a power source.

In certain embodiments, and in certain contexts, memory state may also refer to a collection, or set of memory cells, that collectively have a similar condition, attribute, and/or characteristic. In relation to non-volatile memory cells, groups, collections, or sets of memory cells with a similar condition within a certain range may be referred to collectively as memory cells of a particular memory state. Furthermore, reference may be made to a memory state as a shorthand reference to all memory cells having a condition that falls within a predefined range defined for that memory state.

For example, with NAND memory cells, a threshold voltage (Vt) window may be defined between a negative threshold voltage, or zero threshold voltage, and a maximum threshold voltage. Within this Vt window, a number of sub-ranges may be defined and referred to as memory states. In certain embodiments, the whole Vt window may be divided up such that each threshold voltage falls within one of the memory states. In one embodiment, each memory state has a lower boundary and an upper boundary and may be represented by a cell threshold voltage distribution.

"Threshold voltage (Vt) window" refers to a range of threshold voltages defined between a negative threshold voltage, or zero threshold voltage, and a maximum threshold voltage. Within this Vt window, a number of sub-ranges may be defined and referred to as memory states. In certain embodiments, the whole Vt window may be divided up such that each threshold voltage falls within one of the memory states. In one embodiment, each memory state has a lower boundary and an upper boundary that each comprise a read level. Storage cells with a threshold voltage below the read level are in a lower threshold voltage memory state and storage cells with a threshold voltage above the read level are in a higher threshold voltage memory state.

In FIG. 10, the Vt window may begin at the low end of the erased memory state 1002 ("Er") and extend to the upper end/boundary of the "O" memory state. The graph includes erased memory state 1002 and memory states "A"-"O" for a total of 16 memory states to represent 4 bits stored in each memory cell. Certain memory states are adjacent memory states. "Adjacent memory state" refers to a memory state that neighbors a given memory state along a range of threshold voltages with no memory states defined between the given memory state and the adjacent memory state. "Er" memory state (erased memory state 1002) and "A" memory state are adjacent memory states. Similarly, "A" memory state and "B" memory state are adjacent memory states. "A" memory state and "C" memory state are not adjacent memory states because "B" memory state is between them.

The graph illustrates a threshold voltage for memory cells of a non-volatile storage media along the x-axis. The y-axis identifies a number, or count, of memory cells sensed/detected/read that have the corresponding threshold voltage along the x-axis. The curves within each memory state represent a normal distribution of memory cells that fall within a given memory state. Taken together the curves of the graph illustrate a cell threshold voltage distribution. In certain embodiments, a curve representing memory cells within a particular memory state may also be referred to as a cell threshold voltage distribution. Thus, a cell threshold voltage distribution for non-volatile storage media may include a number of cell threshold voltage distributions.

"Cell threshold voltage distribution" refers to a process or method for determining a threshold voltage for each memory cell in a set of memory cells. Cell threshold voltage distribution may be referred to as cell voltage distribution and may be referred to using the acronym "CVD."

A cell threshold voltage distribution may be determined during research and development of non-volatile memory technology to understand how memory cells behave under different conditions. In certain embodiments, a cell threshold voltage distribution may be performed during operation of non-volatile memory to determine whether the read levels being used to read a memory cell are adequate. If a bit error rate for a first set of read levels is inadequate, countermeasures may be taken to reduce the bit error rate.

In certain embodiment, these countermeasures may include adjusting configuration parameters such that a bit error rate decreases. In certain embodiments, the steps of determining a cell threshold voltage distribution, checking read levels and other media characteristics with respect to bit error rate, and taking any countermeasures, may be referred to as a CVD scan, a read scan, or a read scan operation. A CVD scan may take significant time to complete due to the various steps involved and the number of memory cells being scanned. In particular, where memory cells store four or more bits per memory cell, a CVD scan may incur high latency, unless aspects of the claimed solution are used.

"Configuration parameter" refers to a parameter of a set of storage cells that is modifiable by way of an interface, such as a read threshold, a write or program threshold, an erase threshold, or the like. An interface for modifying a configuration parameter may include a programmable data register, a command interface of a control bus for the non-volatile memory array, an API of a device driver of the storage device, a control parameter for the storage controller, or the like.

The threshold voltage for each memory cell may be encoded to represent binary data. In particular, the threshold voltage for each memory cell may be encoded to represent a 2, 3, 4 or more bits per memory cell. For example in FIG. 10, the binary value "1111" may in one embodiment be associated with the lowest memory state (labeled Er; an erased memory state 1002), the value "1011" associated with the next lowest read voltage state and first of the QLC programmed memory states 1004 (labeled A), the value "0011" associated with the next highest read voltage state (labeled B), and the value "0111" associated with the next highest read voltage state (labeled C), and so on, with one bit changing between memory states, also referred to as read voltage states.

In FIG. 10, the lowest memory state Er is depicted as a negative threshold voltage below the depicted 0.0V. In other embodiments, the lowest memory state Er may comprise a positive threshold voltage above the 0.0V level or span the 0.0V level. Values, magnitudes, sizes, and the like of read voltages may vary by manufacturer and type of non-volatile memory cell, each of which are encompassed by this disclosure. A read level is used by the die controller to distinguish memory cells in one memory state from those in another.

"Read level" refers to a voltage level configured to test, check, read, or sense, which memory cells conduct at the voltage level. In certain embodiments, the memory cells may comprise transistors and the read level, or read voltage; is a voltage level at, or above a threshold voltage for the memory cells which causes the memory cell to conduct a current, to activate or enter a saturated state.

In certain embodiments, depending on the type of encoding used to store data on the memory cell and the number of bits encoded on each memory cell, a single read/sense operation using a single read voltage may be determinative of the memory state of the memory cell. In other embodiments, a number of read/sense operations each performed at different read voltage levels may be used to determine the memory state of the memory cell.

The determined memory state may then be decoded into a representation of the data bits stored by the memory cell. "Read voltage" is a shorthand reference to a "read threshold voltage." "Read level" is another term commonly used to describe a "read voltage" and the two terms are used interchangeably herein.

"Read level window" refers to a set of candidate read levels that may serve as a read level between two adjacent memory states. In certain embodiments, where the memory cells that are read a read using one or more threshold voltages, a read level window may comprise a set of threshold voltages between a low threshold voltage and a high threshold voltage, with each member of the set of candidate read levels within the read level window comprising a distinct threshold voltage.

In another embodiment comprise NAND memory cells, a read level window may comprise a set of threshold voltages between a low threshold voltage and a high threshold voltage, with each member of the set of candidate read levels within the read level window comprising a threshold voltage offset by one or more offset amounts from a default read level, such as a current read level. The offsets from the default read level may be both greater than and/or less than the default read level. A read level window may also be referred to as a "scanning" window.

Reading memory cells based on a read level may be used for reading stored data in the memory cells as well as testing/checking performance of the memory cells and determining whether to make any changes to configuration parameters for the memory cells.

FIG. 10 illustrates multiple default read levels which may be set at the time a storage device 200 is manufactured and may be tuned during a manufacturing process and/or later when the storage device 200 is in use by a customer. When memory cells are programmed, the threshold voltages are changed from the erased memory state 1002 to one of the QLC programmed memory states 1004. Each memory state is bounded by a default read level. If a programmed, operational, memory cell does not activate at a default read level, the threshold voltage of the memory cell is above the default read level. The read or sense storage operation is an iterative process. And completing the iterative process, either for reading data or for sensing all memory cells, such as with CVD, identifies each memory cell as a member of one of the erased memory state 1002 or QLC programmed memory states 1004.

Read level A 1006, read level B 1008, read level C 1010, read level D 1012, read level E 1014, read level F 1016, read level G 1018, read level H 1020, read level I 1022, read level J 1024, read level K 1026, read level L 1028, read level M 1030, read level N 1032, and read level O 1034 in the depicted embodiment, may comprise default read levels that separate memory states A from Er, B from A, C from B, etc., respectively. While default read levels may be set at the time of manufacture, they may be adjusted, as needed to ensure optimal performance of the memory cells. In certain embodiments, a default read level represents a current read level for a memory cell. "Current read level" refers to a read level that is a value that is presently being used by a die controller or storage controller for read operations on memory cells. In certain embodiments, a current read level may be a default read level that has been used for prior read operations. In another embodiment, the current read level may comprise a read level set by a prior read scan operation and which may be changed in a presently executing read scan operation.

A program storage operation changes a media characteristic, e.g., threshold voltage, of the memory cells to a different state to represent a programmed condition. By setting the media characteristic to one of a plurality of different states according to a particular encoding, multiple bits may be stored in a single memory cell. With NAND memory cells, the program operation changes the threshold voltage to a threshold voltage between two read levels. For example, in one embodiment, a program operation may program certain memory cells to an H memory state by changing the threshold voltage to a level between read level H 1020 and read level I 1022. In certain embodiments, additional thresholds may be used, including a programming level, a program verify level, and the like.

Based on a data encoding, a non-volatile memory storage controller may interpret discrete threshold voltages for a quad-level storage cell as representing four binary bits. FIG. 10 illustrates an embodiment that uses a Gray code encoding. Other programming and encoding models may be used, and certain non-volatile memory media may have more or fewer possible states, allowing other amounts of data to be stored in a single storage cell. The memory states A through 0 may or may not be contiguous; for example, in certain embodiments, the voltage levels may be separated by band gaps known as guard bands. For example. A and B may be separated by 0.3V.

In one embodiment, the nonvolatile memory array employing memory state encoding 1000 may comprise NAND memory cells, and the multi-level storage cell encoding may be configured to divide up a threshold voltage (Vt) window into a plurality of memory states such as the erased memory state 1002 and QLC programmed memory states 1004, and assign a binary encoding to each memory state. "Binary encoding" refers to a sequence of bits or a certain length and configured to represent a state, condition, or media characteristic of something. As an example, a binary encoding may be used to represent one of n memory states that a multi-level storage cell may have at a given time. In such an embodiment, each bit of the binary encoding may represent a binary value for data at a level associated with the particular bit. The binary encoding may be configured such that each bit in the binary encoding represents a binary value on each multi-level page of a plurality of multi-level pages. The binary encoding is assigned according to a gray code encoding. "Binary value" refers to a data value in a binary number system having a value of either '0' or '1.'

FIG. 10 illustrates an example multi-level storage cell encoding that includes binary encodings assigned to each memory state. For state A, the binary encoding is '1011' which means that when a memory cell is in memory state A, the top multi-level page stores a '1' data value (the most significant bit (MSB) in the binary encoding), the upper multi-level page stores a '0' data value, the middle multi-level page stores a '1' data value, and the lower multi-level page stores a '1' data value (the least significant bit (LSB) in the binary encoding). For state B, the binary encoding is '0011' which means that when a memory cell is in memory state B, the top multi-level page stores a '0' data value (the most significant bit (MSB) in the binary encoding), the upper multi-level page stores a '0' data value, the middle multi-level page stores a '1' data value, and the lower multi-level page stores a '1' data value (the least significant bit (LSB) in the binary encoding). This same pattern can be used to interpret the data stored on each multi-level page for storage cells in memory states C-O.

"Gray code encoding" refers to a type of encoding scheme based on a numbering system that assigns certain bit value(s) to a range of threshold voltages that a memory cell may have. The bit values are assigned such that the bit pattern differs between adjacent threshold voltage ranges by one bit. Such a bit pattern assignment is advantageous because while a threshold voltage may change, drift, from one range (or memory state) to a neighboring range (or memory state), unintended changes or drift is likely not enough to cause a two bit changes in the encoding. In this manner, undesired drift can be detected and accommodated.

In one example, the range of threshold voltages may be one of a plurality of threshold voltage ranges that may be used to encode multiple bits of data into a memory cell. For example, suppose a memory cell is configured to store two bits of information, and the successive ranges of threshold voltages are between a negative lower bound threshold voltage and positive upper bound threshold, e.g., about 5 volts. If four ranges are defined, the lower most range may have a bit assignment of '00', the next highest a bit assignment of '01', the next highest a bit assignment of '10', and the last range a bit assignment of '10'.

Memory cells that store multiple bits of data may use a gray code encoding or another encoding process, such as those described in US patents: U.S. Pat. No. 6,222,762 and/or U.S. Pat. No. 7,237,074 which are included herein by reference, for all purposes.

Figure 11:
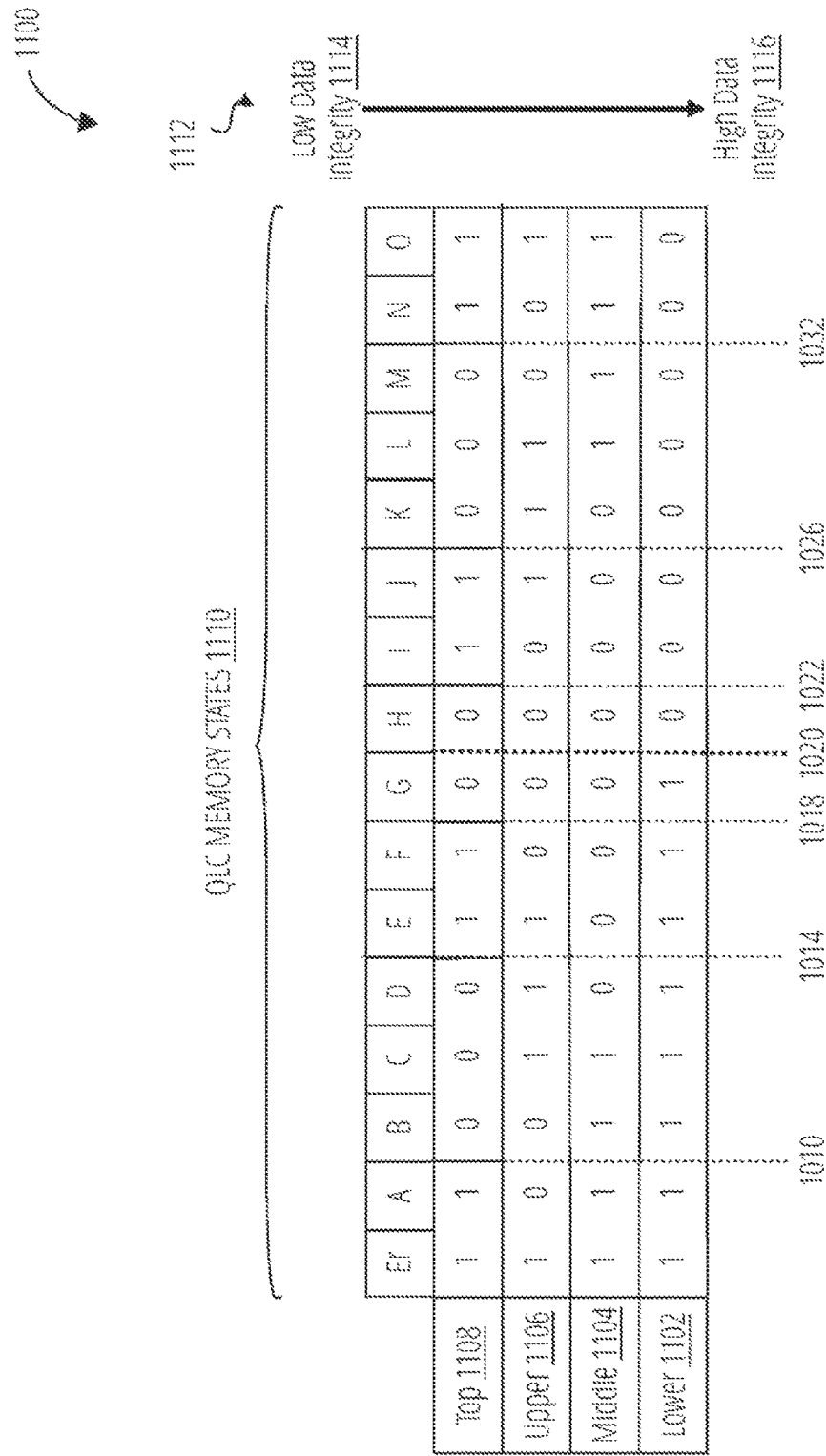
FIG. 11 illustrates an example multi-level storage cell encoding 1100 in accordance with one embodiment.

FIG. 11 illustrates example multi-level storage cell encoding 1100. The example multi-level storage cell encoding 1100 may be implemented using a memory structure having lower multi-level page 1102, middle multi-level page 1104, upper multi-level page 1106, and top multi-level page 1108 multi-level pages, as introduced in Fla 9. The memory structure may be encoded in a number of configurations assigning binary values to the QLC memory states 1110. The example multi-level storage cell encoding 1100 illustrates how the binary encodings can be mapped to the multi-level pages. In the illustrated example multi-level storage cell encoding 1100, the example multi-level storage cell encoding 1100 implements a gray code encoding method.

The specific relationship between the data programmed into the memory cells and the threshold voltage levels of the memory cell depends on the data encoding scheme used for programming the memory cells. In one example, a gray code encoding scheme may be used to assign data values to the threshold voltage distribution curves.

FIG. 10 illustrates how one example of a gray code encoding maps to the memory states. Below each memory state is a binary value of 4 bits listed from the most significant bit (MSB) reading down to the least significant bit (LSB). FIG. 11 illustrates the same encoding mapping in a table form. A multi-level page of data is associated with each position in the binary value. In other words, reading all MSB bits of memory cells along a physical word line, a physical page, or groups of physical pages along a row of the non-volatile memory array may forms a multi-level page, in one embodiment.

Using a gray code encoding enables a multi-level page to be read with fewer read operations because the gray code encoding is configured to ensure that one bit changes between adjacent memory states, and binary encodings, when reading/sensing for a particular multi-level page. For example, the erased state Er may be represented by "1111" and may transition to memory state A to represent "1011" in which the bit that changed is the neighboring bit to the MSB. FIG. 11 illustrates four pages: lower multi-level page 1102, middle multi-level page 1104, upper multi-level page 1106, and top multi-level page 1108. Each multi-level page may be read one at a time. For example, lower multi-level page 1102 may be read, then middle multi-level page 1104, etc., and four page reads may thus be needed to determine which of the QLC memory states 1110 is represented at a particular memory cell.

Due to the gray code encoding, bits stored in a cell may be determined by reading at the locations where bits change between memory states. These locations are referred to herein as memory state transitions. "Memory state transition" refers to a level, state, attribute, or threshold of a storage cell that indicate a change in memory state from a first memory state where the level is at or below a threshold to a second memory state in which the level is at or above the threshold. In certain embodiments, the memory state transition comprises a read level.

Advantageously, using a gray code encoding enables a multi-level page to be read by reading at a minimal number of read levels, also referred to herein as memory state transitions for a multi-level page. For example to read top multi-level page 1108, read operations at read level C 1010, read level E 1014, read level G 1018, read level I 1022, read level K 1026, and read level N 1032 are a sufficient number of reads to decode the data values for top multi-level page 1108 without reading at each default read level (read level A 1006-read level O 1034). Thus, reading the top multi-level page 1108 takes six read operations, uses six memory state transitions.

In contrast to read lower multi-level page 1102, a single read operation at read level H 1020 (between memory states G and H) is a sufficient number of reads to decode the data values for lower multi-level page 1102. No other reads are needed because the binary value is the same for memory states Er-G (e.g., '1') and for memory states H-O (e.g., '0'). Because the lower multi-level page 1102 includes only one memory state transition, one read level, the lower multi-level page may be faster to sense/read. The lower multi-level page 1102 may also inherently have a lower BER than multi-level pages with more than one read level/memory state transition.

In one embodiment, a multi-level storage cell encoding may determine how the binary encodings are done and thereby how many read levels or memory state transitions each multi-level page has. In one embodiment, as illustrated, a multi-level storage cell encoding may define one memory state transition for a lower multi-level page 1102 (between memory states G and H), two memory state transitions for a middle multi-level page 1104 (between memory states C-D and K-L), six memory state transitions for an upper multi-level page 1106 (between Er-A, B-C, E-F, I-J, L-M, and N-O), and six memory state transitions for a top multi-level page 1108 (at read level B 1008, read level E 1014, read level G 1018, read level 11022, read level K 1026, and read level N 1032, as shown). This configuration may be summarized by reference to the number of read levels or memory state transitions moving from the lower multi-level page to the top multi-level page. For example, the illustrated multi-level storage cell encoding is a '1-2-6-6' coding scheme.

FIG. 11 also identifies an attribute of a plurality of multi-level pages organized according to the illustrated model. In particular, in view of the multi-level storage cell encoding, certain multi-level pages may have a different data integrity than others. FIG. 11 illustrates a range 1112 that shows that, with the example multi-level storage cell encoding 1100, a top multi-level page 1108 has low data integrity 1114 and that the data integrity varies along a continuum to high data integrity 1116 for the lower multi-level page 1102. Advantageously, the claimed solutions use this difference to make data storage more efficient in data storage devices.

As indicated earlier, an example multi-level storage cell encoding 1100 may have a BER imbalance between the top multi-level page 1108 and the lower multi-level page 1102. Embodiments of the disclosed solutions adjust the coding rates for ECC codewords or FMUs stored on certain multi-level pages such that more data (e.g., to include a digest) may be stored on multi-level pages having high data integrity 1116 while using lower ECC strength and less data or redundant address information is stored on multi-level pages having low data integrity 1114 while using higher ECC strength.

The disclosed solutions may provide a more even BER between the multi-level pages. While a lower multi-level page 1102 may store more a digest, the addition of the digest includes a risk of being in error, however, this higher risk of bit errors may be counter-balanced by high data integrity 1116 that results in part because of the example multi-level storage cell encoding 1100. Specifically, a multi-level page having a fewest number of read levels and/or memory state transitions may have the highest data integrity among a set of multi-level pages stored on a single page. The embodiments disclosed herein may leverage this attribute to store more data on one multi-level page and even out BERs among multi-level pages.

Having even BERs may be desirable because then the performance of a storage device 200 may be more uniform and predictable and consistently meets the users expectations. In certain embodiments, having a digest on a lower multi-level page may be advantageous for reading data since only a lower multi-level page may need to be read to obtain address information for other multi-level pages.

Reading a lower multi-level page having high data integrity 1116 results in fewer bit errors which means a storage controller can return the read results faster. In addition, a lower multi-level page in accordance with example multi-level storage cell encoding 1100 may be read faster since an error correction code encoder may have a smaller set of redundancy data to process. In addition, a lower multi-level page in accordance with example multi-level storage cell encoding 1100 may be read faster since there is only one read level, one read operation, required to determine the binary values for memory cells on the lower multi-level page. Having a single read level means the sensing of the memory cells is completed in one low level read/sense operation and a single set of data is transferred between a memory die and the storage controller. If a multi-level page requires reading more than one read level, there is a low level read operation for each read level and a transfer operation for reach low level read operation.

Figure 12:
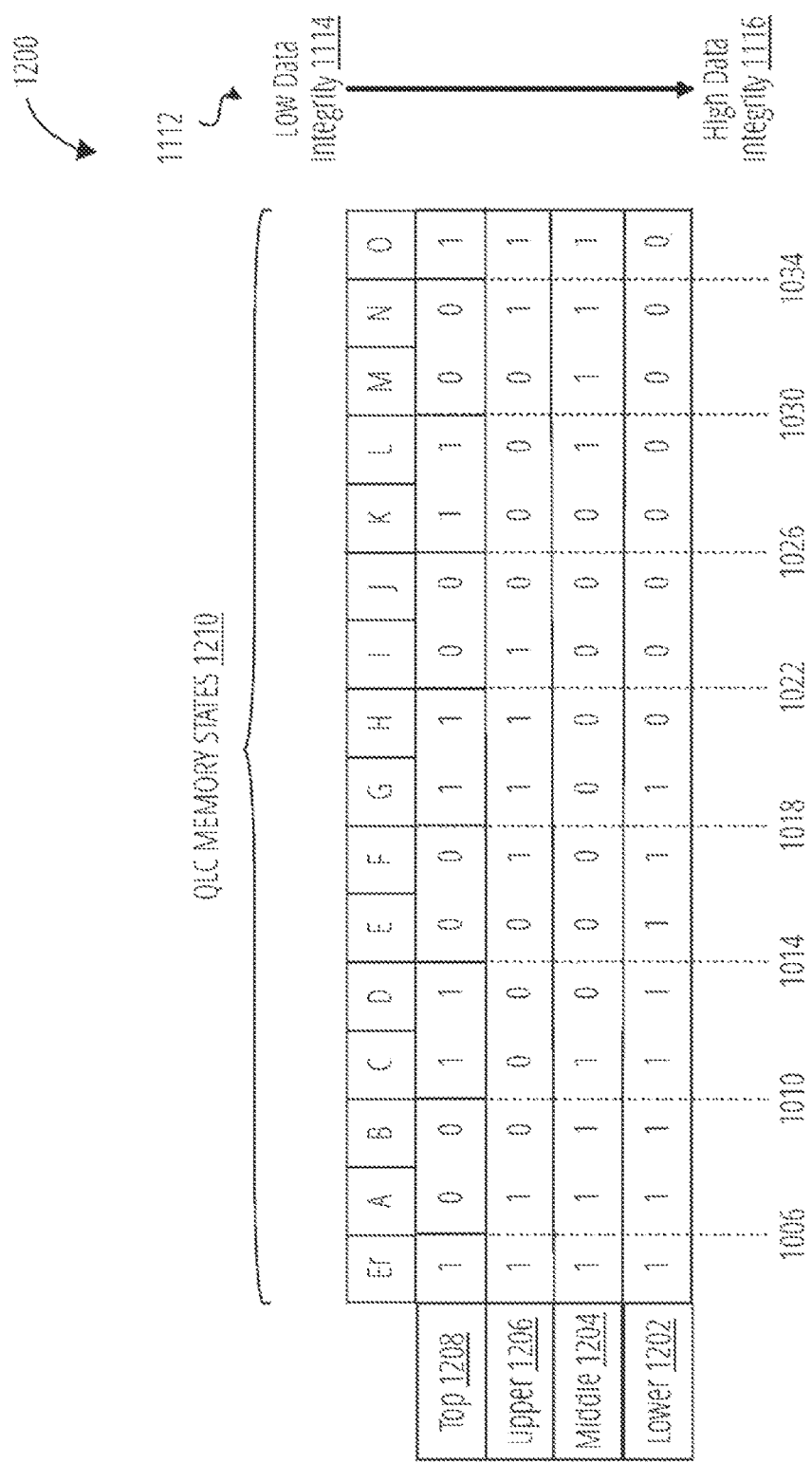
FIG. 12 illustrates an example multi-level storage cell encoding 1200 in accordance with one embodiment.

FIG. 12 illustrates example multi-level storage cell encoding 1200. The example multi-level storage cell encoding 1200 may be implemented using a memory structure having lower multi-level page 1202, middle multi-level page 1204, upper multi-level page 1206, and top multi-level page 1208 multi-level pages, as introduced in FIG. 9. The binary encodings comprise different binary values for the QLC memory states 1210.

In one embodiment, as illustrated, multi-level storage cell encoding may define one memory state transition for a lower multi-level page 1202 (between memory states G and H), two memory state transitions for a middle multi-level page 1204 (between memory states C-D and K-L), four memory state transitions for an upper multi-level page 1206 (between A-B, E-F, I-J and M-N), and eight memory state transitions for a top multi-level page 1208 (at read level A 1006, read level C 1010, read level E 1014, read level G 1018, read level I 1022, read level K 1026, read level M 1030, and read level O 1034) as shown. This configuration may be referred to as a "1-2-4-8" coding scheme.

Figure 13:
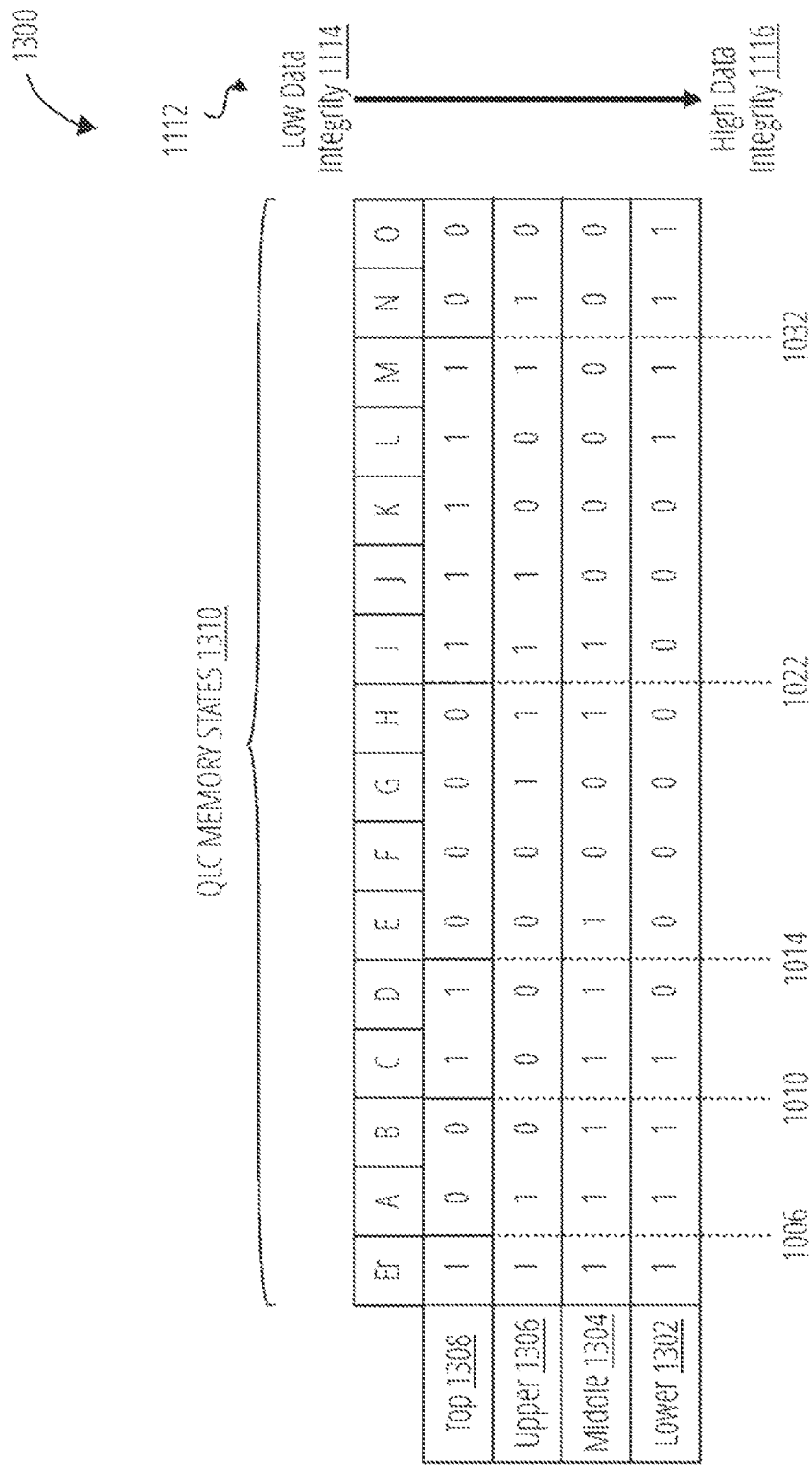
FIG. 13 illustrates an example multi-level storage cell encoding 1300 in accordance with one embodiment.

FIG. 13 illustrates example multi-level storage cell encoding 1300. The example multi-level storage cell encoding 1300 may be implemented using a memory structure having lower multi-level page 1302, middle multi-level page 1304, upper multi-level page 1306, and top multi-level page 1308 multi-level pages, as introduced in FIG. 9. The binary encodings comprise different binary values for the QLC memory states 1310.

In one embodiment, as illustrated, multi-level storage cell encoding may define two memory state transitions for a lower multi-level page 1302 (between memory states C-D and K-L), three memory state transitions for a middle multi-level page 1304 (between memory states E-F, G-H, and I-J), five memory state transitions for an upper multi-level page 1306 (between A-B, F-G, J-K, L-M, and N-O), and five memory state transitions for a top multi-level page 1308 (at read level A 1006, read level C 1010, read level E 1014, read level I 1022, and read level N 1032) as shown. This configuration may be referred to as a '2-3-5-5' coding scheme. Numerous additional coding schemes may be used to encode data upon multi-level pages. Those illustrated in FIG. 11 through FIG. 13 may be more likely to experience an imbalanced BER because of the different number of memory state transitions implemented on each page level, as compared to a '4-3-4-4' coding scheme or other more balanced scheme.

Figure 14:
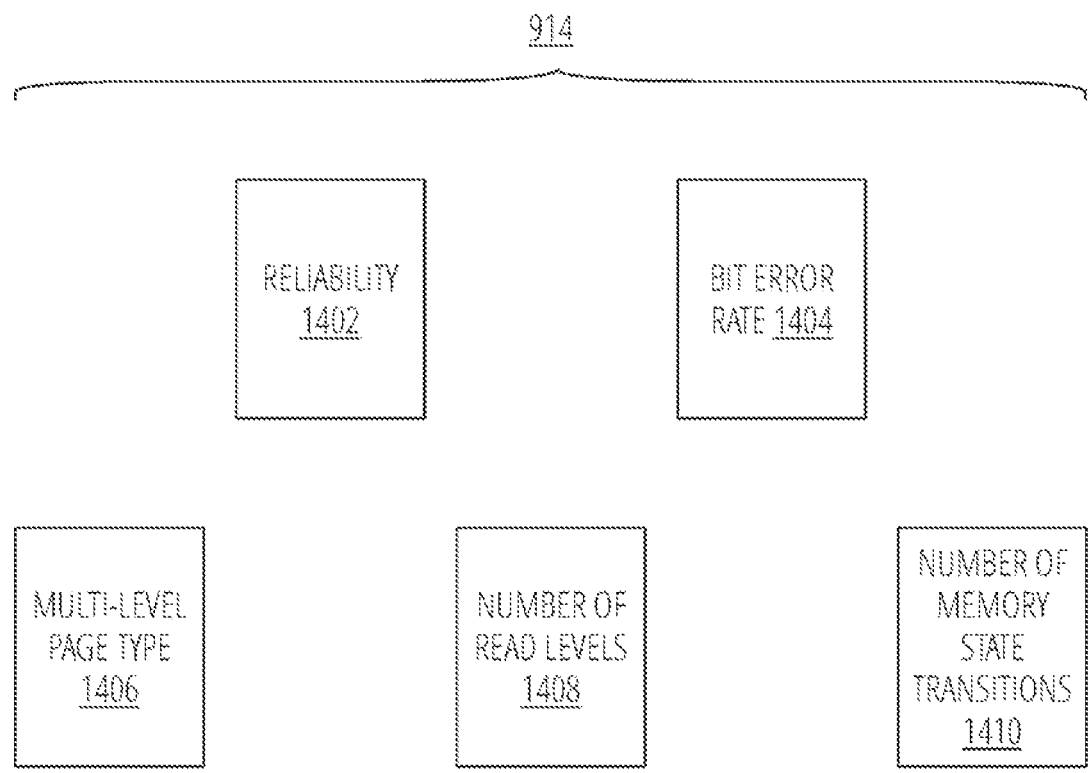
FIG. 14 illustrates example attributes for a multi-level page in accordance with one embodiment.

FIG. 14 illustrates the attributes 914 that may in some embodiments be assigned to multi-level pages. The attributes 914 may include a reliability attribute 1402, a bit error rate attribute 1404, a multi-level page type attribute 1406, a number of read levels attribute 1408, and a number of memory state transitions attribute 1410.

The reliability attribute 1102 may in some embodiments be used to indicate a multi-level page having known reliability issues, or to have been implemented in a more reliable type of memory structure. "Reliability attribute" refers to is an attribute that identify how reliable the thing associated with the reliability attribute is. A reliability attribute may comprise a single value or percentage. Alternatively, a reliability attribute may comprise a value in relation to a scale, such as a numeric scale from 1-10 in which a lower number represents less reliability and a higher number represents more reliability. "Reliability" refers to a state, quality, trait, or condition of an object, thing, device, or system to perform, function, or operate, within an expected range, level, or set of specifications over a number of iterations. Various factors may impact, or define a reliability attribute 1102. For example, the multi-level storage cell encoding used for a page may result in one multi-level page being more reliable than another multi-level page. This difference in reliability may define the reliability attribute.

In one embodiment, a reliability attribute 1102 may be represented as a value or percentage in relation to a range. For example, a reliability attribute 1102 may comprise a value between 0 and 100 represented as a percentage. The reliability attribute 1402 may be based on a multi-level storage cell encoding configured to define the plurality of multi-level pages within the page such that the reliability attribute of one multi-level page is greater than reliability attributes of each other multi-level page of the plurality of multi-level pages.

The bit error rate may be encoded as a bit error rate attribute 1404 in order to identify areas of memory such as multi-level pages that have been shown to have higher or lower bit error rates compared to other areas or with respect to a predefined BER threshold. The bit error rate attribute 1404 may indicate a lower bit error rate for at least one multi-level page than bit error rates for one or more other multi-level page of the plurality of multi-level pages.

The bit error rate attribute 1404 may comprise a value or setting directly connected to a bit error rate. The bit error rate attribute 1404 may represent a particular value or rate relative to a total number of bits. For example, a bit error rate may be a value between 0 and n where n is the number of bits in an ECC codeword. In certain embodiments, the bit error rate attribute 1404 may be predefined and based on research and development testing done when developing a storage device 200. In certain embodiments, the bit error rate attribute 1404 may comprise a media characteristic defined when a storage device 200 is placed into service and which may be periodically updated.

In certain embodiments, the media characteristics and attributes for a multi-level page may be inherent and/or generally fixed such that the type of multi-level page, as defined in the model described in relation to FIG. 9 is sufficient for gaining the benefits and advantages of the claimed embodiments. Accordingly, the multi-level page type attribute 1406 may comprise any identifier or indicator that identifies a type of multi-level page. In embodiments that use QLC memory cells, a multi-level page type attribute 1406 may identify the multi-level page as being of a type such as a lower multi-level page, a middle multi-level page, an upper multi-level page, and a top multi-level page.

A number of read levels attribute 1408 may indicate a number of read levels defined for the multi-level page by a multi-level storage cell encoding. For example, in memory encoded with a '2-3-5-5' gray code encoding, such as is illustrated in FIG. 13, the lower multi-level page 1302 may have a number of read levels attribute 1408 of "2" while the top multi-level page 1308 has a number of read levels attribute 1408 of "5." A number of memory state transitions attribute 1410 may indicate a number of memory state transitions defined for the multi-level page by a multi-level storage cell encoding. Read level H 1020 is one example of a memory state transition and a corresponding attribute for the lower multi-level page would be a value of '1'.

In certain embodiments, an attribute 514 for a multi-level page may relate to a specific aspect of a multi-level storage cell encoding used. For example, if a multi-level page has a single read level, for example of the attribute 514 comprises a number of read levels attribute 1108 equal to one. Such a multi-level page may store ECC codewords and/or FMUs configured such that the coding rate for the ECC codewords and/or FMUs leverages this single read level attribute. In another example, a multi-level page may have the attribute 514 that the multi-level page has a BER that is lower than other multi-level pages by a certain threshold. In this example, such a multi-level page may store ECC codewords and/or FMUs configured such that the coding rate for the ECC codewords and/or FMUs leverages the lower BER, for example by using a coding rate that has a lower ECC strength.

In the embodiments, disclosed herein, the coding rate may be adjusted to permit a digest to be stored with one or more ECC codewords and/or FMUs leverages of a lower multi-level page to make a storage device 200 more efficient. The storage device 200 may be more efficient for example, because address information for each multi-level page of a plurality of multi-level pages may be determined by making a single read and transfer of the lower multi-level page. Conventionally, a header scanner would need to read each multi-level page of a plurality of multi-level pages from a memory die and transfer the multi-level pages to the storage controller to determine the address information for each multi-level page.

Figure 15:
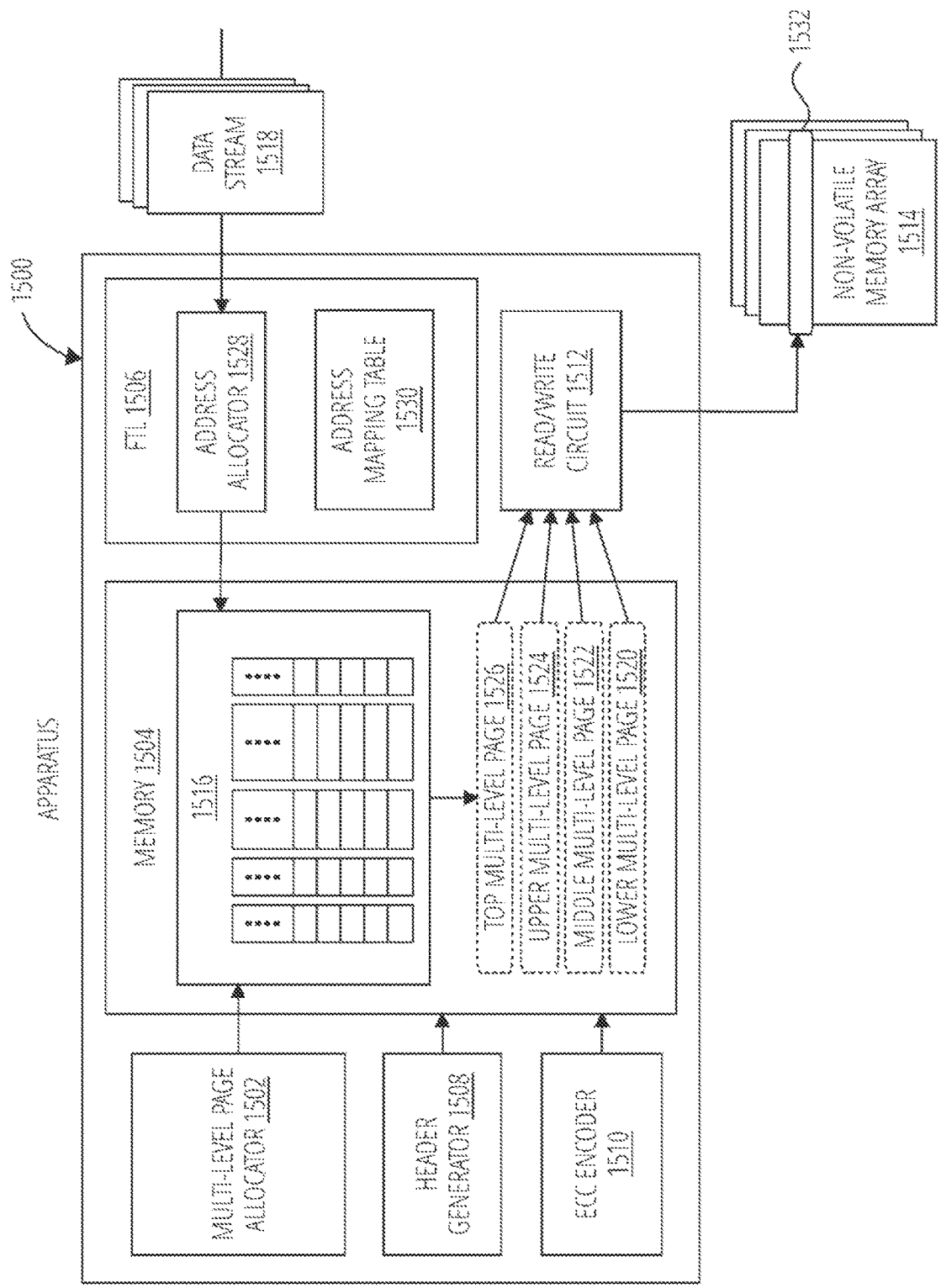
FIG. 15 illustrates an apparatus 1500 in accordance with one embodiment.

FIG. 15 illustrates an apparatus 1500 for implementing the solution disclosed herein. The apparatus 1500 comprises a multi-level page allocator 1502, a memory 1504, a flash translation layer 1506, a header generator 1508, an error correction code encoder 1510, a read/write circuit 1512, and a non-volatile memory array 1514.

The non-volatile memory array 1514 may comprise Quad-level Cell (QLC) NAND flash memory cells configured to store a lower multi-level page, a middle multi-level page, an upper multi-level page, and a top multi-level page, such as those illustrated in FIG. 9. "NAND flash memory" refers to a type of non-volatile storage media comprising storage cells organized into NAND strings. Depending on the capabilities of a die controller and storage controller for the NAND flash memory, the storage cells may store multiple bits of data in each cell. The lower multi-level page may have high data integrity 1116 than the middle multi-level page, the upper multi-level page, and the top multi-level page, as is illustrated in FIG. 11 through FIG. 13.

The memory 1504 may include a set of queues 1516, buffers, and other memory structures for preparing and processing data being prepared to be stored on, and read from, the non-volatile memory array 1514. Data being written to the non-volatile memory array 1514 may come from a data stream 1518 of data blocks. In one embodiment, the queues 1516 are First-in-First-out (FIFO) queues 1516 used to process data blocks for write commands. Data blocks from data stream 1518 may enter at the top and as the data blocks are prepared other data may be added to other queues 1516 to prepare for storing of the data blocks. Buffers such as lower multi-level page buffer 1520, middle multi-level page buffer 1522, upper multi-level page buffer 1524, and top multi-level page buffer 1526 may hold ECC codewords before the ECC codewords are stored to the non-volatile memory array 1514 by the read/write circuit 1512.

The multi-level page allocator 1502 may assign data blocks to each of the lower multi-level page buffer 1520, the middle multi-level page buffer 1522, the upper multi-level page buffer 1524, and the top multi-level page buffer 1526. "Multi-level page allocator" refers to any circuit, sub-circuit, electronic component, hardware, software, firmware, module, logic, device, or apparatus configured, programmed, designed, arranged, or engineered to determine, assign and/or allocate one or more data blocks to a multi-level page or physical page of storage cells including multi-level storage cells. In certain embodiments, a multi-level page allocator may assign data blocks to flash management units which the multi-level page allocator assigns to multi-level page or physical page of storage cells. The data blocks may comprise write data for a set of write commands, such as the write data 612 and write command 610 introduced in FIG. 6. The multi-level page allocator 1502 may assemble portions of data into sequences intended for the lower multi-level page buffer 1520 through top multi-level page buffer 1526 as described in greater detail with regard to FIG. 16A and FIG. 16B.

The flash translation layer 1506 may include an address allocator 1528 to determine address information for the assigned data blocks. The address allocator 1528 may accept a data stream 1518 of write data and may access an address mapping table 1530, similar to the address mapping table 604 described with respect to FIG. 6, in order to keep track of address allocations assigned to each portion of the write data. The address allocator 1528 may provide address information to the multi-level page allocator 1502.

In implementing the disclosed solution, the multi-level page allocator 1502 may allocate write data from the data stream 1518 to each of a plurality of multi-level pages configured for storage on a page of the non-volatile memory array 1514. The address allocator 1528 may associate a digest with write data of one multi-level page of the plurality of multi-level pages based on an attribute of the one multi-level page. This attribute may be different from attributes of each other multi-level page of a plurality of multi-level pages. The multi-level page allocator 1502 may reduce an amount of redundancy data configured to be stored with write data on the one multi-level page to account for the associated digest. In other words, the size of the redundancy data may be reduced by the same amount as the size of the digest. This is described in further detail with respect to FIG. 16A and FIG. 16B.

The header generator 1508 may generate headers for flash management units (FMUs) that include the assigned data blocks. The headers may include the determined address information and may include this address information in the form of a digest for FMUs assigned to the middle multi-level page buffer 1522, the upper multi-level page buffer 1524, and the top multi-level page buffer 1526. The header generator 1508 may combine the digest with at least one FMU assigned to the lower multi-level page buffer 1520. The header generator 1508 may coordinate with the multi-level page allocator 1502.

The error correction code encoder 1510 may generate ECC codewords for each FMU assigned to the middle multi-level page buffer 1522, the upper multi-level page buffer 1524, and the top multi-level page buffer 1526. The error correction code encoder 1510 may generate a lower page ECC codeword for each FMU assigned to the lower multi-level page buffer 1520. "Lower page ECC codeword" refers to an ECC codeword designated to be stored on a lower multi-level page of a page of a non-volatile storage media. At least one lower page ECC codeword comprises redundancy data reduced in size proportional to a size of the digest of an associated FMU, the digest included in the at least one lower page ECC codeword. The error correction code encoder 1510 may be configured such that each ECC codeword and lower page ECC codeword is the same size.

The read/write circuit 1512 may store the ECC codewords within a middle multi-level page, an upper multi-level page, and a top multi-level page and the lower page ECC codeword to the lower multi-level page of a word line, or page 1532, of the non-volatile memory array 1514. In certain embodiments, at least one ECC codeword, for example the lower page ECC codeword, may include the reduced redundancy data, address information for the write data of the one multi-level page, and a digest comprising address information for the write data of the plurality of multi-level pages. Other ECC codewords may include write data for other multi level pages of the plurality of multi-level pages. In one embodiment, for each other multi-level page, the redundancy data may not be reduced in size, and the data of the other multi-level pages may not include a digest. Consequently, the ECC codewords for each other multi-level page of the plurality of multi-level pages may have more redundancy data than one or more ECC codewords stored on a lower multi-level page.

Figure 16A:
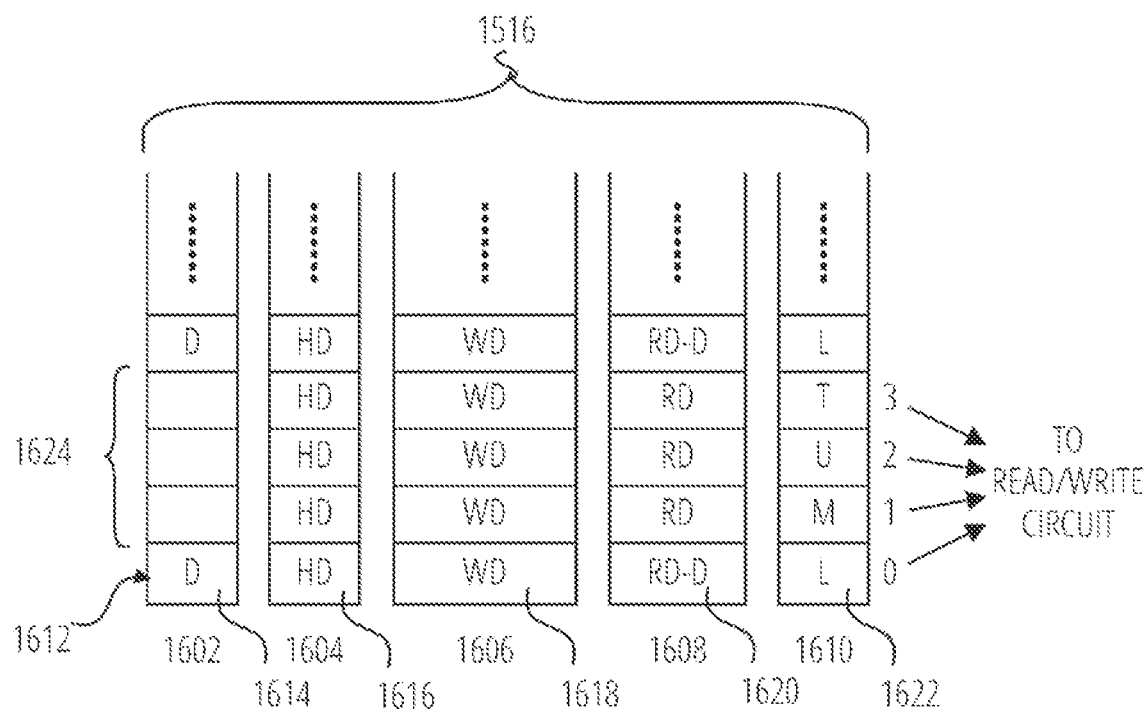
FIG. 16A illustrates an aspect of the subject matter in accordance with one embodiment.

FIG. 16A illustrates example data within queues 1516. Data in the queues 1516 may be used to generate ECC codewords that protect FMUs. The data structures within the FIFO queues 1516 may include a digest queue 1602, a header queue 1604, a write data queue 1606, and a redundancy data queue 1608. These elements may differ from one ECC codeword to the next depending on a multi-level page type assigned in a multi-level page type queue 1610 for each ECC codeword.

A first ECC codeword 1612 may include a digest 1614 'D', a header 1616 'HDR', write data 1618 'WD', reduced redundancy data 1620 'RD-D' (redundancy data minus digest), and multi-level page assignment 1622 'L' (L for lower multi-level page, M for middle multi-level page, U for upper multi-level page, and T for top multi-level page). In one embodiment, the header 1616 includes address information for an ECC codeword assigned to the lower multi-level page. In another embodiment, the header 1616 may not include the address information for an ECC codeword assigned to the lower multi-level page. Instead, such address information may be included in the digest 1614 with address information for a set of other multi-level pages.

The multi-level page allocator 1502 may generate the multi-level page assignment 1622 for the multi-level page type queue 1610. The example illustrated in FIG. 16A, shows queues 1516 for a single ECC codeword assigned to one multi-level page. Those of skill in the art will recognize that the same design may be extended to generate a plurality of ECC codewords for each multi-level page. Reading from bottom to top, the multi-level page allocator 1502 may allocate each entry in the queues 1516 to a multi-level page (e.g., 'L, M, U, T') and start over with the lower multi-level page after each available multi-level page is assigned.

The header generator 1508 may generate the headers for the header queue 1604. In one embodiment, the header generator 1508 may also generate a digest for one multi-level page of a plurality of multi-level pages. The digest may include address information for the other multi-level pages (excluding the lower multi-level page) of the plurality of multi-level pages. For example, in FIG. 16A, the digest 1614 may include address information for the next three ECC codewords (found in the headers) in the queues 1516. Alternatively, the digest may include address information for each multi-level page (including the lower multi-level page) of the plurality of multi-level pages. If an assigned multi-level page 1808 does not include a digest, the header generator 1508 may not place a digest in the digest queue 1602, alternatively, the header generator 1508 may place an empty place holder 1624 in the digest queue 1602. The error correction code encoder 1510 may generate the redundancy data for the redundancy data queue 1608.

The error correction code encoder 1510 may pull from data from each of the digest queue 1602, header queue 1604, write data queue 1606, and redundancy data queue 1608 to form an ECC codeword. After generating the first ECC codeword 1612, the error correction code encoder 1510 may generate a plurality of ECC codewords for the other multi-level pages ('M'-'T'). While first ECC codeword 1612 includes a digest 1614, the first ECC codeword 1612 also includes reduced redundancy data 1620 such that the first ECC codeword 1612 is the same size as ECC codewords generated based on other entries in the queues 1516.

Figure 16B:
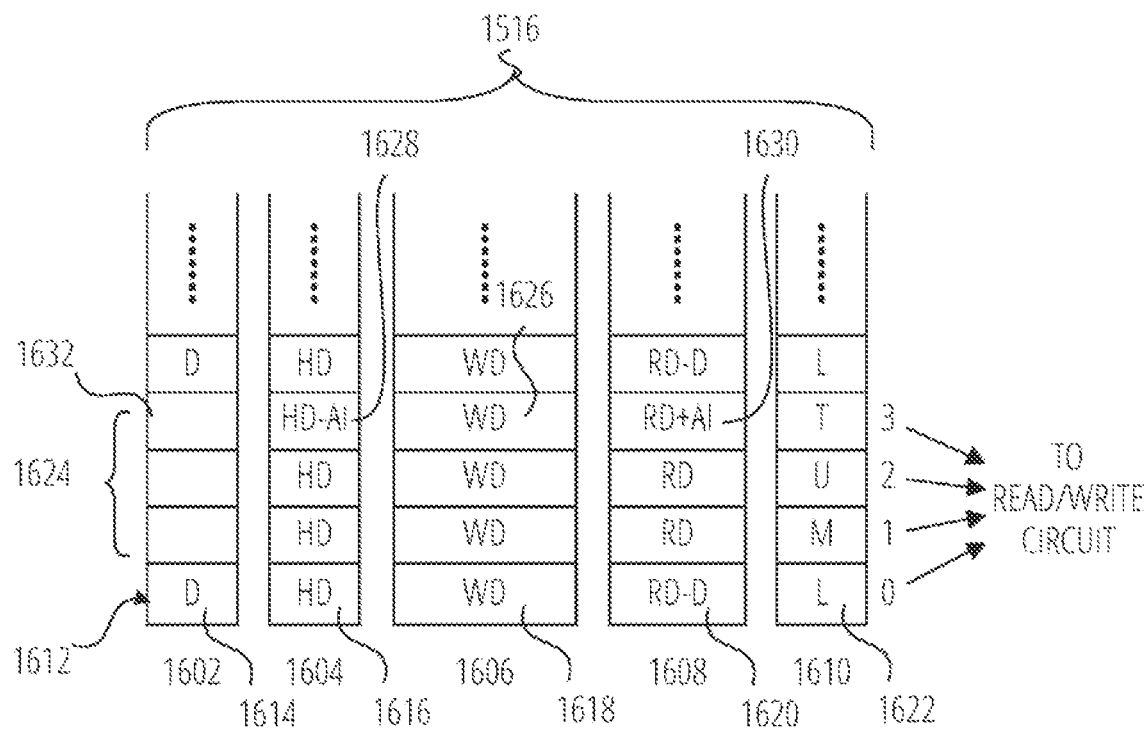
FIG. 16B illustrates an aspect of the subject matter in accordance with one embodiment.

FIG. 16B illustrates the component portions of data that may be used to generate an ECC codeword. FIG. 16B includes similar components to those of FIG. 16A. FIG. 16B illustrates an example embodiment, in which a multi-level page other than the lower multi-level page has a different coding rate, in addition to, or in place of, a different coding rate used for the lower multi-level page.

For example, suppose the top multi-level page has an attribute indicating that the top multi-level page has a high BER, low data integrity 1114. In such an embodiment, the digest 1614 may be used to track the address information for the write data 1626. This means that the address information for the write data 1626 may be omitted from a header 1628 based on the attribute. Omitting the address information (e.g., 'AI') reduces the size for an ECC codeword for the top multi-level page. In certain embodiments, the error correction code encoder 1510 may increase the redundancy data 1630 by the same number of bits that were being used for the address information. In this manner, the ECC codeword of the top multi-level page receives increased ECC strength and the ECC codeword generated will be of the same size as the other ECC codewords generated and stored.

The redundancy data configured to be stored with the write data of the other multi-level page 1632 may be increased to account for the omitted address information, as is shown by redundancy data 1630 (redundancy data plus address information=RD+AI). The redundancy data 1630 and the write data 1626 of the other multi-level page 1632 may be stored on the page along with the write data for each other multi-level page of the plurality of multi-level pages.

Figure 17:
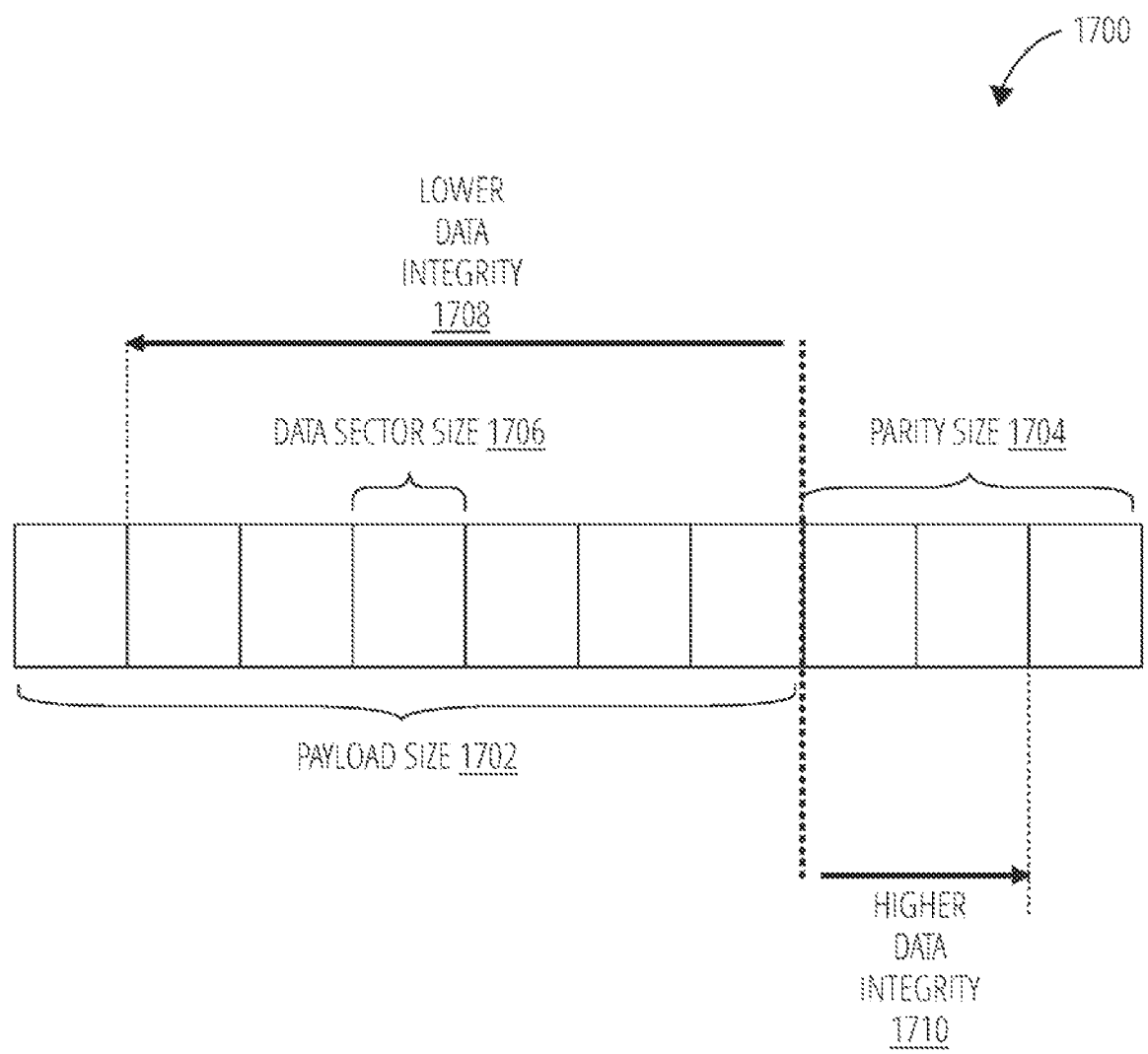
FIG. 17 illustrates an ECC codeword 1700 in accordance with one embodiment.

FIG. 17 illustrates an ECC codeword 1700 and a dynamic or variable size of components of the ECC codeword in accordance with one embodiment. The ECC codeword 1700 may comprise a payload and a parity section as introduced in FIG. 7. The payload size 1702 and parity size 1704 of the ECC codeword 1700 may vary as indicated by the dotted lines. "Payload size" refers to a size measured in data storage units for a payload of an ECC codeword. "Parity size" refers to a size measured in bits or bytes or some other data storage measurement unit for a parity section.

The data sector size 1706 of the sectors that make up the payload and parity sections may remain fixed, and the payload size 1702 and parity size 1704 may vary by a fixed number of bytes. For an ECC codeword 1700 having a lower data integrity 1708 or projected to have a lower data integrity 1708, the parity size 1704 may be increased. For an ECC codeword 1700 having or projected to have higher data integrity 1710, the payload size 1702 may be increased. As illustrated, if the payload size 1702 increases, then the parity size 1704 decreases by a proportional amount. Similarly, if the payload size 1702 decreases, then the parity size 1704 increases by a proportional amount. In certain embodiments, even though the payload size 1702 and parity size 1704 may change in size, the overall size of the ECC codeword may remain the same.

"Data sector" refers to a data structure used to manage data of a particular size and/or format. In certain embodiments, a data sector may comprise 512 bytes and eight data sectors may form a data block. "Data integrity" refers to an attribute or measure of data, or a data sample, indicating whether the data is accurate, not erroneous, and unchanged from a prior transmission or recording of the data. In certain embodiments, data integrity is an objective characteristic. In other embodiments, data integrity may be expressed in relation to a spectrum in which one end represents no, or very low data integrity and the opposite end represents perfect, or very high data integrity.

In certain embodiments, the coding rate for an ECC codeword may be changed to reflect a different data integrity for a non-volatile storage media and/or data transmission media. In certain embodiments, a multi-level page and/or an attribute of a multi-level page may provide an indication of the data integrity for data stored on that multi-level page such that a coding rate can be determined that differs from a default coding rate.

For example, where the error correction code encoder supports ECC codewords of variable coding rates, certain embodiments may determine a coding rate based on attributes of a multi-level page. In certain embodiments, a packetizer or error correction code encoder may determine the coding rate for an ECC codeword.

Determining the coding rate may comprise increasing the payload size 1702 in response to an attribute indicating a greater data integrity for data stored on the multi-level page that is assigned to the ECC codeword 1700. In particular, the payload size 1702 may be increased, and the parity size 1704 decreased, based on the data integrity of the ECC codeword 1700 being higher in relation to other multi-level pages that will be stored on the same multi-level storage cells. Alternatively, or in addition, the payload size 1702 may be decreased, and the parity size 1704 increased, based on the data integrity of the ECC codeword 1700 being lower in relation to other multi-level pages that will be stored on the same multi-level storage cells.

In certain embodiments, the relationship between data integrity among different multi-level pages on the same multi-level storage cells may be represented by a reliability attribute. In such an embodiment, an error correction code encoder or packetizer may determine the coding rate for an ECC codeword by increasing a coding rate for the at least one multi-level page in response to the at least one multi-level page having a greater reliability attribute than other multi-level pages. Or an error correction code encoder or packetizer may determine the coding rate for an ECC codeword by decreasing a coding rate for the at least one multi-level page in response to the at least one multi-level page having a lower reliability attribute than other multi-level pages.

In certain embodiments, a storage controller may adjust the payload size 1702 by the size of a digest, for example increasing the payload size 1702 to include the digest in the payload and reduce the parity size 1704 such that the ECC codeword size remains constant. Such an adjustment may be done in anticipation that the ECC codeword will be stored on non-volatile storage media with higher data integrity 1710. In one embodiment, a digest may be 16 bytes. Similarly in other embodiments, a storage controller may decrease a payload size 1702 by a size of address information in a header and increase a size of the parity size 1704 such that the resulting ECC codeword can be stored on non-volatile storage media having a lower data integrity 1708 attribute. In one embodiment, the address information may be 6 bytes.

Figure 18:
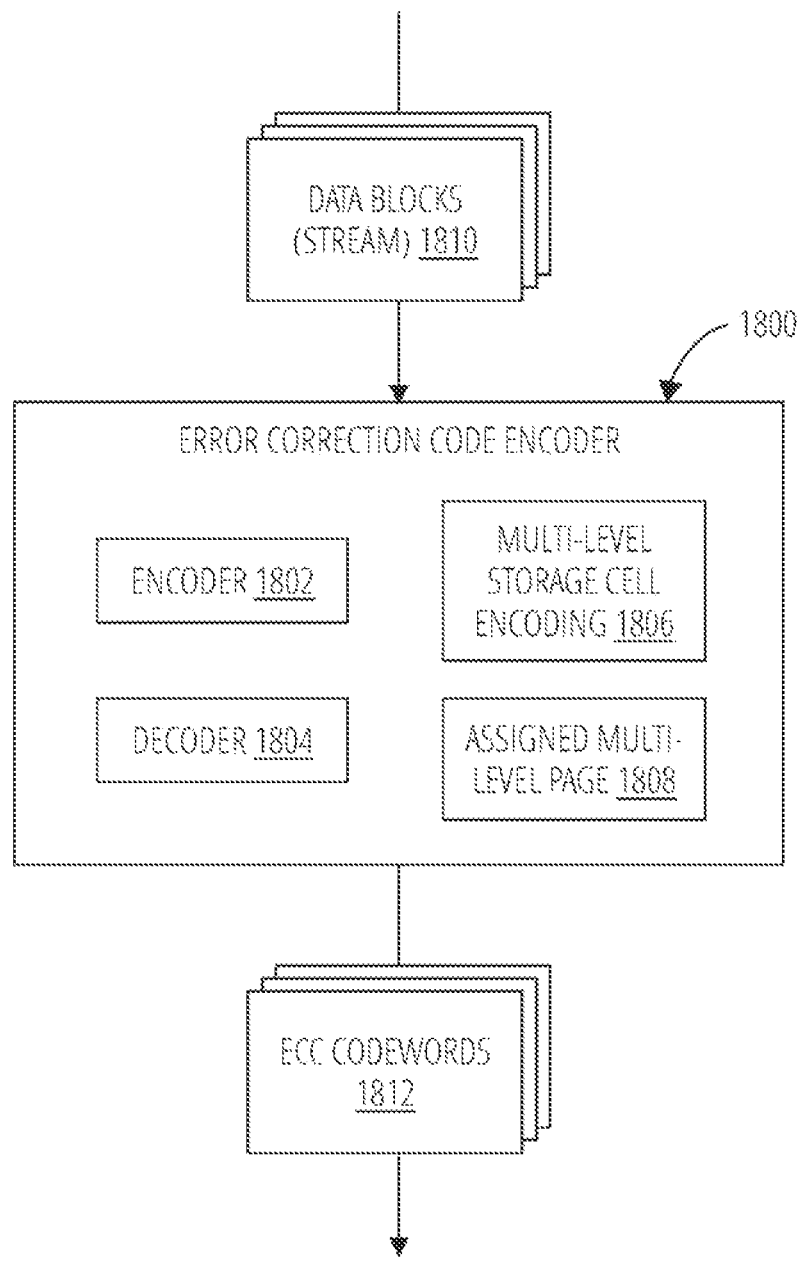
FIG. 18 illustrates an error correction code encoder 1800 in accordance with one embodiment.

FIG. 18 illustrates an error correction code encoder 1800 in accordance with one embodiment. The error correction code encoder 1800 may comprise an encoder 1802, a decoder 1804, a multi-level storage cell encoding 1806, and an assigned multi-level page 1808. The error correction code encoder 1800 may accept an input of data block 1810 and produce ECC codewords 1812 as its output.

"Error correction code encoder" or "ECC manager" refers to any hardware, software, firmware, circuit, component, module, logic, device, or apparatus configured, programmed, designed, arranged, or engineered to detect and/or correct errors in a data set using redundancy information defined for the data set (e.g., a codeword that includes the data set and the redundancy information). The error correction code encoder, in one embodiment, may be configured to implement any suitable ECC algorithm and/or generate ECC codewords of any suitable type or length, which may include, but are not limited to, data segments and corresponding ECC syndromes, ECC symbols, ECC chunks, and/or other structured and/or unstructured ECC information. The error correction code encoder may be configured to generate ECC codewords of one or more pre-determined sizes.

The error correction code encoder may comprise one or more types of decoder(s), including, but not limited to, a low density parity check (LDPC) decoder, a Reed-Solomon code decoder, a Golay code decoder, a Bose Chaudhuri Hocquenghem (BCH) code decoder, a turbo code decoder, a multidimensional parity code decoder, a Hamming code decoder, a Hadamard code decoder, an expander code decoder, a Reed-Muller code decoder, a Viterbi decoder, a Fano decoder, or the Ike.

The encoder 1802 is configured to encode data from one or more data blocks 1810 into an ECC codeword 1812 that includes a payload and a parity section. The encoder 1802 encodes data (e.g., the message) of the data blocks into the redundancy data such that if the data of the data blocks is corrupted, or in error, or missing, the decoder 1804 can determine that the data of the data blocks is in error and which bits are in error, and may be able to correct the bits that are erroneous based on the data of the payload and the redundancy data of the parity section. The encoder 1802 determines which data block, or data blocks, are used for a payload and defines the redundancy data associated with the payload such that errors in the data, generally a certain number of bit errors, are detectable and correctable using the decoder 1804.

In certain embodiments, the encoder 1802 is configured to adjust a size of the redundancy data stored in the parity section relative to a size of the data in the payload. Said another way, the encoder 1802 may be configured to support a variable size parity section (e.g., redundancy data) and/or a variable payload size.

An error correction code encoder 1800 is configured to generate redundancy data in relation to an amount of data being encoded according to a coding rate. "Coding rate" or "information rate" refers to the proportion of the data-stream that is useful (non-redundant). That is, if the code rate is k/n for every k bits of useful information, the coder/encoder generates a total of n bits, of which n-k are redundant. (Search "code rate" on Wikipedia.com Feb. 18, 2019. Modified. Accessed Jul. 28, 2020.) Another way to understand coding rate is that it is a ratio (k/n) of the amount of data or information (k) included in an ECC codeword of n total bits compared to the amount of redundancy data (e.g. Parity data or Error correction code data).

In certain embodiments, the error correction code encoder 1800 is configured to change a coding rate for certain ECC codewords 1812 and the certain ECC codewords 1812 remain the same size regardless of variations in the coding rates between ECC codewords. Mere the ECC codewords retain the same size and the coding rate is changed, the changed coding rate impacts a strength of the error correction code. "ECC strength" refers to a relative measure for how capable an error correction code encoder is in detecting and recovering erroneous bits in a message that includes error correction code protection.

Furthermore, ECC strength refers to a measure of how many bits of a message an error correction code encoder is capable of detecting are in error and/or configured to correct. ECC strength may be based on the type of error correction code methods used and/or an amount of redundancy data associated with the message. Generally, the more redundancy data associated with a message, the more erroneous bits that are detectable and the more erroneous bits that are correctable.

In certain embodiments, the error correction code encoder 1800 is configured to use different coding rates for encoding ECC codewords 1812 based on some parameter, attribute, or media characteristic, of the data blocks or another input signal, or value, provided to the error correction code encoder 1800. For example, in one embodiment, the error correction code encoder 1800 is configured to use a different coding rate depending on the multi-level storage cell encoding 1806 being used for one or more ECC codewords 1812 and/or which multi-level page, assigned multi-level page 1808, the ECC codewords 1812 will be stored on. In another embodiment, the multi-level storage cell encoding 1806 is predefined and the error correction code encoder 1800 is configured to encode and decode ECC codewords using a particular coding rate based on the predefined multi-level storage cell encoding 1806, In such an embodiment, the error correction code encoder 1800 may encode and decode ECC codewords based on an assigned multi-level page 1808 for the ECC codeword.

In one embodiment, the error correction code encoder 1800 is configured to change a coding rate for one or more ECC codewords based on an identified or predefined multi-level storage cell encoding 1806 and/or an assigned multi-level page 1808 for the ECC codewords. The assigned multi-level page 1808 may comprise data that identifies which multi-level page one or more ECC codewords are to be stored on, or were read from. Based on the assigned multi-level page 1808, the error correction code encoder 1800 may determine which coding rate to use for both encoding and decoding the data of the ECC codewords.

As described in more detail below, certain multi-level storage cell encoding 1806 may impact, relate, or be associated with, certain attributes of multi-level pages and the data of the multi-level pages that is stored on a page of a non-volatile memory array. One of these attributes may be a reliability attribute based on a multi-level storage cell encoding 1806 configured to define a plurality of multi-level pages. Two or more of the plurality of multi-level pages may have different reliability attributes, which may be managed by using ECC codewords having different ECC strengths (e.g., coding rates) depending on which multi-level page a particular ECC codeword is stored on.

Figure 19A:
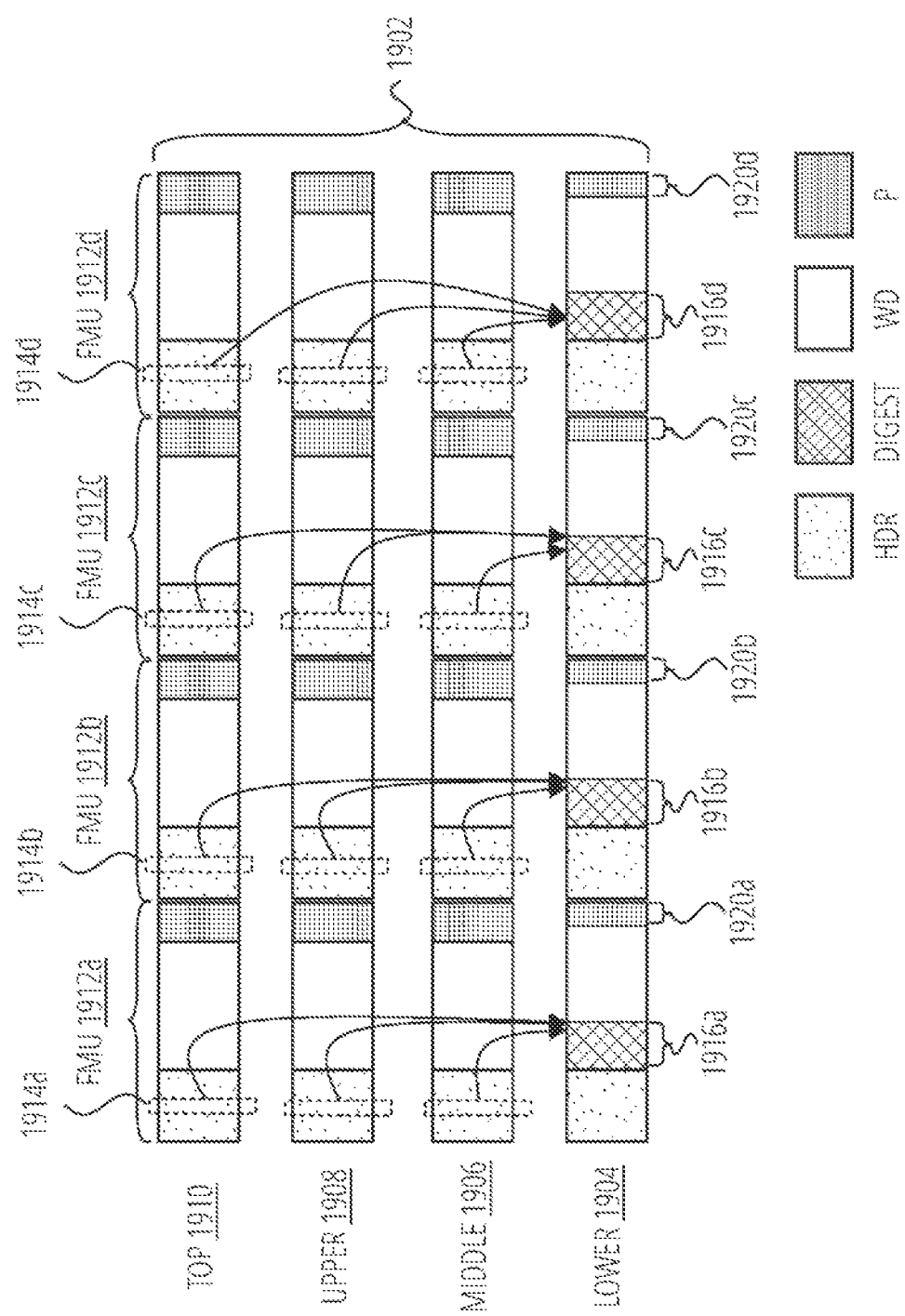
FIG. 19A illustrates an allocation of a digest implemented as a set of digests within a lower multi-level page in accordance with one embodiment.

FIG. 19A illustrates configurations of multi-level pages 1902 and their composition in accordance with one embodiment. FIG. 19A illustrates four multi-level pages 1902 (e.g., lower multi-level page 1904, middle multi-level page 1906, upper multi-level page 1908, and top multi-level page 1910) that can be stored on a single page of a non-volatile memory array. In the Illustrated embodiment, each multi-level page may include four FMUs: FMU 1912a, FMU 1912b, FMU 1912c, and FMU 1912d. Each FMU includes a header and a parity section. Each header includes address information 1914a-address information 1914d.

The embodiment of FIG. 19A illustrates one example of a digest and storing the digest in the FMUs of one of the multi-level pages 1902, specifically, the lower multi-level page 1904. In one example embodiment, the digest may comprise a set of digests (e.g., digest 1916a-digest 1916d). As shown, each digest 1916a, digest 1916b, digest 1916c, and digest 1916d (member of the set of digests) can comprise address information from an FMU in one of the other multi-level pages 1902 (e.g., middle multi-level page 1906, upper multi-level page 1908, and top multi-level page 1910). In this manner the set of digests may include address information for the write data of each other multi-level page of the plurality of multi-level pages.

Each digest 1916a, digest 1916b, digest 1916c, and digest 1916d of the set of digests may be stored with a separate FMU on the lower multi-level page 1904. It may be desirable that each FMU of the multi-level pages 1902 have the same fixed size. Accordingly, a storage controller may reduce the size of one of the fields of an FMU and/or an ECC codeword to accommodate the addition of a digest to an FMU and/or ECC codeword. In one example, the size of the write data field for an FMU may remain unchanged and instead the redundancy data of the parity section may be reduced by the same size as the digest. This size reduction may be 6 bytes. Reducing the size of the parity section by 6 bytes may reduce the ECC strength of the ECC codeword. However, this reduced ECC strength may be compensated for by an increased data integrity due to a multi-level storage cell encoding used to generate the multi-level pages 1902. The increased data integrity of a multi-level page, such as the lower multi-level page may be identified by an attribute of the multi-level page.

Figure 19B:
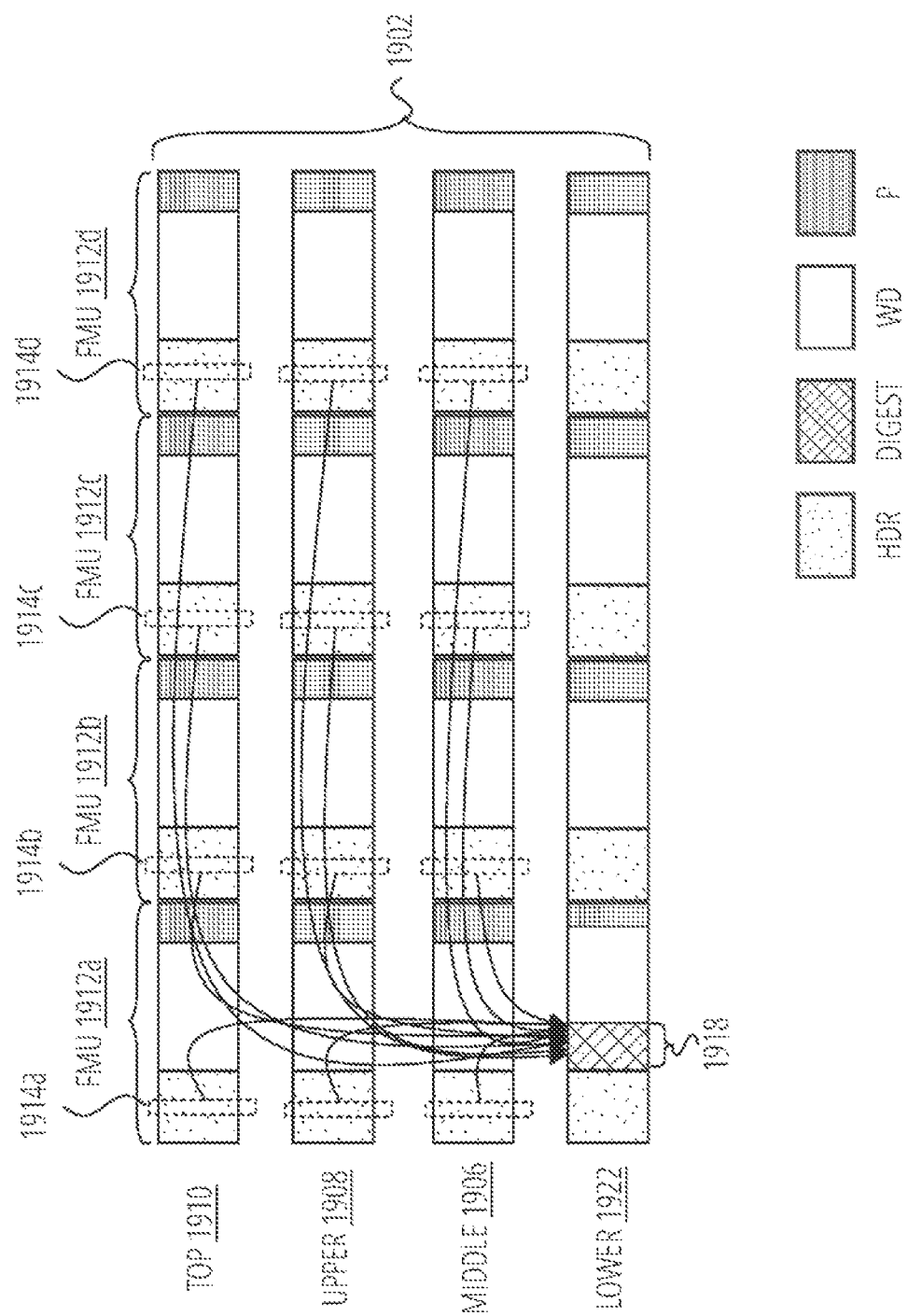
FIG. 19B illustrates an allocation of a digest within a lowermulti-level page in accordance with one embodiment.

While FIG. 19A and FIG. 19B are not drawn to scale, the parity section 1920a is shown narrower than parity sections on the other multi-level pages to convey that the parity section 1920a includes a reduced set of redundancy data. FIG. 19B includes this same sizing difference for the same reason. FIG. 19A illustrates that address information for FMUs of the lower multi-level page 1904 are not included in the set of digests. However, in an alternative embodiment, the digest, such as the set of digests (digest 1916a-digest 1916d) may each include address information for an FMU that includes the digest.

In at least one embodiment, a digest, such as digest 1916a-digest 1916d may include data from an FMU header that includes address information and other metadata from the header. For example, in one embodiment, the digest may include header metadata from the headers of the top multi-level page 1910, upper multi-level page 1908, middle multi-level page 1906, and/or lower multi-level page 1904. In one embodiment, header metadata includes a subset of the data, such as the metadata, in the header or storage adjacent to the header.

FIG. 19B illustrates an alternative embodiment in which the lower multi-level page 1922 comprises a single FMU that includes a digest, digest 1918. Digest 1918 includes address information for the write data of each other multi-level page (e.g., middle multi-level page 1906, upper multi-level page 1908, and top multi-level page 1910) of the plurality of multi-level pages. Other FMUs may not include a digest. Of course, those of skill in the art will recognize that various numbers of FMUs on the lower multi-level page 1922 may include a digest or a member of a set of digests and come within the spirit and intent of the embodiments, disclosed herein.

The embodiment of FIG. 19A illustrates a digest separate from the header. In certain embodiments, the digest, such as digest 1916a-digest 1916d or digest 1918 may be incorporated into the header of one or more ECC codewords that each include a header, write data, and reduced redundancy data. The reduced redundancy data may be reduced by the same number of bytes as the digest for a particular ECC codeword. The ECC codeword may include an FMU.

The embodiment of FIG. 19A provides advantages for determining the address information for the FMUs stored on each of the multi-level pages 1902. Specifically, a storage controller may perform a header scanning operation (i.e., a review or inspection of address information from each header) by performing a single multi-level page read of the page storing the multi-level pages 1902.

The storage controller may signal a memory die to read the lower multi-level page 1904. The memory die may read the lower multi-level page 1904 without reading data of the other multi-level pages 1902. Advantageously, where the lower multi-level page 1904 is stored according to a multi-level storage cell encoding that assigns a small number (1 or 2) read levels to the lower multi-level page 1904, the lower multi-level page 1904 can be read very quickly and very efficiently. The memory die transfers the data of the lower multi-level page 1904 to the storage controller and the error correction code encoder decodes the ECC codewords (which include FMU 1912a-FMU 1912d) to provide accurate and/or error corrected FMUs. The storage controller may then parse the FMUs to determine address information for the lower multi-level page 1904 and may parse the digest, such as digest 1916a-digest 1916d or digest 1918, to determine address information for the write data of each other multi-level page of the multi-level pages 1902. As illustrated, each FMU 1912a FMU 1912d of the lower multi-level page 1904 includes a digest including address information for the write data of the middle multi-level page 1906, upper multi-level page 1908, and top multi-level page 1910.

Figure 20:
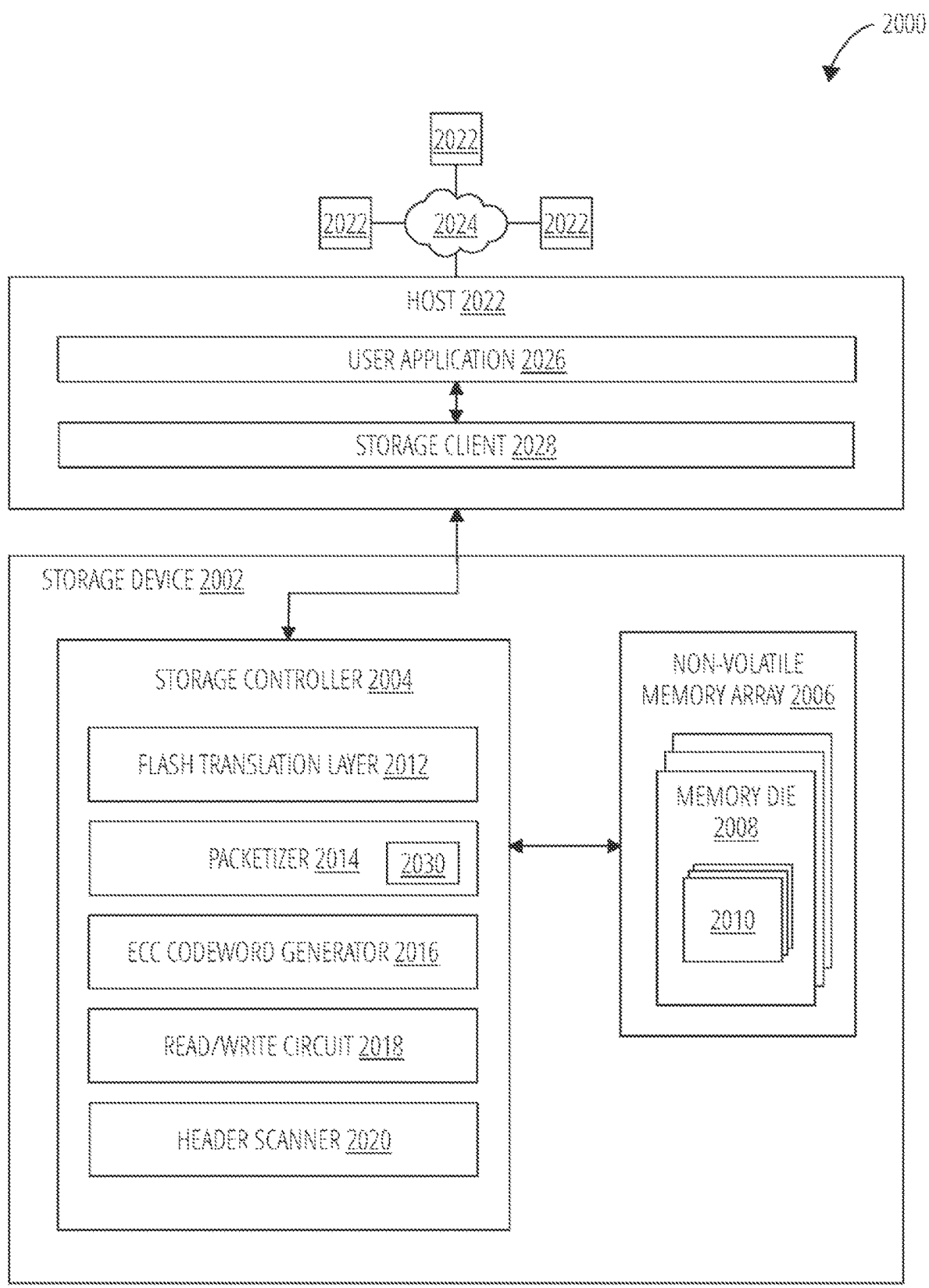
FIG. 20 is a block diagram of an example storage system 2000 in accordance with one embodiment.

FIG. 20 is a schematic block diagram of a storage system 2000 in accordance with one embodiment. The storage system 2000 may include a storage device 2002 that comprises a storage controller 2004 and non-volatile memory array 2006. The non-volatile memory array 2006 may comprise memory die 2008 containing storage blocks 2010 implementing Quad-level Cell (QLC) memory cells.

The storage controller 2004 may further comprise a flash translation layer 2012, a packetizer 2014, an ECC codeword generator 2016, a read/write circuit 2018, and a header scanner 2020. Those of skill in the art will appreciate that these components may be incorporated within other parts of the storage device 2002, or may be carried out by a host 2022 in certain embodiments. The host 2022 may be connected to multiple hosts 2022 over a network 2024. A user application 2026 on the host 2022 may use a storage client 2028 to access data in the storage device 2002.

The flash translation layer 2012 may convert a logical block address (LBA) of a storage command into a physical block address (PBA) assigned to a multi-level page of QLC memory cells within the storage blocks 2010 of the nonvolatile memory array 2006, The flash translation layer 2012 may determine address information for the write data of the multi-level pages.

The flash translation layer 2012 may associate write data of a plurality of write commands with multi-level pages of a plurality of multi-level pages, the multi-level page having a type selected from the group consisting of a lower multi-level page, a middle multi-level page, an upper multi-level page, and a top multi-level page. The flash translation layer 2012 may send a signal to the ECC codeword generator 2016, along with a payload containing write data associated with the plurality of write commands.

A packetizer 2014 comprising a header generator 2030 may generate a set of headers for flash management units that comprise the write data of the multi-level pages. "Header generator" refers to any hardware, software, firmware, circuitry, component, module, logic, device, or apparatus configured, programmed, designed, arranged, or engineered to generate, edit, modify or revise a header. The header generator 2030 may generate an extended header for flash management units configured to be stored on the lower multi-level page. "Extended header" refers to header that is extended or resized, either dynamically or upon creation, to hold more data than a normal header. The extended header may comprise a digest comprising address information for write data configured to be stored on the middle multi-level page, the upper multi-level page, and the top multi-level page.

The ECC codeword generator 2016 may generate ECC codewords for the write data, such as a write data payload organized into a flash management unit, sent from the flash translation layer 2012, The ECC codeword generator 2016 may adjust an ECC strength for generated ECC codewords in response to at least one type of multi-level page associated with the write data. In some embodiments, for example, the top and lower pages may have different ECC strength applied while the middle and upper pages may have no change.

In one embodiment, the ECC codeword generator 2016 may generate ECC codewords for the flash management units that include write data configured to be stored on the middle multi-level page, upper multi-level page, and top multi-level page. The ECC codeword generator 2016 may generate lower page ECC codewords for the flash management units that include write data configured to be stored on the lower multi-level page. The ECC codeword generator 2016 may configure the lower page ECC codewords to have a lower ECC strength than the ECC codewords configured to be stored on the middle multi-level page, upper multi-level page, and top multi-level page.

The read/write circuit 2018 may store the ECC codewords (both ECC codewords directed to multi-level pages other than the lower multi-level page and lower page ECC codewords) on a page of the non-volatile memory array 2006. Specifically, the read/write circuit 2018 may store ECC codewords on the middle multi-level page, upper multi-level page, and top multi-level page and lower page ECC codewords on the lower multi-level page in response to write commands. "Read/write circuit" refers to a device, component, element, module, system, sub-system, circuitry, logic, hardware, or circuit configured and/or operational to read data from and write data to a storage media, such as storage cells of a storage array.

The read/write circuit 2018 is configured to service storage operations to provide storage services to one or more storage clients 2028. The read/write circuit 2018 may be configured to write data to memory cells of the plurality of memory dies 2008. The read/write circuit 2018 coordinates with the ECC codeword generator 2016 and flash translation layer 2012 to service write commands and read commands. The read/write circuit 2018 reads data from storage blocks 2010 of the non-volatile memory array 2006, may implement a read scan operation, and may check memory state read levels of each storage block 2010.

The read/write circuit 2018 may coordinate with the ECC codeword generator 2016 to determine a bit error rate, or an estimated or proxy bit error rate, for each read of a storage block 2010. This bit error rate may be called a read bit error rate. In one embodiment, the ECC codeword generator 2016 determines the bit error rate without doing any error correction or detection. In another embodiment, the ECC codeword generator 2016 determines the bit error rate after attempting or completing error correction or detection.

In one embodiment, the lower multi-level page may include a single memory state transition based on the multi-level storage cell encoding used to encode the multi-level page. The ECC codeword generator 2016 may decrease the ECC strength in response to the multi-level page being of the lower multi-level page type. This may be indicated by an attribute for the multi-level page. The read/write circuit 2018 may read the ECC codeword from the multi-level page based on the PBA assigned to an LBA of a read command. The read/write circuit 2018 may signal to the ECC codeword generator 2016 that the read ECC codeword has an adjusted ECC strength in response to the type of multi-level page associated with the ECC codeword. The multi-level page may store four ECC codewords, each sized to hold 4 KB of data. The error correction code encoder may change the ECC strength by varying a ratio of user data relative to redundancy data in the generated ECC codeword.

The storage controller 2004 of the storage device 2002 may include a header scanner 2020 configured to read a set of digests from lower page ECC codewords and determine from these the address information of the flash management units comprising the write data of the middle multi-level page, the upper multi-level page, and the top multi-level page based on a single read of the lower multi-level page of the page of the non-volatile memory array 2006.

This may represent an improvement over conventional ways to gather address information from headers. Conventional header scanner operations may take an unacceptable amount of time to complete because each FMU on each multi-level page may need to be read before address information can be extracted from the FMUs. In contrast, the header scanner 2020 of the storage device 2002 can obtain address information for each FMU of the multi-level pages of a page using a single read of the lower multi-level page. "Header scanner" refers to any circuit, sub-circuit, electronic component, hardware, software, firmware, module, logic, device, or apparatus configured, programmed, designed, arranged, or engineered to review a plurality of FMUs and/or ECC codewords in order to review the headers.

A storage controller may instruct a header scanner to gather headers from FMUs of one or more logical pages of one or more logical erase blocks or FMUs of one or more logical groups.

The extended header for the flash management units may be stored on the lower multi-level page. In one embodiment, the extended header may include a digest that may comprise address information for multi-level pages other than the lower multi-level page. The extended header may also comprise address information for one or more flash management units of the lower multi-level page. The digest may comprise address information for at least one flash management unit from each of the middle multi-level page, the upper multi-level page, and the top multi-level page. In one embodiment, the address information of the lower page may be stored in the extended header.

Figure 21:
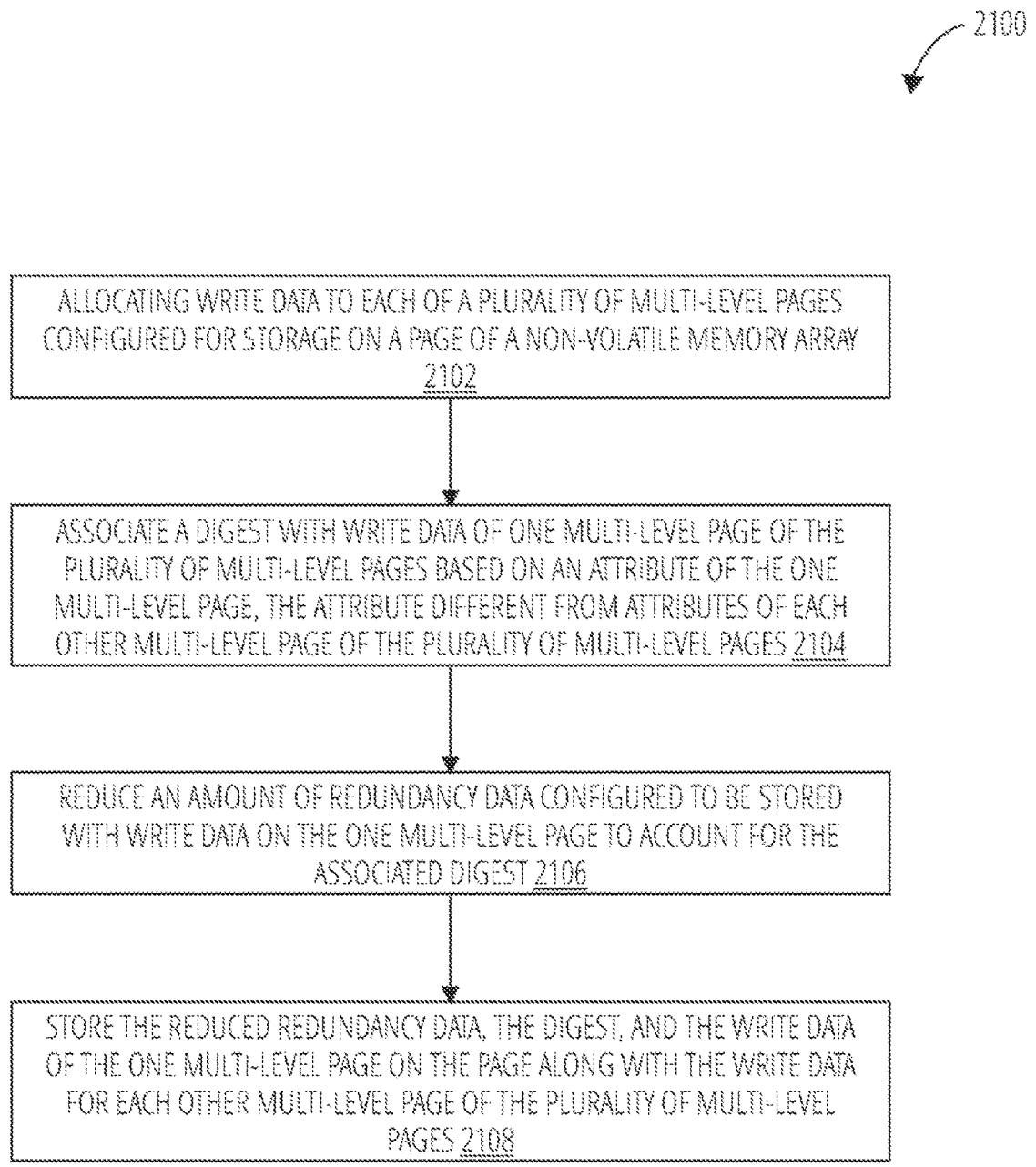
FIG. 21 illustrates a routine 2100 in accordance with one embodiment.

FIG. 21 illustrates a routine 2100 in accordance with one embodiment. At block 2102, write data may be allocated to each of a plurality of multi-level pages. The multi-level pages may be configured for storage on a page of a non-volatile memory array.

In block 2104, a digest is associated with write data of one multi-level page of the plurality of multi-level pages. The digest may be associated with the write data based on an attribute of the one multi-level page. This attribute may be different for the one multi-level page from attributes of each other multi-level page of the plurality of multi-level pages.

In block 2106, the amount of redundancy data configured to be stored with write data on the one multi-level page may be reduced to account for the associated digest. In certain embodiments, this may mean that the redundancy data is made smaller by an amount equal to the size of a digest added to ECC codewords for the one multi-level page. In block 2108, the reduced redundancy data, the digest, and the write data of the one multi-level page may be stored on the page along with the write data for each other multi-level page of the plurality of multi-level pages.

Figure 22:
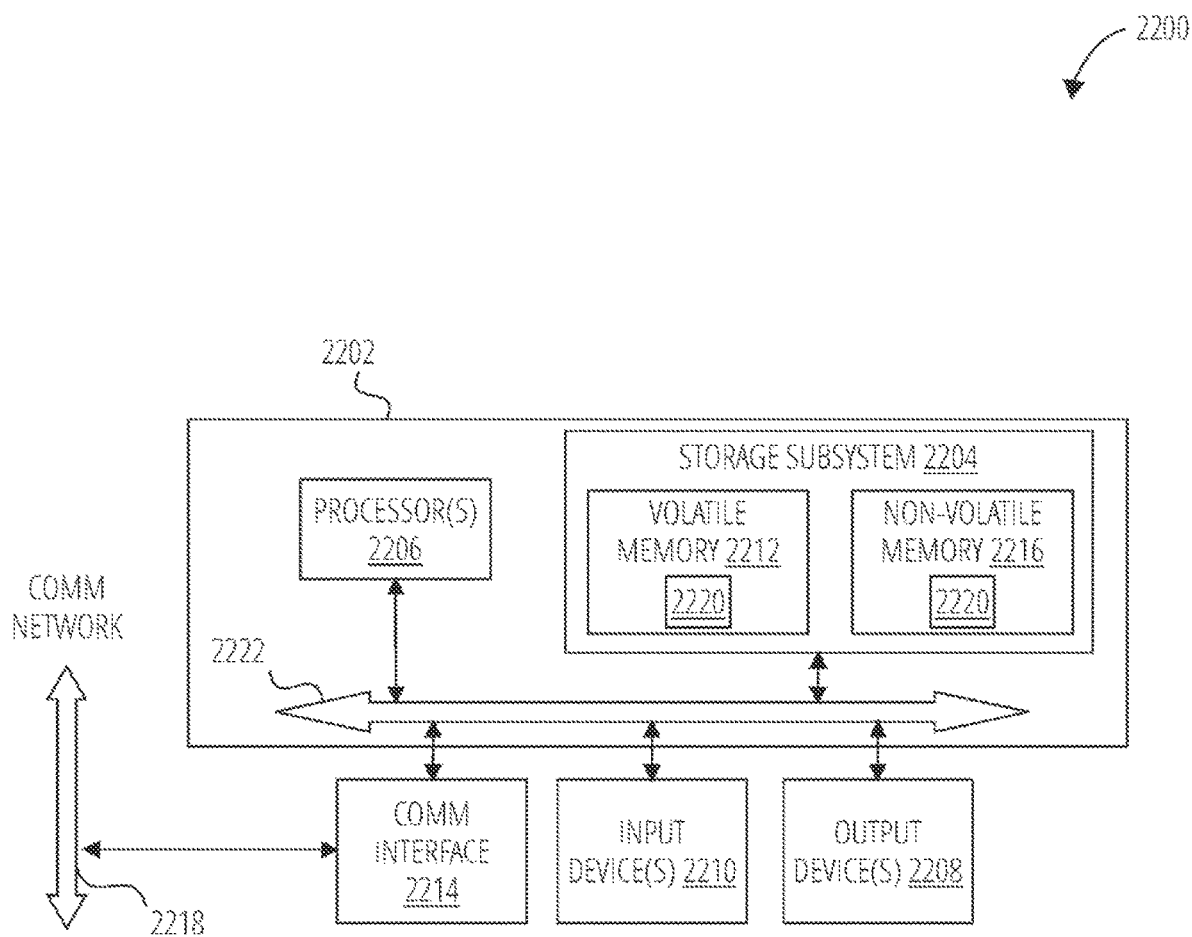
FIG. 22 is an example block diagram of a computing device 2200 that may incorporate certain embodiments.

FIG. 22 is an example block diagram of a computing device 2200 that may incorporate embodiments of the solution. FIG. 22 is merely illustrative of a machine system to carry out aspects of the technical processes described herein and does not limit the scope of the claims. One of ordinary skill in the art would recognize other variations, modifications, and alternatives. In certain embodiments, the computing device 2200 includes a data processing system 2202, a communication network 2218, communication network interface 2214, input device(s) 2210, output device(s) 2208, and the like.

As depicted in FIG. 22, the data processing system 2202 may include one or more processor(s) 2206 and a storage subsystem 2204. "Processor" refers to any circuitry, component, chip, die, package, or module configured to receive, interpret, decode, and execute machine instructions. "Instructions" refers to symbols representing commands for execution by a device using a processor, microprocessor, controller, interpreter, or other programmable logic. Broadly, 'instructions' can mean source code, object code, and executable code. "Instructions" herein is also meant to include commands embodied in programmable read-only memories (EPROM) or hard coded into hardware (e.g., "micro-code") and like implementations wherein the instructions are configured into a machine read-only memory or other hardware component at manufacturing time of a device. Examples of a processor may include, but are not limited to, a central processing unit, a general-purpose processor, an application-specific processor, a graphics processing unit (GPU), a field programmable gate array (FPGA), Application Specific Integrated Circuit (ASIC), System on a Chip (SoC), virtual processor, processor core, and the like.

The processor(s) 2206 communicate with a number of peripheral devices via a bus subsystem 2222. These peripheral devices may include input device(s) 2210, output device(s) 2208, communication network interface 2214, and the storage subsystem 2204. The storage subsystem 2204, in one embodiment, comprises one or more storage devices and/or one or more memory devices.

"Storage device" or "memory device" refers to any hardware, system, sub-system, circuit, component, module, non-volatile memory media, hard disk drive, storage array, device, or apparatus configured, programmed, designed, or engineered to store data for a period of time and retain the data in the storage device while the storage device is not using power from a power supply. Examples of storage devices include, but are not limited to, a hard disk drive, FLASH memory, MRAM memory, a Solid-State storage device, Just a Bunch Of Disks (JBOD), Just a Bunch Of Flash (JBOF), an external hard disk, an internal hard disk, and the like.

"Non-volatile memory media" refers to any hardware, device, component, element, or circuit configured to maintain an alterable physical characteristic used to represent a binary value of zero or one after a primary power source is removed. Examples of the alterable physical characteristic include, but are not limited to, a threshold voltage for a transistor, an electrical resistance level of a memory cell, a current level through a memory cell, a magnetic pole orientation, a spin-transfer torque, and the like.

The alterable physical characteristic is such that, once set, the physical characteristic stays sufficiently fixed such that when a primary power source for the non-volatile memory media is unavailable the alterable physical characteristic can be measured, detected, or sensed, when the binary value is read, retrieved, or sensed. Said another way, non-volatile memory media is a storage media configured such that data stored on the non-volatile memory media is retrievable after a power source for the non-volatile memory media is removed and then restored. Non-volatile memory media may comprise one or more non-volatile memory elements, which may include, but are not limited to: chips, packages, planes, memory die, and the like.

Examples of non-volatile memory media include but are not limited to: ReRAM, Memristor memory, programmable metallization cell memory, phase-change memory (PCM, PCME, PRAM, PCRAM, ovonic unified memory, chalcogenide RAM, or C-RAM), NAND FLASH memory (e.g., 2D NAND FLASH memory, 3D NAND FLASH memory), NOR FLASH memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like.

While the non-volatile memory media is referred to herein as "memory media," in various embodiments, the non-volatile memory media may more generally be referred to as non-volatile memory. Because non-volatile memory media is capable of storing data when a power supply is removed, the non-volatile memory media may also be referred to as a recording media, non-volatile recording media, storage media, storage, non-volatile memory, volatile memory medium, non-volatile storage medium, non-volatile storage, or the like.

In certain embodiments, data stored in non-volatile memory media is addressable at a block level which means that the data in the non-volatile memory media is organized into data blocks that each have a unique logical address (e.g., LBA), In other embodiments, data stored in non-volatile memory media is addressable at a byte level which means that the data in the non-volatile memory media is organized into bytes (8 bits) of data that each have a unique address, such as a logical address. One example of byte addressable non-volatile memory media is storage class memory (SCM).

In one embodiment, the storage subsystem 2204 includes a volatile memory 2212 and a non-volatile memory 2216. The volatile memory 2212 and/or the non-volatile memory 2216 may store computer-executable instructions that alone or together form logic 2220 that when applied to, and executed by, the processor(s) 2206 implement embodiments of the processes disclosed herein.

"Volatile memory" refers to a shorthand name for volatile memory media. In certain embodiments, volatile memory refers to the volatile memory media and the logic, controllers, processor(s), state machine(s), and or other periphery circuits that manage the volatile memory media and provide access to the volatile memory media.

"Volatile memory media" refers to any hardware, device, component, element, or circuit configured to maintain an alterable physical characteristic used to represent a binary value of zero or one for which the alterable physical characteristic reverts to a default state that no longer represents the binary value when a primary power source is removed or unless a primary power source is used to refresh the represented binary value. Examples of volatile memory media include but are not limited to dynamic random-access memory (DRAM), static random-access memory (SRAM), double data rate random-access memory (DDR RAM) or other random-access solid-state memory.

While the volatile memory media is referred to herein as "memory media," in various embodiments, the volatile memory media may more generally be referred to as volatile memory.

"Non-volatile memory" refers to shorthand name for non-volatile storage media. In certain embodiments, non-volatile storage media refers to the non-volatile storage media and the logic, controllers, processor(s), state machine(s), and/or other periphery circuits that manage the non-volatile storage media and provide access to the non-volatile storage media.

The input device(s) 2210 include devices and mechanisms for inputting information to the data processing system 2202. These may include a keyboard, a keypad, a touch screen incorporated into a graphical user interface, audio input devices such as voice recognition systems, microphones, and other types of input devices. In various embodiments, the input device(s) 2210 may be embodied as a computer mouse, a trackball, a track pad, a joystick, wireless remote, drawing tablet, voice command system, eye tracking system, and the like. The input device(s) 2210 typically allow a user to select objects, icons, control areas, text and the like that appear on a graphical user interface via a command such as a click of a button or the like.

The output device(s) 2208 include devices and mechanisms for outputting information from the data processing system 2202. These may include a graphical user interface, speakers, printers, infrared LEDs, and so on, as well understood in the art. In certain embodiments, a graphical user interface is coupled to the bus subsystem 2222 directly by way of a wired connection. In other embodiments, the graphical user interface couples to the data processing system 2202 by way of the communication network interface 2214. For example, the graphical user interface may comprise a command line interface on a separate computing device 2200 such as desktop, server, or mobile device.

The communication network interface 2214 provides an interface to communication networks (e.g., communication network 2218) and devices external to the data processing system 2202. The communication network interface 2214 may serve as an interface for receiving data from and transmitting data to other systems. Embodiments of the communication network interface 2214 may include an Ethernet interface, a modem (telephone, satellite, cable, ISDN), (asynchronous) digital subscriber line (DSL), Fire-Wire, USB, a wireless communication interface such as Bluetooth or WiFi, a near field communication wireless interface, a cellular interface, and the like.

The communication network interface 2214 may be coupled to the communication network 2218 via an antenna, a cable, or the like. In some embodiments, the communication network interface 2214 may be physically integrated on a circuit board of the data processing system 2202, or in some cases may be implemented in software or firmware, such as "soft modems", or the like.

The computing device 2200 may include logic that enables communications over a network using protocols such as HTTP, TCP/IP, RTP/RTSP, IPC, UDP and the like.

The volatile memory 2212 and the non-volatile memory 2216 are examples of tangible media configured to store computer readable data and instructions to implement various embodiments of the processes described herein, Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 2212 and the non-volatile memory 2216 may be configured to store the basic programming and data constructs that provide the functionality of the disclosed processes and other embodiments thereof that fall within the scope of the present disclosure.

Logic 2220 that implements one or more parts of embodiments of the solution may be stored in the volatile memory 2212 and/or the non-volatile memory 2216. Logic 2220 may be read from the volatile memory 2212 and/or non-volatile memory 2216 and executed by the processor(s) 2206. The volatile memory 2212 and the non-volatile memory 2216 may also provide a repository for storing data used by the logic 2220. "Repository" refers to any data source or dataset that includes data, or content. In one embodiment, a repository resides on a computing device. In another embodiment, a repository resides on a remote computing or remote storage device. A repository may comprise a file, a folder, a directory, a set of files, a set of folders, a set of directories, a database, an application, a software application, content of a text, content of an email, content of a calendar entry, and the like. A repository, in one embodiment, comprises unstructured data. A repository, in one embodiment, comprises structured data such as a table, an array, a queue, a look up table, a hash table, a heap, a stack, or the like. A repository may store data in any format including binary, text, encrypted, unencrypted, a proprietary format, or the like.

The volatile memory 2212 and the non-volatile memory 2216 may include a number of memories including a main random access memory (RAM) for storage of instructions and data during program execution and a read only memory (ROM) in which read-only non-transitory instructions are stored. The volatile memory 2212 and the non-volatile memory 2216 may include a file storage subsystem providing persistent (non-volatile) storage for program and data files. The volatile memory 2212 and the non-volatile memory 2216 may include removable storage systems, such as removable FLASH memory.

The bus subsystem 2222 provides a mechanism for enabling the various components and subsystems of data processing system 2202 communicate with each other as intended. Although the communication network interface 2214 is depicted schematically as a single bus, some embodiments of the bus subsystem 2222 may utilize multiple distinct busses.

It will be readily apparent to one of ordinary skill in the art that the computing device 2200 may be a device such as a smartphone, a desktop computer, a laptop computer, a rack-mounted computer system, a computer server, or a tablet computer device. As commonly known in the art, the computing device 2200 may be implemented as a collection of multiple networked computing devices. Further, the computing device 2200 will typically include operating system logic (not illustrated) the types and nature of which are well known in the art.

Terms used herein should be accorded their ordinary meaning in the relevant arts, or the meaning indicated by their use in context, but if an express definition is provided, that meaning controls.

Within this disclosure, different entities (which may variously be referred to as "units," "circuits," other components, etc.) may be described or claimed as "configured" to perform one or more tasks or operations. This formulation—[entity] configured to [perform one or more tasks]-is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § I 12(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc., are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Within this disclosure, different entities (which may variously be referred to as "units," "circuits," other components, etc.) may be described or claimed as "configured" to perform one or more tasks or operations. This formulation—[entity] configured to [perform one or more tasks]-is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc., are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term or is used as an inclusive or and not as an exclusive or. For example, the phrase "at least one of x, y, or z" means any one of x, y, and z, as well as any combination thereof,

What is claimed is:

1. A method, comprising:
    allocating write data to each of a plurality of multi-level pages configured for storage on a page of a non-volatile memory array;
    associating a digest with write data of one multi-level page of the plurality of multi-level pages corresponding to an attribute of the one multi-level page, the attribute different from attributes of at least one mufti-level page of the plurality of multi-level pages;
    reducing an amount of redundancy data configured to be stored with write data on the one multi-level page to account for the associated digest;
    combining the digest with a header for an ECC codeword configured to include the header, write data, and the reduced redundancy data;
    reducing the reduced redundancy data by an amount equal to a size of the digest; and
    storing the reduced redundancy data, the digest, and the write data of the one multi-level page on the page along with the write data for each other multi-level page of the plurality of multi-level pages.

2. The method of claim 1, further comprising generating the digest that comprises address information for the write data of each other mufti-level page of the plurality of mufti-level pages.

3. The method of claim 2, wherein the address information comprises a logical group identifier and a logical group offset configured together to uniquely identify a subset of the write data.

4. The method of claim 2, wherein the digest comprises address information for the write data of the one multi-level page and the digest also comprises header metadata for the write data of each other multi-level page of the plurality of multi-level pages.

5. The method of claim 1, further comprising:
    generating a first ECC codeword that includes the reduced redundancy data, address information for the write data of the one multi-level page, and a digest comprising address information for the write data of the plurality of multi-level pages; and
    generating a plurality of ECC codewords for the write data of each other multi-level page of the plurality of multi-level pages; the plurality of ECC codewords each comprising more redundancy data than the first ECC codeword.

6. The method of claim 1, wherein the one multi-level page includes address information for the write data of the one multi-level page, the method further comprising:
    reading data of the one multi-level page without reading data of the other multi-level pages of the plurality of multi-level pages; and
    parsing the data of the one multi-level page to determine address information for the write data of the one multi-level page and to determine the digest comprising address information for write data of each other multi-level page of the plurality of multi-level pages.

7. The method of claim 1, further comprising:
    omitting address information associated with write data configured to be stored on another multi-level page based on the attribute for the other multi-level page;
    increasing an amount of redundancy data configured to be stored with the write data of the other multi-level page to account for the omitted address information; and
    storing the increased redundancy data and the write data of the other multi-level page on the page along with the write data for each other multi-level page of the plurality of multi-level pages.

8. The method of claim 1, wherein the attribute comprises a reliability attribute based on a multi-level storage cell encoding configured to define the plurality of multi-level pages within the page such that the reliability attribute of the one multi-level page is greater than reliability attributes of each other multi-level page of the plurality of multi-level pages.

9. The method of claim 8, wherein the multi-level storage cell encoding defines one memory state transition for a lower multi-level page, two memory state transitions for a middle multi-level page, six memory state transitions for an upper multi-level page, and six memory state transitions for a top multi-level page.

10. The method of claim 8, wherein the multi-level storage cell encoding defines one memory state transition for a lower multi-level page, two memory state transitions for a middle multi-level page, four memory state transitions for an upper multi-level page, and eight memory state transitions for a top multi-level page.

11. The method of claim 8, wherein the mufti-level storage cell encoding defines two memory state transitions for a lower multi-level page, three memory state transitions for a middle multi-level page, five memory state transitions for an upper multi-level page, and five memory state transitions for a top multi-level page.

12. The method of claim 1, wherein the attribute comprises a lower bit error rate for the one multi-level page than bit error rates for each other multi-level page of the plurality of multi-level pages.

13. The method of claim 1, wherein the attribute comprises a type of the one multi-level page and the type comprises one of a lower multi-level page, a middle multi-level page, an upper multi-level page, and a top multi-level page.

14. The method of claim 1; wherein the digest comprises a set of digests, each member of the set of digests included within a flash management unit stored on the one multi-level page.

15. An apparatus, comprising:
a non-volatile memory array comprising Quad-level Cell (QLC) NAND flash memory cells configured to store a lower multi-level page, a middle multi-level page, an upper multi-level page, and a top multi-level page;
wherein the lower multi-level page has higher data integrity than the middle multi-level page, the upper multi-level page, and the top multi-level page;
a multi-level page allocator configured to assign data blocks to each of the lower multi-level page; the middle multi-level page, the upper multi-level page, and the top multi-level page, the data blocks comprising write data for a set of write commands;
an address allocator configured to determine address information for the assigned data blocks;
a header generator configured to:
generate headers for flash management units (FMUs) that include the assigned data blocks, the headers comprising the determined address information;
generate a digest comprising address information for FMUs assigned to the middle multi-level page, the upper multi-level page, and the top multi-level page; and
combine the digest with at least one FMU assigned to the lower multi-level page;
an error correction code encoder configured to:
generate ECC codewords for each FMU assigned to the middle multi-level page, the upper multi-level page, and the top multi-level page;
generate a lower page ECC codeword for each FMU assigned to the lower multi-level page;
wherein at least one lower page ECC codeword comprises redundancy data reduced in size proportional to a size of the digest of an associated FMU; and
a read/write circuit configured to:
store the ECC codewords within the middle multi-level page, the upper multi-level page, and the top multi-level page and the lower page ECC codeword to the lower multi-level page of a page of the non-volatile memory array.

16. The apparatus of claim 15, wherein the error correction code encoder is configured such that each ECC codeword and lower page ECC codeword is the same size.

17. A system, comprising:
a non-volatile memory array comprising Quad-level Cell (QLC) NAND flash memory cells; and
a storage controller comprising:
a flash translation layer configured to:
associate write data of a plurality of write commands with multi-level pages of QLC memory cells, each multi-level page having a type selected from the group consisting of a lower multi-level page, a middle multi-level page, an upper multi-level page, and a top multi-level page;
determine address information for the write data of the multi-level pages;
a packetizer comprising:
a header generator configured to:
generate a set of headers for flash management units, the flash management units comprising the write data of the multi-level pages; and
generate an extended header for flash management units configured to be stored on the lower multi-level page, the extended header comprising a digest comprising address information for write data configured to be stored on the middle multi-level page, the upper multi-level page; and the top multi-level page;
an ECC codeword generator configured to:
generate ECC codewords for the flash management units that comprise the write data of the middle mufti-level page, the upper multi-level page, and the top multi-level page;
generate lower page ECC codewords for the flash management units that comprise the write data of the lower multi-level page, wherein the lower page ECC codewords have a lower ECC strength than the ECC codewords for the flash management units that comprise the write data of the middle multi-level page, the upper multi-level page, and the top multi-level page; and
a read/write circuit configured to store the ECC codewords on the middle multi-level page, the upper multi-level page, and the top multi-level page and store the lower page ECC codewords on the lower multi-level page of a page of the non-volatile memory array.

18. The system of claim 17, further comprising a header scanner configured to:
read a set of digests from the lower page ECC codewords; and
determine address information for the flash management units that comprise the write data of the middle multi-level page, the upper multi-level page, and the top multi-level page based on a single read of the lower multi-level page of the page of the non-volatile memory array.

19. The system of claim 17, wherein each extended header for the flash management units configured to be stored on the lower multi-level page comprises address information for a flash management unit of the lower multi-level page and the digest comprises address information for at least one flash management unit from each of the middle multi-level page, the upper multi-level page, and the top multi-level page.

* * * * *